US006173251B1

(12) United States Patent
Ito et al.

(10) Patent No.: US 6,173,251 B1
(45) Date of Patent: Jan. 9, 2001

(54) KEYWORD EXTRACTION APPARATUS, KEYWORD EXTRACTION METHOD, AND COMPUTER READABLE RECORDING MEDIUM STORING KEYWORD EXTRACTION PROGRAM

(75) Inventors: Takahiro Ito; Yasuhiro Takayama; Katsushi Suzuki, all of Tokyo (JP)

(73) Assignee: Mitsubishi Denki Kabushiki Kaisha, Tokyo (JP)

( * ) Notice: Under 35 U.S.C. 154(b), the term of this patent shall be extended for 0 days.

(21) Appl. No.: 09/123,809

(22) Filed: Jul. 28, 1998

(30) Foreign Application Priority Data

Aug. 5, 1997 (JP) ........................ 9-210252

(51) Int. Cl.[7] ........................ G06F 17/30

(52) U.S. Cl. ........................ 704/7; 704/9; 704/10; 704/260; 707/3

(58) Field of Search ........................ 704/7, 9, 10, 260; 707/3

(56) References Cited

U.S. PATENT DOCUMENTS

| | | | |
|---|---|---|---|
| 5,029,084 | 7/1991 | Morohasi et al. . | |
| 5,469,355 * | 11/1995 | Tsuzuki | 704/9 |
| 5,619,410 * | 4/1997 | Emory et al. | 704/9 |
| 5,907,841 * | 8/1996 | Kazuo et al. | 707/6 |

* cited by examiner

*Primary Examiner*—David R. Hudspeth
*Assistant Examiner*—Daniel Abebe

(57) ABSTRACT

Disclosed is a keyword extraction apparatus and method capable of overcoming a problem in the conventional automatic keyword extraction wherein character strings in a sentence to be processed are employed, as they are, to assign a document with an index in terms of keywords; hence words having the similar meaning but different expressions in written language cannot be retrieved. The keyword extraction apparatus comprises technical term storage means for storing technical terms with proper expressions and different expressions thereof, and basic word storage means for storing general basic words of high frequency. Technical-term segmentation point setting means cuts out a range of any of the technical terms stored in technical term storage means from an input sentence. When the cut-out technical term is written in a different expression, the different expression is replaced by a corresponding proper expression in proper expression replacing means. Character-type segmentation point setting means detects a difference in character type in the input sentence. Basic-word segmentation point setting means cuts out, from the input sentence, a range of any of the basic words stored in the basic word storage means. Partial character string cutting means cuts out, as keywords, all relevant partial character strings based on segmentation points set by the technical-term segmentation point setting means, the character-type segmentation point setting means and the basic-word segmentation point setting means.

9 Claims, 68 Drawing Sheets

FIG. 2

| HEADWORD | PROPER EXPRESSION |
|---|---|
| サーバ | |
| サーバー | サーバ |
| : | |
| 切り替え | |
| 切り替え | 切り替え |
| 切替え | 切り替え |
| 切替え | 切り替え |
| : | |

FIG. 3

| HEADWORD |
|---|
| 亜鉛 |
| 亜鉛 |
| 亜鉛 |
| : |
| 試験 |
| 通信 |
| : |

FIG. 4

| HEADWORD |
|---|
| が |
| の |
| を |
| に |
| と |
| から |
| ばかり |
| : |

|サーバ|切り替えによる通信テストを行う

END-OF-TECHNICAL-TERM SEGMENTATION POINT

START-OF-TECHNICAL-TERM SEGMENTATION POINT

| HEADWORD |
| --- |
| 各 |
| 再 |
| 各種 |
| 現在 |
| : |
| : |

FIG. 38

| HEADWORD |
|---|
| 下 |
| 側 |
| 中 |
| 以下 |
| : |
| : |

| |
|---|
| FIG. 48A |
| FIG. 48B |
| FIG. 48C |

FIG. 60

| PROPER EXPRESSION | DIFFERENT EXPRESSION 1 | DIFFERENT EXPRESSION 2 | ··· |
|---|---|---|---|
| ボタン | 釦 | | |
| 上書 | 上書き | 上がき | ··· |
| | : | | |

KEYWORD EXTRACTION APPARATUS, KEYWORD EXTRACTION METHOD, AND COMPUTER READABLE RECORDING MEDIUM STORING KEYWORD EXTRACTION PROGRAM

BACKGROUND OF THE INVENTION

1. Field of the Invention

The present invention relates to a keyword extraction apparatus, a keyword extraction method and a computer readable recording medium storing a keyword extraction program, which are used in a system for retrieving a document written in natural language to automatically extract keywords from the document beforehand for creating an index of the document in terms of keywords and, at the time of retrieval, to extract a keyword from an input sentence for retrieving the document through collation of the keyword.

2. Description of the Related Art

As a method of retrieving documents in electronic form, it has been hitherto known to previously assign keywords to a document in the form of an index and, at the time of retrieval, to search the document by collating a designated keyword with the keywords assigned to the document. This method has problems in that manually assigning keywords to a document requires a lot of time and labor, and the retrieval cannot work if the keywords assigned by a person who has engaged in creating the index differ from keywords designated by persons who are going to perform retrieval.

For lessening time and labor required to assign keywords, methods of automatically extracting keywords from documents in electronic form have been proposed.

FIG. 64 is a block diagram showing a conventional keyword extraction system disclosed in, for example, Japanese Unexamined Patent Publication No. 8-30627. In FIG. 64, denoted by 6401 is a character type discriminating portion for discriminating types of individual characters in an input text and then transferring the discriminated types to character type storage means 6402. The character type storage means 6402 stores the types and corresponding positions of the individual characters in the input text which have been discriminated by the character type discriminating portion 6401. Denoted by 6403 is an effective-character-type character string cutting portion for cutting out all effective-character-type character strings, each of which is as long as any of four effective character types, i.e., katakana (the square form of Japanese letters hiragana), kanji (Chinese characters), alphabets and numerals, continue, based on the information stored in the character type storage means 6402.

Denoted by 6406 is a character-type boundary discriminating portion for discriminating all boundary positions between different character types of all the effective-character-type character strings based on the information stored in the character type storage means 6402, and then transferring the discriminated positions to character-type segmentation point storage means 6407. The character-type segmentation point storage means 6407 stores every boundary position, at which the character type changes from one to another, discriminated by the character-type boundary discriminating portion 6406.

Denoted by 6409 is affix storage means for storing affixes of high frequency. 6410 is an affix discriminating portion for discriminating all affixes in a character string and then transferring the discriminated affixes to affix segmentation point storage means 6411. The affix segmentation point storage means 6411 stores, as affix segmentation points, positions before and behind all the affixes discriminated by the affix discriminating portion 6410.

Denoted by 6413 is basic word storage means for storing, as basic words, nouns of high frequency. 6414 is a basic-word discriminating portion for discriminating all basic words in a character string and then transferring the discriminated basic words to basic-word segmentation point storage means 6415. The basic-word segmentation point storage means 6415 stores, as basic-word segmentation points, positions before and behind all the basic words discriminated by the basic-word discriminating portion 6414.

Denoted by 6412 is a partial-character-string cutting portion for cutting out partial character strings based on the character-type segmentation points stored in the character-type segmentation point storage means 6407, the affix segmentation points stored in the affix segmentation point storage means 6411, or the basic-word segmentation points stored in the basic-word segmentation point storage means 6415.

Denoted by 6404 is a noun discriminating portion which, when a character succeeding each of the effective-character-type character string cut out by the effective-character-type character string cutting portion 6403 is hiragana, compares the hiragana with hiragana character strings stored in noun-succeeding-hiragana storage means 6405, and then deletes the effective-character-type character string when a head portion of the hiragana succeeding to that effective-character-type character string does not match with any of the hiragana character strings stored in the noun-succeeding-hiragana storage means 6405.

Denoted by 6416 is a basic-word deleting portion for deleting the partial character string which matches with any of the basic words stored in the basic word storage means 6413.

Denoted by 6417 is a necessary keyword storage means for storing keyword character strings designated beforehand. 6418 is a necessary keyword cutting portion which, when character strings matching with the character strings stored in the necessary keyword storage means 6417 appear in a text, cuts out all those character strings and adds them to keywords.

The operation of the conventional keyword extraction system will be described below. The description will be made on the case of entering a text "お絵書きモード (oekaki mohdo=painting mode)", for example.

First, the character type discriminating portion 6401 discriminates types of individual characters in an input text, and the character type storage means 6402 stores the types and corresponding positions of the individual characters in such a way that the first character is hiragana, the second character is kanji, the third character is kanji, the fourth character is hiragana, and so on.

Next, the effective-character-type character string cutting portion 6403 cuts out "絵書" and "モード". Since there are no differences in character type within the partial character strings of "絵書" and "モード", character-type segmentation points are not stored in the character-type segmentation point storage means 6407. Also, since no affixes are included in the partial character strings of "絵書" and "モード", affix segmentation points are not stored in the affix segmentation point storage means 6411. Further, since no basic words are included in the partial character strings of "絵書" and "モード", basic-word segmentation points are not stored in the basic-word segmentation point storage means 6415.

Then, since "絵書" and "モード" do not include any of the character-type segmentation point, the affix segmentation point and the basic-word segmentation point, the partial-character-string cutting portion 6412 eventually cut outs two partial character strings of "絵書" and "モード".

Subsequently, since hiragana "き" succeeding to "絵書" is not registered in the noun-succeeding-hiragana storage means 6405, the noun discriminating portion 6404 deletes "絵書". On the other hand, since there is no hiragana succeeding to "モード", "モード" is not deleted in the noun discriminating portion 6404. The basic-word deleting portion 6416 then deletes the basic word which matches with any of those stored in the basic word storage means 6413. If "モード" is assumed here not to be a basic word, "モード" would not be deleted.

Next, the necessary keyword cutting portion 618 cuts out "お絵書き" from the text "お絵書きモード" stored in the necessary keyword storage means 6417 and adds it to keywords. Finally, "お絵書き" and "モード" are output.

When "お絵書き" or "モード" is designated as a retrieval key at the time of retrieval, the document including the original text "お絵書きモード" is retrieved.

In retrieval with the thus-constructed keyword extraction system disclosed in Japanese Unexamined Patent Publication No. 8-30627, the retrieval is hit only when the character string designated as a keyword completely matches with any of the keywords assigned to a document. In retrieval, however, words having the similar meaning and pronunciation but different expressions (in written language) must be often taken into account. For example, "お絵描き (oekaki=painting)" may be entered as a retrieval key rather than "お絵書き" at the time of retrieval. Thus the keyword extraction system disclosed in Japanese Unexamined Patent Publication No. 8-30627 has a problem that retrieval cannot be effected unless there is a complete match between character strings.

To cope with the problem caused by words having the similar meaning and pronunciation but different expressions, a document retrieval method and apparatus are proposed in Japanese Unexamined Patent Publication No. 8-137892. In the document retrieval method and apparatus proposed in Japanese Unexamined Patent Publication No. 8-137892, when a character string designated upon retrieval is a compound word, the compound word is divided into individual words composing it and synonym expressions for the compound word are created in combinations of synonyms for each of the divided words by using a synonym dictionary.

FIG. 65 is a block diagram of the conventional document retrieval method and apparatus disclosed in Japanese Unexamined Patent Publication No. 8-137892. In FIG. 65, denoted by 6501 is a control unit comprised of a CPU and memory, 6502 is an input unit such as a keyboard or mouse through which the user enters a retrieval keyword and performs retrieval operation, 6503 is a display unit for displaying the retrieval keyword entered through the input unit 6502, the retrieval operation instructed by the user, and retrieved results, 6504 is an external storage unit for storing data to be retrieved, 6505 is a synonym dictionary in which synonym information for retrieved keywords is stored, and 6506 is a segmentation dictionary in which the retrieved keywords are stored. A character string designated for retrieval is segmented based on words registered in the segmentation dictionary 6506.

The operation of the conventional document retrieval method will be described below. FIG. 66 is a flowchart illustrating a flow of processing disclosed in Japanese Unexamined Patent Publication No. 8-137892. The following description will be made on the case of designating, for example, "文書検索 (bunsbo kensaku=document retrieval) *ワークステーション (wahku sutehshon=work station)" (where "*" indicates logical product) as a retrieval formula. It is assumed that "文書" and "検索" are registered in the segmentation dictionary. Also, the synonym dictionary is assumed to store such information that "文書" and "テキスト (tekisuto=text)" are synonyms, "検索" and "サーチ (sahchi=search)" are synonyms, and "ワークステーション" and "WS" are synonyms.

In step 6612, a value in a synonym-dictionary usage flag buffer to set whether to use the synonym dictionary or not is checked. Assuming here that the buffer value is set to "1" indicating the use of the synonym dictionary, the processing follows the path indicated by at Y.

Next, in step 6613, the retrieval formula is segmented into a character string to be retrieved and a logical formula. Then, in step 6614, the character string to be retrieved is compared with words in the segmentation dictionary for segmentation of a keyword. Subsequently, in step 6615, synonyms which correspond to each of the segmented keywords are extracted from the synonym dictionary.

It is determined in step 6616 whether or not the processing for all keywords has been completed, and the processing of steps 6614 and 6615 is repeated until all keywords are processed.

Next, in step 6617, the synonyms corresponding to the segmented keywords are combined with each other to create retrieval keywords.

Subsequently, in step 6618, the created retrieval keywords are joined by putting logical sum ("+") between adjacent two. As a result, for "文書検索", a retrieval formula "(文書検索+テキスト検索+文書サーチ+キストサーチ") is created in step 6619.

It is then checked in step 6620 whether or not a logical formula storage buffer is empty. The processing now returns to step 6614 to repeat the similar processing as explained above for the next character string to be retrieved, i.e., "ワークステーション".

For "ワークステーション", a retrieval formula "(ワークステーション+WS)" is created in step 6619.

Although it is checked in step 6620 whether or not the logical formula storage buffer is empty, the processing now follows the path indicated by Y because there is no more retrieved character string to be processed. As a result, for the designated retrieval formula "文書検索* ワークステーション", "文書検索+ テキスト 検索+ テキスト検索+ 文書サーチ" * (ワークステーション+WS)" is created as a retrieval formula for use in actual retrieval.

However, the document retrieval method and apparatus disclosed in Japanese Unexamined Patent Publication No. 8-137892 are designed to perform retrieval for character strings created by all possible combinations of different expressions, and hence have a problem that a longer time is required for retrieval as the number of combinations increases.

As another related art for creation of different expressions, Japanese Unexamined Patent Publication No. 3-15980 discloses a different expression and synonym developing method.

FIG. 67 is a block diagram of the different expression and synonym developing method for retrieval of character strings which is disclosed in Japanese Unexamined Patent Publication No. 3-15980. In FIG. 67, denoted by 6711 and 6713 are conversion rule tables for storing conversion rules which instruct a relevant character string in an input character string to be replaced by another character string, and 6712 is a synonym dictionary in which words having the similar meaning but different expressions are collected. Denoted by 6700 is a keyboard, 6701 and 6703 are different expression developing processes for developing a character string into character strings having the similar pronunciation and meaning but different expressions, and 6702 is a synonym developing process for developing a character string into character strings having the similar meaning by using a synonym dictionary 6712.

FIG. 68 shows an outline of the different expression and synonym developing process. A character string 6801 designated by the user is once subjected to different expression development, and a synonym development is then performed on a group of developed character strings 6802 by using the synonym dictionary 6712. After that, another different expression development is performed on a group of character strings 6803 resulted from the synonym development, whereby a group of character strings 6804 is obtained as a final development result. An example of FIG. 68 represents the case where the user designates a character string "キストサーチ (takujougata intafohn=desktop interphone)" on condition that each of the conversion tables stores rules for converting "フォー(foh)" into "ホ (ho)" and "型 (gata)" into "形 (gata)", and the synonym dictionary stores information that "インタフォーン" and "通話装置" are synonyms.

Thus, the method disclosed in Japanese Unexamined Patent Publication No. 3-15980 is designed to avoid a retrieval omission by developing various representations of different expressions and synonyms. However, because the disclosed method creates all possible different expressions, it is required to collate an input character string with all the different expressions created by the above-mentioned processing in order to determine whether or not there occurs a match for each word.

The conventional keyword extraction methods for use in retrieval of documents have had problems below because of their constructions described above.

First, in such a conventional automatic keyword extraction process as disclosed in Japanese Unexamined Patent Publication No. 8-30627, character strings appearing in a sentence to be processed are cut out, as they are, to be used as keywords which are assigned in the form of an index to a document. The conventional automatic keyword extraction process cannot therefore perform retrieval for words having the similar meaning and pronunciation but different expressions.

Although techniques to permit retrieval for words having similar meaning and pronunciations but different expressions are disclosed in Japanese Unexamined Patent Publication No. 8-137892 and No. 3-15980, those techniques require a word designated for retrieval to be collated with all possible combinations of individual words composing the designated word which have the similar pronunciation and meaning but different expressions. Thus, there has been a problem that a long time is required for retrieval processing.

Assuming, for example, that words having the similar meaning and pronunciation but different expressions are "サーバー (sahbah=server)" for "サーバ (sahba=server)" and "切り換え", "切替え", "切換え" for "切り替え" (each kirikae=switching), a total of eight keywords, i.e., "サーバ切り替え", "サーバ切り換え", "切り換え", "切替え", "サーバー切り替え", "サーバー切り換え", "サーバー切替え", and "サーバー切換え" have been created and collated for a keyword "サーバ切り替え".

Secondly, where a keyword contains a word which succeeds to a prefix and has different expressions, it has been required to create all combinations of the presence/absence of the prefix and the different expressions of the word succeeding to the prefix, and then collate an input keyword with all those combinations.

Assuming, for example, that there are three words having the similar meaning and pronunciation but different expressions, i.e., "切り換え", "切替え" and "切換え", for "切り替え" (each kirikae=switching), a total of eight keywords, i.e., "全切り替え", "全切り換え", "全切替え", "全切換え", "切り替え", "切り換え", "切り換え", and "切替え" "換え" have been created and collated for a keyword "全切り替え (zenkirikae=full switching". Thus, the necessity of collating an input keyword with all of the created keywords has raised a problem that a long time is required for retrieval processing.

Thirdly, where a keyword contains a word which precedes a suffix and has different expressions, it has been required to create all combinations of the presence/absence of the suffix and the different expressions of the word preceding the suffix, and then collate an input keyword with all those combinations.

Assuming, for example, that there are three words having the similar meaning and pronunciation but different expressions, i.e., "切り換え", "切替え" and "切換え", for "切り替え" (each kirikae=switching), a total of eight keywords, i.e., "切り替え後", "切り換え後", "切替え後", "切換え後", "切り替え", "切り換え", "切替え", and "切換え" have been created and collated for a keyword "切り替え後 (kirikaego=after switching". Thus, the necessity of collating an input keyword with all of the created keywords has raised a problem that a long time is required for retrieval processing.

Fourthly, the conventional automatic keyword extraction process as disclosed in Japanese Unexamined Patent Publication No. 8-30627 is designed to set a limit in length of keywords and deleted the keywords which have a length beyond the limit. However, such a design employed in the process disclosed in Japanese Unexamined Patent Publication No. 8-30627 may cause a problem of uneven keyword extraction that, for keywords which have the similar meaning but different expressions and which are different in length, some keywords are extracted, but other keywords are deleted.

Assuming, for example, that "サーバー切り替えによる通信テストを行 (konpyubta=computer)"

and “サーバー (konpyuhtah=computer)” are registered as words having the similar meaning and pronunciation but different expressions, and a limit of the keyword length is set to be less than 15 characters, “サーバー切り替えによる通信テストを行 アーキテクチャー (konpyubta ahkitekuchah=computer architecture)” is extracted, but “サーバー アーキテクチャー (konpyuhtah ahkitekuchah=computer architecture)” is deleted.

Stated otherwise, when combinations of a compound word are created in accordance with the method disclosed in Japanese Unexamined Patent Publication No. 8-137892 to cope with retrieval for words having the similar meaning and pronunciation but different expressions, there has been a problem of uneven keyword extraction that, even upon the same retrieval key being designated, documents containing “サーバー切り替えによる通信テストを行 アーキテクチャー” are retrieved, but documents containing “サーバー” アーキテクチャー are not retrieved.

Fifthly, with the conventional keyword extraction process disclosed in Japanese Unexamined Patent Publication No. 8-30627, because character strings appearing in a sentence to be processed are cut out, as they are, to be used as keywords, words having the similar meaning and pronunciation but different expressions are extracted as separate words. Accordingly, there has been a problem that precise frequency totalization which is necessary for, e.g., a keyword weighting process, cannot be achieved for the words having the similar meaning and pronunciation but different expressions.

Sixthly, in compound words such as “う. 切り替え (yuza intafehsu=user interface), for example, symbolic characters such as “•” and “/” may be put between individual words composing the compound word; e.g., “う. 切り替え” and “う. 切り替え”, in addition to different expressions for each of the individual words composing the compound word; i.e., “う” and “切り替え”. It is therefore required to unify the expression format for compound words.

The conventional keyword extraction process disclosed in Japanese Unexamined Patent Publication No. 8-30627 includes a method of deleting “•” and “/” to unify the expression format for compound words, but it cannot deal with different expressions for each word which have the similar meaning and pronunciation, as described above. Also, Japanese Unexamined Patent Publication No. 8-137892 and No. 3-15980 disclose methods of creating combinations of different expressions for each word which have the similar meaning and pronunciation, but cannot deal with a process needed to unify the expression format for compound words. Accordingly, even if the above conventional techniques are combined with each other, an input keyword must be collated with all possible combinations of different expressions of individual words composing a compound word; hence a problem of requiring a long time for retrieval processing still remains.

Assuming, for example, that “う (yuhza=user)” has a different expression “ユーザー (yuhzah=user)” which has the similar meaning and pronunciation, and “切り替え (intafehsu=interface)” has a different expression of “インタフェイス (intafeisu=interface)”, four expressions “う”, “切り替え”,“うインタフェイス”, “ユーザー切り替え”, and “ユーザー切り替え” would be produced for “う. 切り替え” even if the above conventional techniques are combined with each other. Accordingly, a problem of requiring collation with all those different expressions is encountered.

Seventhly, in the methods disclosed in Japanese Unexamined Patent Publication No. 3-15980 and No. 8-137892, different expressions of a retrieval key, which have the similar meaning and pronunciation, are created at the time of retrieval in combinations of different expressions for each word and character string. As a result, a large number of retrieval keys to be collated are produced and a retrieval speed is reduced.

Furthermore, the methods disclosed in Japanese Unexamined Patent Publication No. 3-15980 and No. 8-137892 have a risk that an improper retrieval key may be produced when replacing a short word, in particular. For example, because the method disclosed in Japanese Unexamined Patent Publication No. 3-15980 holds a rule that “ター (tah)” is a different expression of “タ (ta)”, “インターフォーン (intahfohn=interphone)” is created as a different expression of “インタフォーン (intafohn=interphone)” in the step of creating a different expression of “インタフォーン (intafohn=interphone)”. However, the rule that “ター (tah)” is a different expression of “タ (ta)” can be applied to “インタフォーン”, but not to “タクシー (takushih=taxi)”, for example. It is therefore demanded to avoid a short word and store a relatively long word, such as a compound word, as information in a different expression dictionary used for replacement of one to another of different expressions. Hitherto, there have been no techniques to assist construction of a different expression dictionary responding to such a demand. As a result, a number of retrieval keys are produced and a problem that a keyword extraction method for realizing a high-speed document retrieval cannot be achieved has been encountered.

SUMMARY OF THE INVENTION

The present invention has been made to solve the problems as set forth above, and its object is to realize keyword extraction for high-speed document retrieval without increasing the number of combinations of different expressions of words serving as retrieval keys unlike the conventional document retrieval methods intended to cope with the problem caused by words having the similar meaning but different expressions, wherein in a keyword extraction process for creating an index assigned to the document, technical term storage means for storing technical terms along with different expressions thereof are referred to for assigning a Japanese document with keywords for technical terms appearing in the document after conversion of their different expressions into respective proper expressions, and at the time of retrieval, a different expression of an input word is converted into a corresponding proper expression with reference to the technical term storage means, followed by collation using the proper expression.

Another object is to realize keyword extraction for high-speed document retrieval without increasing the number of combinations of different expressions of words serving as retrieval keys regardless of the presence/absence of a prefix and different expressions of a technical term succeeding to the prefix, wherein when the technical term succeeding to the prefix is written in a different expression, the different expression of the technical term is replaced by the corresponding proper expression before assigning the technical term as a keyword to a document, and at the time of retrieval, a different expression of an input word is converted into a corresponding proper expression, followed by collation using the proper expression.

Still another object is to realize keyword extraction for high-speed document retrieval without increasing the number of combinations of different expressions of words serving as retrieval keys regardless of the presence/absence of a suffix and different expressions of a technical term preceding the suffix, wherein when the technical term preceding the prefix is written in a different expression, the different expression of the technical term is replaced by the corresponding proper expression before assigning the technical term as a keyword to a document, and at the time of retrieval, a different expression of an input word is converted into a corresponding proper expression, followed by collation using the proper expression.

Still another object is to realize keyword extraction wherein when a length of the extracted keyword is limited, the number of characters is counted based on the word after converting its different expression into a corresponding proper expression, thereby avoiding such an uneven extraction of keywords that some words are registered, but other words are deleted depending on difference in number of characters between different expressions of even those words which have the similar meaning.

Still another object is to realize keyword extraction wherein since keywords are extracted after replacing their different expressions by corresponding proper expressions, the words having the similar meaning but different expressions are avoided from being determined as separate words, and the keywords can be given with respective precise values of appearance frequency.

Still another object is to realize keyword extraction for high-speed document retrieval without increasing the number of combinations of different expressions of compound words serving as retrieval keys, wherein in a process of dealing with different expressions of a compound word, "•" and "/" appearing between words composing the compound word are deleted and a word resulted from replacing a different expression of each of the words composing the compound word by a corresponding proper expression is assigned as a keyword to a document, while at the time of retrieval, the similar processing is executed for an input compound word so that different expressions in the form of a compound word and different expressions for each of words composing the compound word can be dealt with in a unified manner.

Still another object is to realize keyword extraction for high-speed document retrieval without increasing the number of combinations of different expressions of compound words serving as retrieval keys, wherein for adding words to be registered in the technical term storage means used in the keyword extraction method according to the present invention, a set of words are created by combining different expressions of each of individual words composing a compound word based on both different expressions of general words of high frequency and different expressions of the technical terms registered in the technical term storage means, one in the created set of the words having different expressions is determined to be a proper expression, and pairs of each headword and the proper expression are registered in the technical term storage means, thereby assisting the operation of additionally registering words, which are necessary as technical terms, in the technical term storage means.

A keyword extraction apparatus according to a first aspect of the present invention technical term storage means for storing technical terms with proper expressions and different expressions thereof; basic word storage means for storing general basic words of high frequency; input means through which a sentence is input; technical-term segmentation point setting means for, when any of the technical terms stored in the technical term storage means exists in the sentence input through the input means, cutting out a range of that technical term from the input sentence; proper-expression replacing means for, when the technical term cut out by the technical-term segmentation point setting means is written in a different expression, replacing the different expression by a corresponding proper expression; character-type segmentation point setting means for detecting a difference in character type in the input sentence; basic-word segmentation point setting means for cutting out, from the input sentence, a range of any of the basic words stored in the basic word storage means; partial character string cutting means for cutting out partial character strings based on segmentation points set by the technical-term segmentation point setting means, the character-type segmentation point setting means and the basic-word segmentation-point setting means; and output means for outputting, as keywords, the partial character strings cut out by the partial character string cutting means.

A keyword extraction method according to a second aspect of the present invention includes an input step for inputting a sentence; a technical-term segmentation point setting step for, when any of technical terms in technical term storage means for storing technical terms with proper expressions and different expressions thereof exists in the sentence input in the input step, cutting out a range of that technical term from the input sentence; a proper-expression replacing step for, when the technical term cut out in the technical-term segmentation point setting step is written in a different expression, replacing a range of the technical term in the input sentence by a corresponding proper expression; a character-type segmentation point setting step for detecting a difference in character type in the input sentence; a basic-word segmentation point setting step for, when any of basic words in basic word storage means for storing, as the basic words, general words of high frequency exists in the input sentence, cutting out a range of any of the basic words from the input sentence; and a partial character string cutting step for cutting out, as keywords, partial character strings based on segmentation points set in the technical-term segmentation point setting step, the character-type segmentation point setting step and the basic-word segmentation point setting step.

A keyword extraction method according to a third aspect of the present invention further includes, when the sentence input in the input step is written in Japanese, a prefix segmentation point setting step for cutting out a range of any of prefixes in the Japanese input sentence by referring to prefix storage means for storing the prefixes, wherein the partial character string cutting step cuts out, as keywords, all relevant partial character strings based on the segmentation points set in the technical-term segmentation point setting step, the character-type segmentation point setting step, the basic-word segmentation point setting step, and the prefix segmentation point setting step.

A keyword extraction method according to a fourth aspect of the present invention further includes, when the sentence input in the input step is written in Japanese, a suffix segmentation point setting step for cutting out a range of any of suffixes in the Japanese input sentence by referring to suffix storage means for storing the prefixes, wherein the partial character string cutting step cuts out, as keywords, all relevant partial character strings based on the segmentation points set in the technical-term segmentation point setting step, the character-type segmentation point setting step, the basic-word segmentation point setting step, the prefix segmentation point setting step, and the suffix segmentation point setting step.

A keyword extraction method according to a fifth aspect of the present invention further includes a number-of-characters limiting step for deleting those ones of the keywords extracted in the partial character string cutting step which have a character string length outside a predetermined range, thereby providing redetermined keywords.

A keyword extraction method according to a sixth aspect of the present invention further includes a frequency totalizing step for counting appearance frequency of each of the keywords or the redetermined keywords extracted in the partial character string cutting step or the number-of-characters limiting step.

A keyword extraction method according to a seventh aspect of the present invention further comprises a symbolic-character segmentation point setting step for, when any of prescribed symbolic characters appears in the input sentence, cutting out that symbolic character, and a symbolic character deleting step for deleting the symbolic character cut out in the symbolic-character segmentation point setting step when the symbolic character is contained as one character in any of the keywords or the redetermined keywords extracted in the partial character string cutting step or the number-of-characters limiting step.

In a keyword extraction method according to an eighth aspect of the present invention, the technical term storage means stores technical terms which are created in a different expression adding step with the aid of different expressions registered in non-technical-term different expression storage means for storing different expressions of general words of high frequency and different expressions of the technical terms registered in the technical term storage means, the different expression adding step comprising a word dividing step for, when a technical term in the input sentence is a compound word, dividing the compound word into partial character strings composing the compound word, a different expression developing step for combining different expressions of the partial character strings with each other to create different expressions of the compound word, and a registering step for creating pairs of each of the created different expressions and a proper expression of the compound word, and registering the pairs in the technical term storage means.

A computer readable recording medium storing a keyword extraction program, according to a ninth aspect of the present invention, which includes an input sequence for inputting a sentence; a technical-term segmentation point setting sequence for, when any of technical terms in technical term storage means for storing technical terms with proper expressions and different expressions thereof exists in the sentence input in the input step, cutting out a range of that technical term from the input sentence; a proper-expression replacing sequence for, when the technical term cut out in the technical-term segmentation point setting step is written in a different expression, replacing a range of the technical term in the input sentence by a corresponding proper expression; a character-type segmentation point setting sequence for detecting a difference in character type in the input sentence; a basic-word segmentation point setting sequence for, when any of basic words in basic word storage means for storing, as the basic words, general words of high frequency exists in the input sentence, cutting out a range of any of the basic words from the input sentence; and a partial character string cutting sequence for cutting out, as keywords, all relevant partial character strings based on segmentation points set in the technical-term segmentation point setting sequence, the character-type segmentation point setting sequence and the basic-word segmentation point setting sequence.

BRIEF DESCRIPTION OF THE DRAWINGS

FIG. 2 is a representation showing one example of technical term storage means used in the present invention.

FIG. 3 is a representation showing one example of basic word storage means used in the present invention.

FIG. 4 is a representation showing one example of effective-part-of-speech succeeding hiragana-character-string storage means used in the present invention.

FIG. 8 is a representation showing successive states of an example of character string to be processed in the processing to set the technical-term segmentation points in the present invention.

FIG. 9 is a representation showing an intermediate state of the processing made on the example of character string to be processed in the present invention.

FIG. 10 is a representation showing successive states of an example of character string to be processed in the processing to set the technical-term segmentation points in the present invention.

FIG. 30 is a representation showing one example of data registered in prefix storage means used in the present invention.

FIG. 38 is a representation showing one example of data registered in suffix storage means used in the present invention.

FIG. 60 is a representation showing one example of non-technical-term different expression storage means used in the present invention.

DESCRIPTION OF THE PREFERRED EMBODIMENTS

Embodiment 1.

Figure 1:
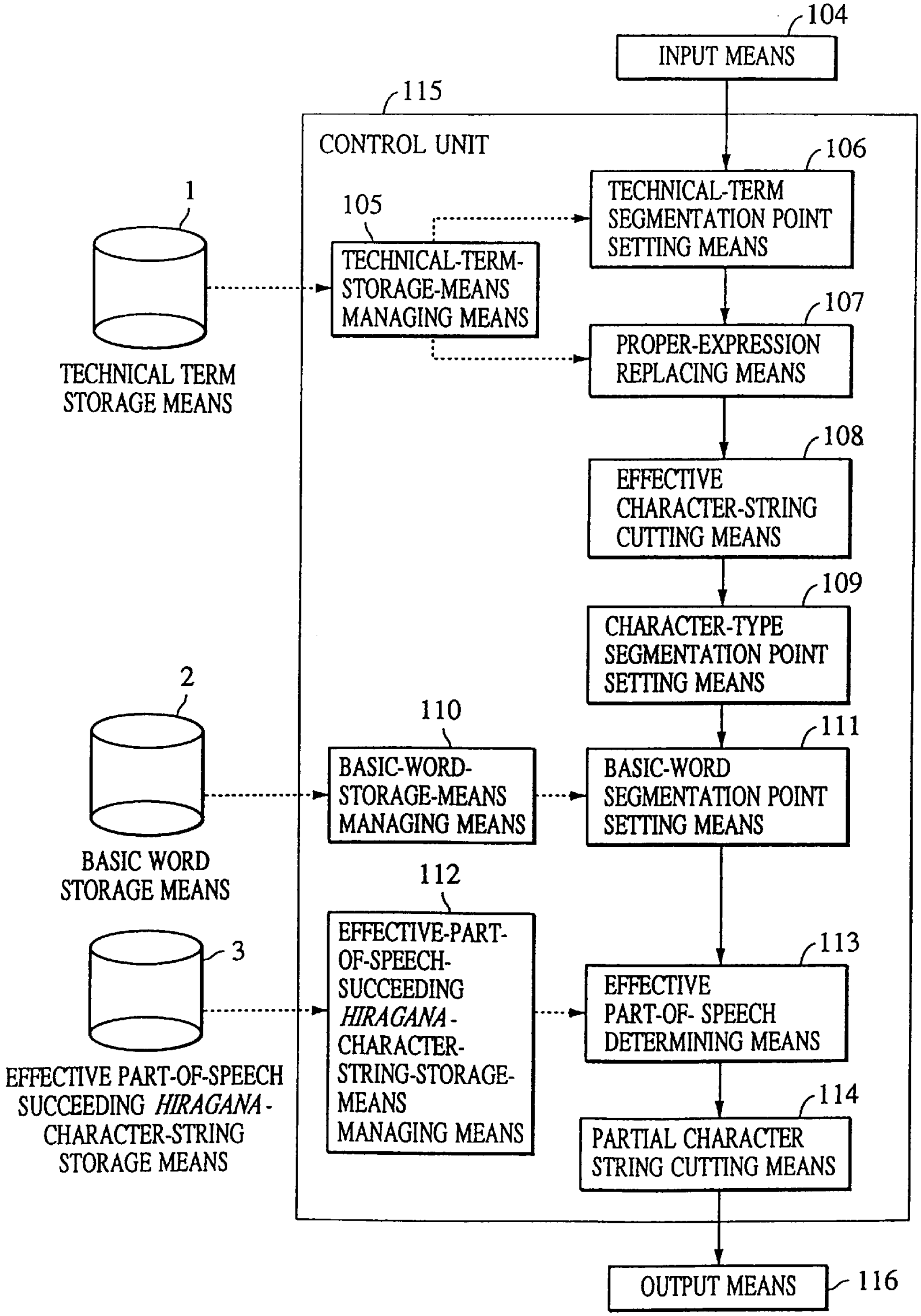
FIG. 1 is an overall block diagram of a keyword extraction apparatus according to Embodiment 1 of the present invention.

Embodiment 1 of the present invention will be described hereunder, taking a sentence in Japanese as an example. FIG. 1 is a block diagram showing one embodiment according to a first aspect of the present invention. In FIG. 1, denoted by 1 is technical term storage means for storing technical terms which are intimately related to the field of interest. As seen from FIG. 2 which shows one example of the technical term storage means 1, the storage means 1 is made up of two fields, i.e., one field of headword and the other field of proper expression corresponding to the headword. The word for which the proper expression field is blank means that the headword itself is a proper expression. Also, those headwords which have the same proper expression mean words having the similar meaning and pronunciation but different expressions (in written language); i.e., they are in relation of different expression to each other. In FIG. 2, for example, the headword "切り換え (kirikae=switching)" is a different expression of the proper expression "切り替え (kirikae=switching)". Also, "切り替え", "切り換え", "切替え" and "切換え" are in relation of different expression to each other.

Denoted by 2 is basic word storage mean for storing general basic words of high frequency. As seen from FIG. 3 which shows one example of the basic word storage means 2, the storage mean 2 is made up of one field of headword alone. Denoted by 3 is effective-part-of-speech succeeding hiragana-character-string storage mean for storing hiragana character strings succeeding to parts of speech which can serve as keywords (i.e., effective parts-of-speech), such as the stems of nouns, サ-column declinable nouns, and adjective verbs. As seen from FIG. 4 which shows one example of the storage means 3, the storage mean 3 is made up of one field of headword alone.

Denoted by 104 is input means through which a Japanese sentence to be subjected to the keyword extraction process is input to a control unit 115. The control unit 115 includes technical-term-storage-means managing means 105, technical-term segmentation point setting means 106, proper-expression replacing means 107, effective character-string cutting means 108, character-type segmentation point setting means 109, basic-word-storage- means managing means 110, basic-word segmentation point setting means 111, effective-part-of-speech-succeeding-hiragana-character-string storage-means managing means 112, effective part-of-speech determining means 113, and partial character string cutting means 114. The control unit 115 executes later-described data processing in accordance with control programs stored in ROM, RAM, etc. Denoted by 116 is output means through which keywords extracted by the control unit 115 are output to a file, display or any other suitable means.

Figure 5A:
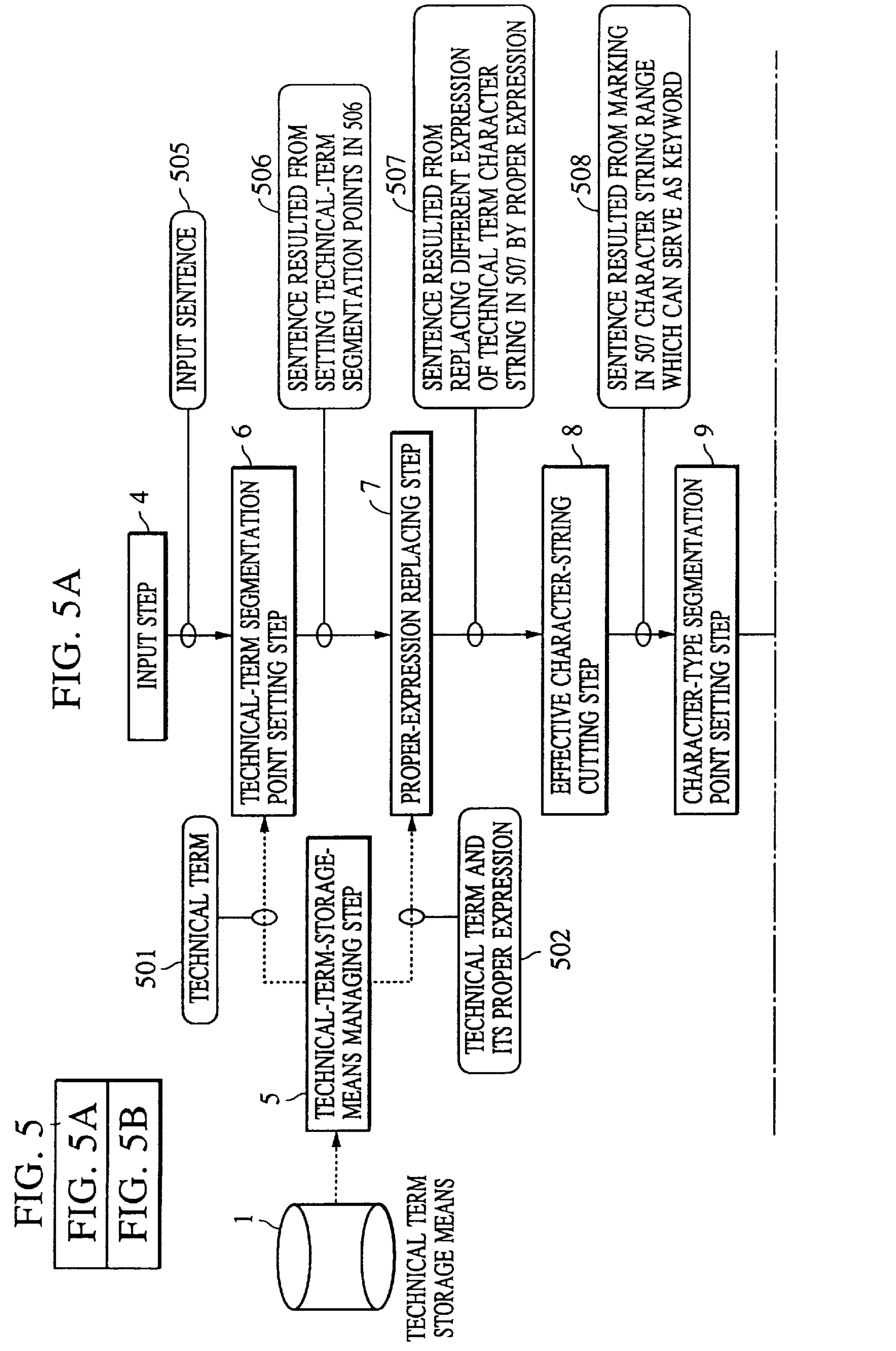
FIG. 5 is a flowchart showing a flow of data in a keyword extraction method according to Embodiment 1 of the present invention following successive steps.
Figure 5B:
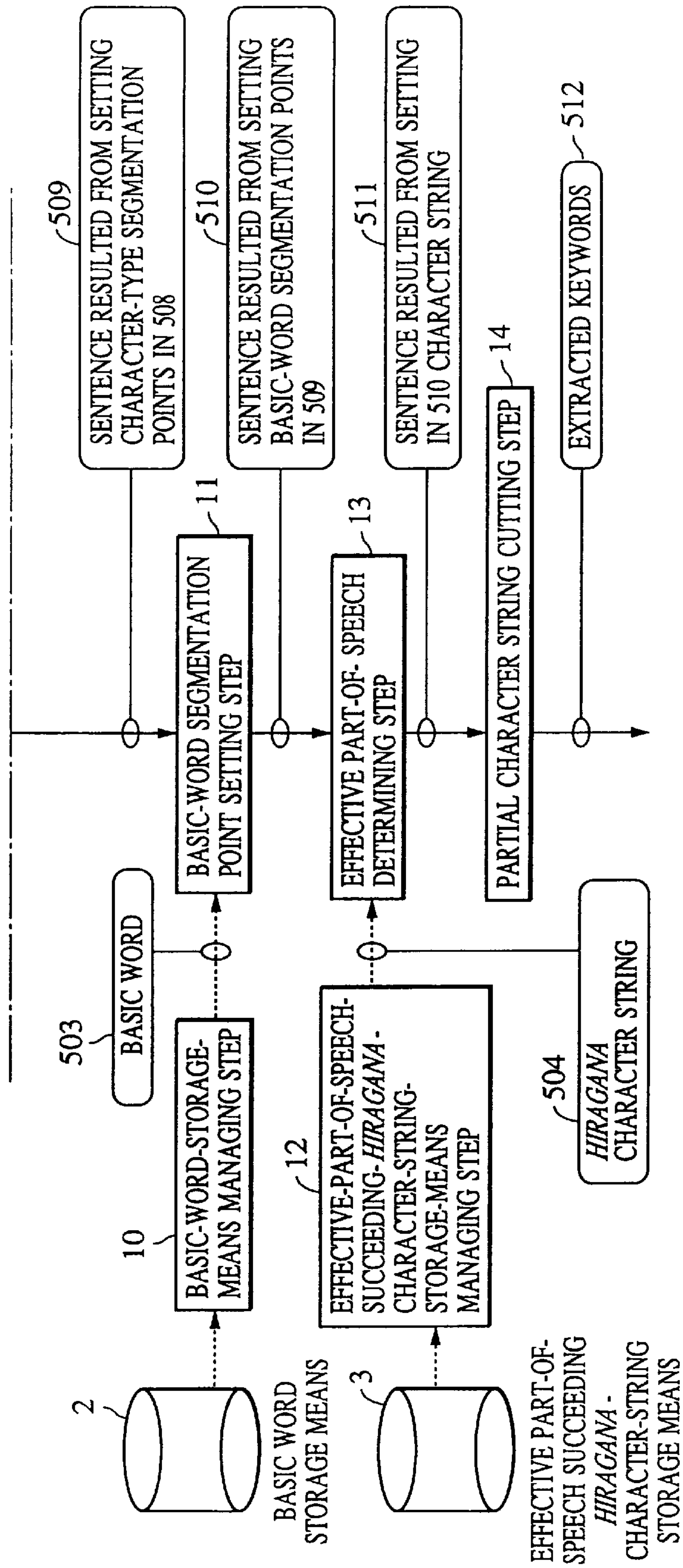

FIG. 5 is a flowchart representing a keyword extraction method of the present invention in accordance with successive step s corresponding to the various means in FIG. 1, and showing a flow of data from entry of a sentence to extraction of a keyword following the steps.

In FIG. 5, denoted by 4 is an input step in which a Japanese sentence is entered through the input means 104; 5 is a technical-term-storage-means managing step in which the technical-term-storage-means managing means 105 searches the technical term storage means 1 and takes out a technical term; and 6 is a technical-term segmentation point setting step in which the technical-term segmentation point setting means 106 extracts a character string, which matches with the technical term searched in the technical-term-storage-means managing step 5, from the input sentence and sets segmentation points before and behind the extracted character string. Denoted by 7 is a proper-expression replacing step in which, when the technical term searched in the technical-term-storage-means managing step 5 is a different expression with another word, the proper-expression replacing means 107 replaces the technical term in the input sentence by a proper expression.

Denoted by 8 is an effective character-string cutting step in which the effective character-string cutting means 108 cuts out, from the input sentence, character types which can serve as keywords (i.e., effective character types), such as kanji (Chinese characters), katakana (the square form of Japanese letters hiragana), alphabets and numerals, and technical terms. Denoted by 9 is a character-type segmentation point setting step in which the character-type segmentation point setting means 109 sets a character-type segmentation point for the character string cut out in the effective character-string cutting step 8, which is not itself a technical term, based on difference in character types such as kanji and hiragana. Denoted by 10 is a basic-word-storage-means managing step in which the basic-word-storage-means managing means 110 searches the basic word storage means 2 and takes out basic words. Denoted by 11 is a basic-word segmentation point setting step in which the basic-word segmentation point setting means 111 extracts a character string, which matches with the basic word searched in the basic-word-storage-means managing step 10, from the character strings cut out in the effective character-string cutting step 8 except technical terms and sets segmentation points before and behind the extracted character string.

Denoted by 12 is an effective-part-of-speech-succeeding-hiragana-character-string-storage-means managing step in which the effective-part-of-speech-succeeding-hiragana-character-string-storage-means managing means 3 searches the effective part-of-speech succeeding hiragana-character-string storage means 3. Denoted by 13 is an effective part-of-speech determining step in which the effective part-of-speech determining means 113 compares the character string succeeding each of the character strings cut out in the effective character-string cutting step 8 with the hiragana character string searched in the effective-part-of-speech-succeeding-hiragana-character-string-storage-means managing step 12, and when a head portion of the succeeding hiragana does not match with any of hiragana character strings stored in the effective part-of-speech succeeding hiragana-character-string storage means 5 and the last word in the effective character string is not a technical term, sets information that the last word in the effective character string cannot serve as a keyword.

Denoted by 14 is a partial character string cutting step in which the partial character string cutting means 114 cuts out a character string, which can serve as a keyword, based on the segmentation points set in the technical-term segmentation point setting step 6, the effective character-string cutting step 8, the character-type segmentation point setting step 9, and the basic-word segmentation point setting step 11.

The flow of data from entry of a sentence to extraction of a keyword will now be described following the successive steps.

In the technical-term-storage-means managing step 5, the technical term storage means 1 is searched and a searched technical term 501 is passed to the technical-term segmentation point setting step 6, whereas the technical term and its proper expression 502 are passed to the proper-expression replacing step 7. In the basic-word-storage-means managing step 10, the basic word storage means 2 is searched and a searched basic word 503 is passed to the basic-word segmentation point setting step 11. In the effective-part-of-speech-succeeding-hiragana-character-string-storage-means managing step 12, the effective part-of-speech succeeding hiragana-character-string storage means 3 is searched and a hiragana character string 504 succeeding to the effective part-of-speech is passed to the effective part-of-speech determining step 13.

In the input step 4, an input sentence 505 is passed to the technical-term segmentation point setting step 6. The technical-term segmentation point setting step 6 receives both the input sentence 505 and the technical term 501, and outputs a sentence 506 resulted from setting, as technical-term segmentation points, a start-of-technical-term segmentation point and an end-of-technical-term segmentation point in the input sentence 505. The proper-expression replacing step 7 receives both the sentence 506 and the technical term and its proper expression 502, and outputs a sentence 507 resulted from, when the technical term contained in the sentence 506 is written in a different expression, replacing the different expression by a proper expression.

The effective character-string cutting step 8 outputs a sentence 508 in which a start-of-effective-character-string point and an end-of-effective-character-string point are set to mark, as a character string which can serve as a keyword (i.e., effective character string), a character string range of effective character types in the sentence 507 and of technical term set in the sentence 507.

The character-type segmentation point setting step 9 receives the sentence 508 and outputs a sentence 509 resulted from setting, in the sentence 508, a character-type segmentation point for the character string range of the effective character string which is not itself a technical term.

The basic-word segmentation point setting step 11 receives both the sentence 509 and the basic word 503 and outputs a sentence 510 in which a start-of-basic-word segmentation point and an end-of-basic-word segmentation point are set as basic-word segmentation points at a position, where the basic word 503 appears in the sentence 509, for the character string range of the effective character string which contains no technical term.

The effective part-of-speech determining step 13 receives, as inputs, both the sentence 510 and the hiragana character string 504 registered in the effective part-of-speech succeeding hiragana-character-string storage means 3, and outputs a sentence 511 for which each character string in the sentence 510, which cannot serve as a keyword, has been determined.

The partial character string cutting step 14 receives the sentence 511 and extracts and outputs keywords 512 in the input sentence based on the technical-term segmentation points set in the technical-term segmentation point setting step 6, the effective character strings set in the effective character-string cutting step 8, the character-type segmentation points set in the character-type segmentation point setting step 9, the basic-word segmentation points set in the basic-word segmentation point setting step 11, and the determination made in the effective part-of-speech determining step 14 on the character strings which cannot serve as keywords.

Figure 6:
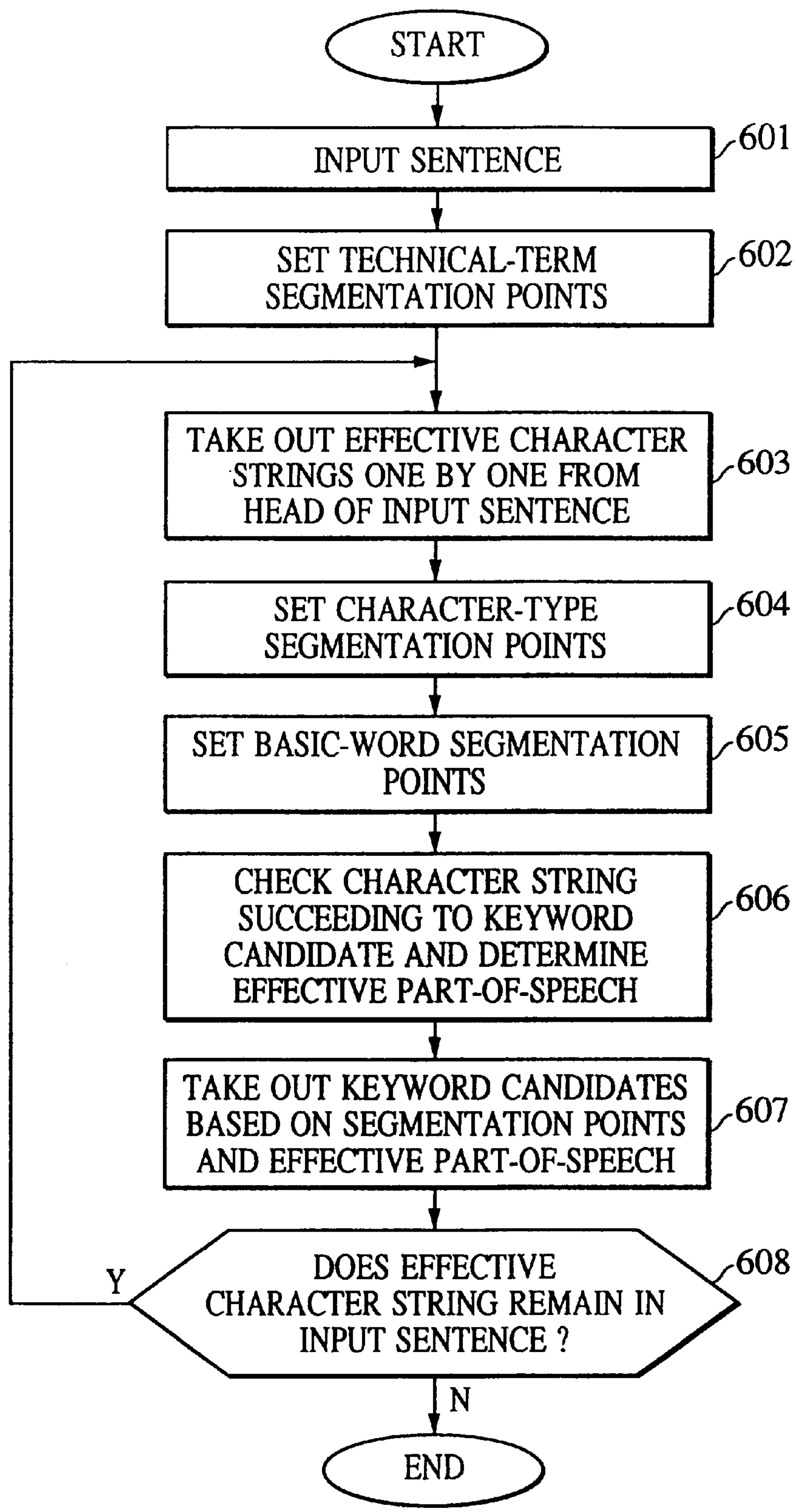
FIG. 6 is a flowchart showing the operation of the keyword extraction method according to Embodiment 1 of the present invention.

FIG. 6 is a flowchart showing the operation of one embodiment according to the first aspect of the present invention. The following description will be made on processing of, for example, a Japanese sentence "サーバー切り替えによる通信テストを行う (sahbah kirikae niyoru tsuushin tesuto wo okonau.=A server is switched over to perform a communication test.)". First, in step 601, the Japanese sentence is input through a keyboard or file. Then, in step 602, technical-term segmentation points are set in the input sentence.

Figure 7:
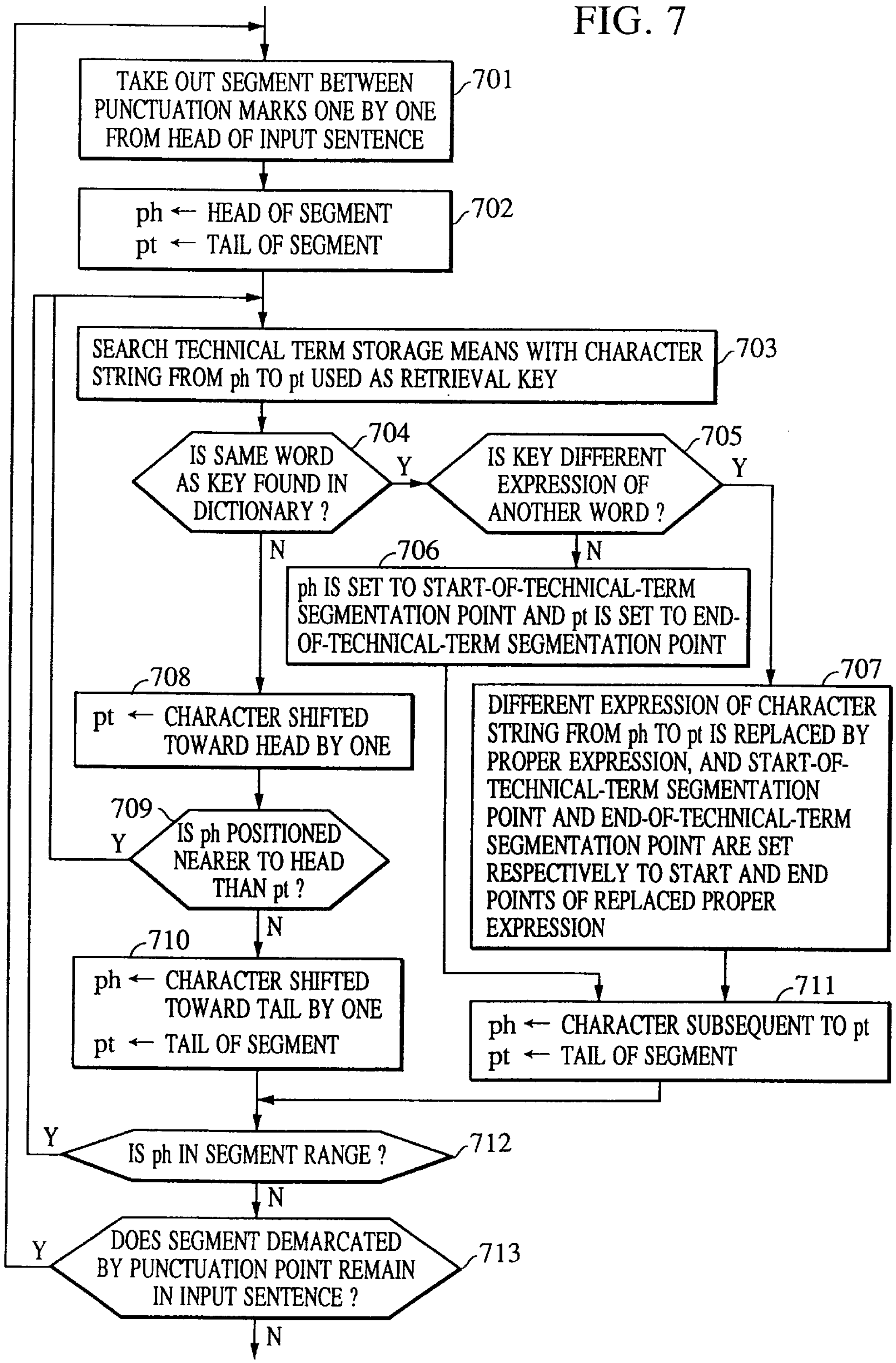
FIG. 7 is a flowchart showing the operation of processing to set technical-term segmentation points in the present invention.

FIG. 7 is a flowchart showing a flow of the processing to set the technical-term segmentation points in step 602. In step 701, a character string or segment up to the first punctuation point in the input sentence is taken out. In the illustrated example, the step 701 finds a full stop "。" and takes out the whole of input sentence "サーバー切り替えによる通信テストを行う".

Then, in step 702, the head and tail of the segment are marked by pointers. In the illustrated example, a pointer ph is set to the head character "サ" of the segment and a pointer pt is set to the tail character "う" of the segment.

Subsequently, in step 703, the technical term storage means 1 is searched by using the character string from ph to pt as a retrieval key. In the illustrated example, the input sentence "サーバー切り替えによる通信テストを行う" is used as a retrieval key as it is. It is then checked whether or not the same word as the key exists in the technical term storage means 1. Assuming that a technical term "サーバー切り替えによる通信テストを行う" is not registered in the technical term storage means 1, the processing follows the path indicated by N and goes to step 708 where pt is shifted one character toward the head. As a result, pt now points "行". Next, it is checked in step 709 whether or not ph is positioned nearer to the head than pt. In this case, since ph is positioned nearer to the head than pt, the processing follows the path indicated by Y and returns to step 703 for searching the technical term storage means 1 again with the character string from ph to pt used as a retrieval key. The retrieval key at this time is given by "サーバー切り替えによる通信テストを行".

By repeating the above operation, the characters composing the segment are deleted one by one from the tail, as shown in FIG. 8. It is assumed that upon the retrieval key being given by "サーバー", the same word as the retrieval key is found in the technical term storage means 1. In this case, therefore, the processing follows the path indicated by Y from step 704 and goes to step 705 for checking whether or not the retrieval key is a different expression of another word. On condition that the words shown in FIG. 2 are registered in the technical term storage means 1, since there is a proper expression "サーバ" for "サーバー", the processing follows the path indicated by Y from step 705 and goes to step 707 where the different expression of a character string portion in the sentence corresponding to the technical term is replaced by the proper expression, and the start-of-technical-term segmentation point and the end-of-technical-term segmentation point are set respectively to start and end points of the replaced proper expression. The result of the processing made on the input character string so far is shown in FIG. 9.

After that, in step 711, ph is set to the character subsequent to pt and pt is set to the character at the tail of the segment demarcated by the punctuation point. In the illustrated example, ph is set to the position of "切" and pt is set to the position of "う". It is then checked in step 712 whether ph is in the segment range demarcated by the punctuation point. In this case, since ph is in the segment range, the processing follows the path indicated by Y and returns to step 703 for searching the technical term storage means 1 again with the character string from ph to pt used as a retrieval key.

Figure 11:
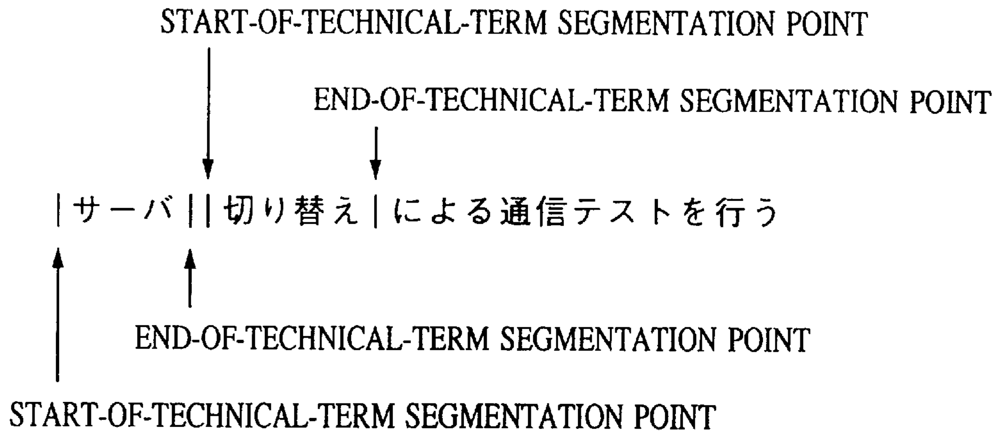
FIG. 11 is a representation showing an intermediate state of the processing made on the example of character string to be processed in the present invention.

As with the processing for the first input character string, the characters composing the character string are deleted one by one from the tail, as shown in FIG. 10. Assuming that the same word as the retrieval key is found in the technical term storage means 1 upon the retrieval key being given by "切り替え", the processing follows the path indicated by Y from step 704 and goes to step 705 for checking whether or not the retrieval key, i.e., "切り替え", is a different expression of another word. On condition that the words shown in FIG. 2 are registered in the technical term storage means 1, since "切り替え" is itself a proper expression, the processing follows the path indicated by N from step 705 and goes to step 706 where the start-of-technical-term segmentation point is set before the character pointed by ph and the end-of-technical-term segmentation point is set behind the character pointed by pt. The result of the processing made on the remaining character string so far is shown in FIG. 11.

After that, for "による通信テストを行う", the technical term storage means 1 is likewise searched while the characters composing the segment demarcated by the punctuation point are deleted one by one from the tail. If no matching technical term is found in the dictionary until ph is shifted to the head, then the processing goes to step 710 where ph is shifted one character toward the tail and pt is set to the tail of the segment, followed by searching the technical term storage means 1.

It is assumed that, as a result of repeating the similar processing as described above, any of the character strings registered in the technical term storage means 1 is not found in the remaining character string. In this case, upon pt being shifted outside the segment range demarcated by the punctuation point, the determination in step 712 is responded by NO (indicated by N), and no more segment demarcated by the punctuation point remains. Accordingly, the determination in step 713 is responded by NO, thereby completing the technical-term segmentation point setting process shown in FIG. 7.

Figure 12:
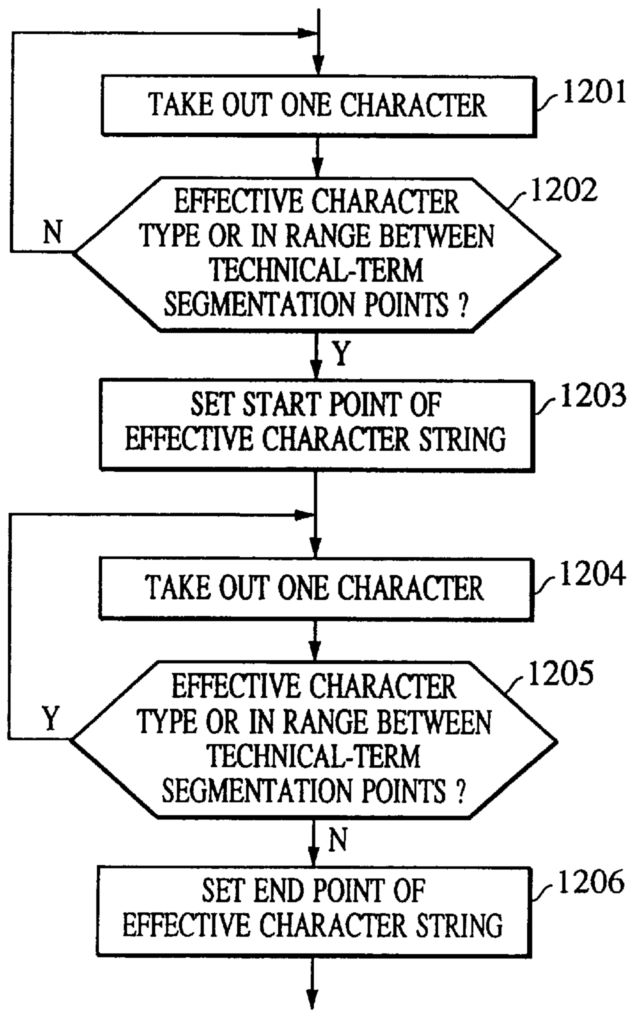
FIG. 12 is a flowchart showing the operation of processing to take out effective character strings in the present invention.

Next, in step 603 of FIG. 6, effective character strings are taken out one by one from the head of the input sentence. FIG. 12 shows a flow of processing to take out the effective character strings.

The character string to be processed is "サーバ切り替えによる通信テストを行う" shown in FIG. 11. First, in step 1201, one character is taken out from the character string. In this case, "サ" is taken out, followed by checking in step 1202 whether or not "サ" is the effective character types or it is in the range between the technical-term segmentation points. The effective character types include kanji, katakana, alphabets and numerals. Since "サ" is katakana, i.e., an effective character type, is positioned between the start-of-technical-term segmentation point and the end-of-technical-term segmentation point, the start point of the effective character string is set before "サ" in step 1203. Then, the next character "ー" is taken out in step 1204. It is then checked in step 1205 whether or not "ー" is the effective character type or it is in the range between the technical-term segmentation points. At this time, since a long sound "ー" subsequent to katakana is also regarded as katakana and "ー" is positioned between the technical-term segmentation points, the processing follows the path indicated by Y and takes out the next character "バ" in step 1204.

Repeating the similar processing as described above, at "に" of "サーバ切り替えに", the determination in step 1205 is responded by NO and a position behind "え" is set in step 1206 as the end point of the effective character string. As a result of the above processing, the first effective character string "サーバ切り替え" is taken out.

Figure 13:
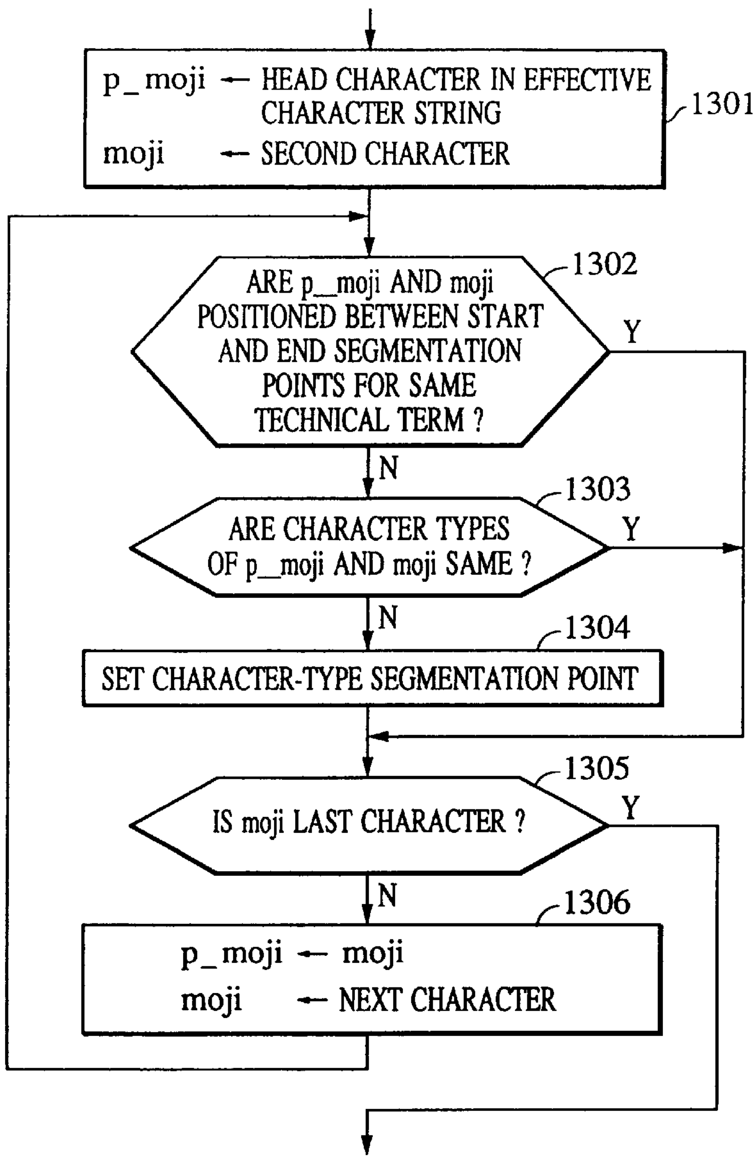
FIG. 13 is a flowchart showing the operation of processing to set a character-type segmentation point.

After that, a character-type segmentation point is set in step 604 of FIG. 6. FIG. 13 is a flowchart showing a flow of processing to set the character-type segmentation point. A character string to be processed is the effective character string "サーバ切り替え" in the illustrated example. First, in step 1301, "サ", i.e., the head character in the effective character string, is assigned to p_moji and "ー", i.e., the second character in the segment, is assigned to moji. It is then checked in step 1302 whether or not p_moji and moji are positioned between the start and end segmentation points for the same technical term. In the illustrated example, since both p_moji and moji are positioned in the range of the same technical term "サーバ", the processing follows the path indicated by Y from step 1302.

Next, it is checked in step 1305 whether or not moji is the last character in the effective character string. In this case, the processing follows the path indicated by N and goes to step 1306 where the positions of p_moji and moji are shifted one character rearward. Subsequently, the processing returns to step 1302 for checking again whether or not both p_moji and moji are positioned in the range of the same technical term.

Repeating the similar processing as described above, upon p_moji indicating "バ" and moji indicating "切", the determination in step 1302 is responded by NO and the processing goes to step 1303 for checking whether or not the character types of p_moji and moji are the same. In this case, since the character type of "バ" of is katakana and the character type of "切" is kanji, the processing follows the path indicated by N from step 1303. Then, in step 1304, a character-type segmentation point is set between p_moji and moji.

Figure 14:
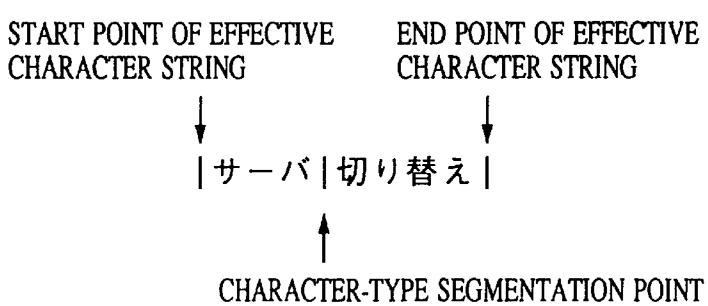
FIG. 14 is a representation showing an intermediate state of the processing made on the example of character string to be processed in the present invention.

Repeating the similar processing as described above for the segment example of "サーバ切り替え", no more character-type segmentation point is set, and upon moji indicating the last character in step 1305, the processing follows the path indicated by N from step 1305 and goes out of the processing routine of FIG. 13. As a result, the character-type segmentation point is set between "バ" and "切", as shown in FIG. 14.

Figure 15:
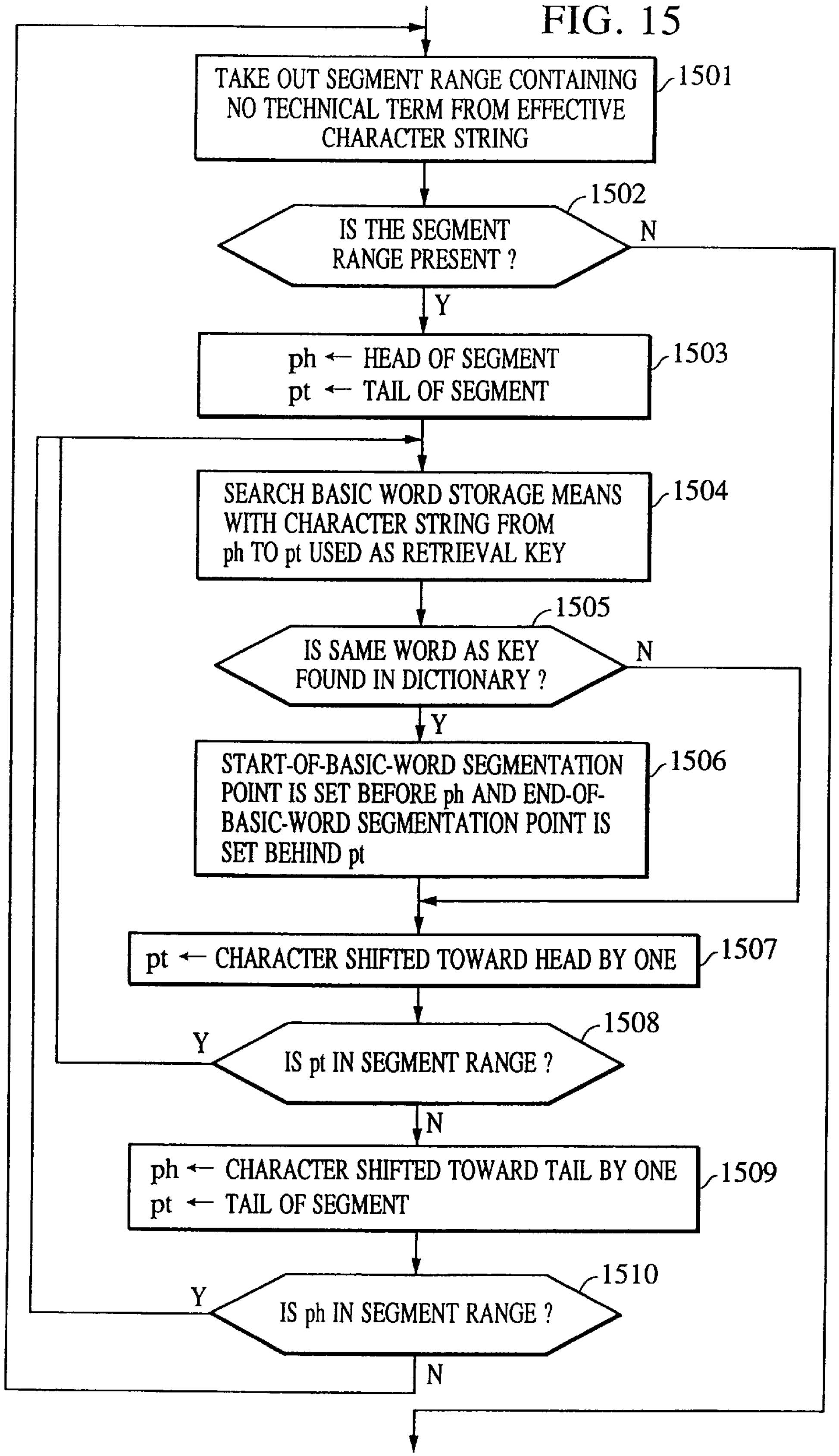
FIG. 15 is a flowchart showing the operation of processing to set basic-word segmentation points in the present invention.

Thereafter, the basic-word segmentation points are set in step 605 of FIG. 6. FIG. 15 is a flowchart showing a flow of processing to set the basic-word segmentation points. A character string to be processed is the effective character string "サーバ切り替え" in the illustrated example.

First, in step 1501, a segment range containing no technical terms is taken out from the effective character string. Details of processing in step 1501 is shown in a flowchart of FIG. 16.

Figure 16:
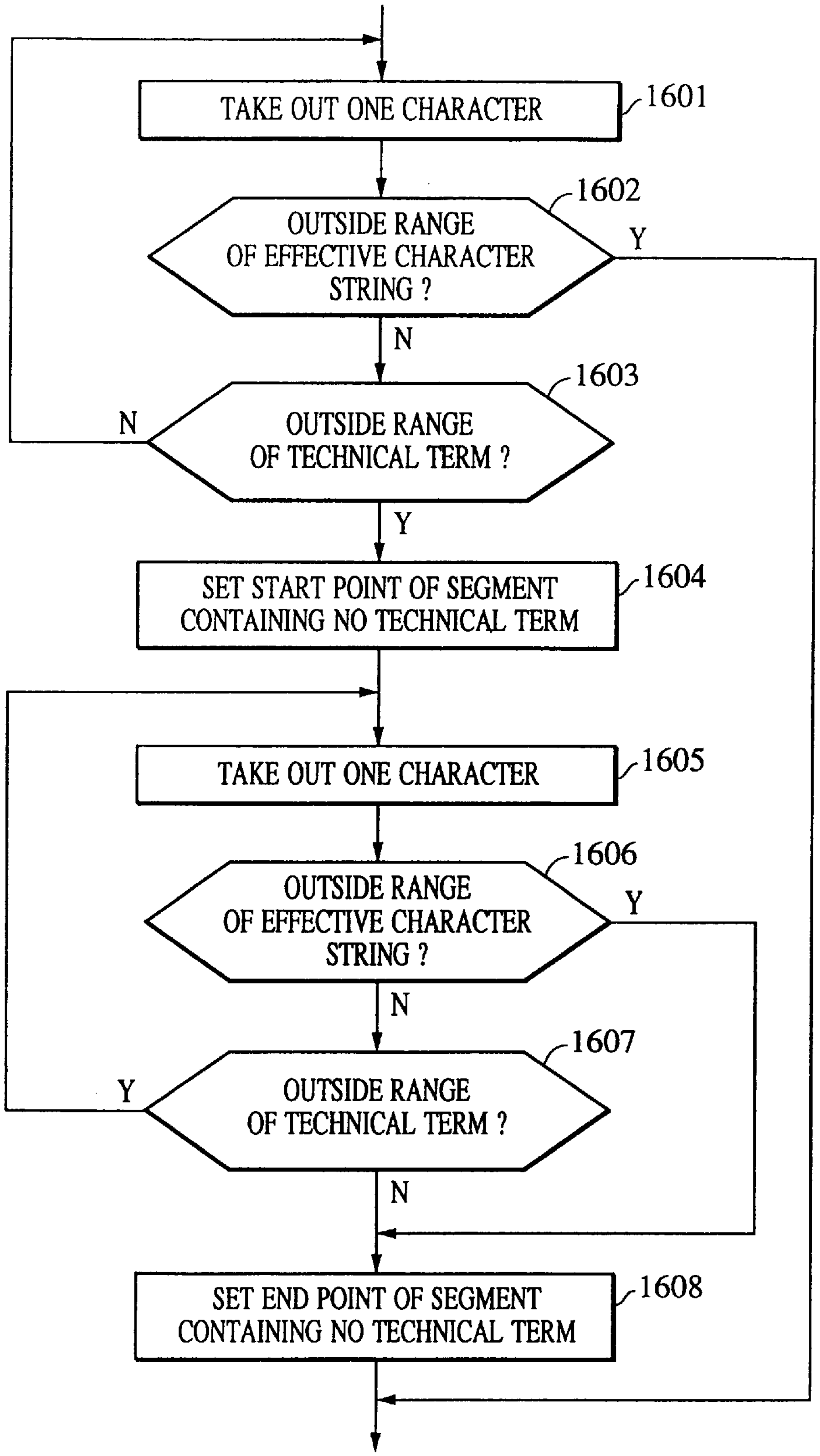
FIG. 16 is a flowchart showing the operation of taking out a segment range, which contains no technical term, from an effective character string in the present invention.

In step 1601 of FIG. 16, one character is taken out. In this case, "サ" is taken out. It is then checked in step 1602 whether or not "サ" is outside the range of effective character string. Since "サ" is in the range of effective character string, the processing follows the path indicated by N from step 1602. Next, it is checked in step 1603 whether or not "サ" is outside the range of technical term. Since "サ" is in the range of technical term, the processing follows the path indicated by N and returns to step 1601 for taking out the next character "ー".

Repeating the similar processing as described above, since all characters of "サーバ切り替え" are in the range of technical term, the character finally taken out in step 1601 is outside the range of effective character string, whereupon the processing follows the path indicated by Y from step 1602. The processing routine of FIG. 16 is thus completed without taking out the segment which contains no technical term, followed by returning to step 1502 in FIG. 15.

It is then checked in step 1502 of FIG. 15 whether or not there is a segment which contains no technical term. Since the processing routine of FIG. 16 has determined that there is not a segment which contains no technical term, the processing follows the path indicated by N from step 1502 and goes out of the processing routine of FIG. 15 without setting the basic-word segmentation points.

Figure 17:
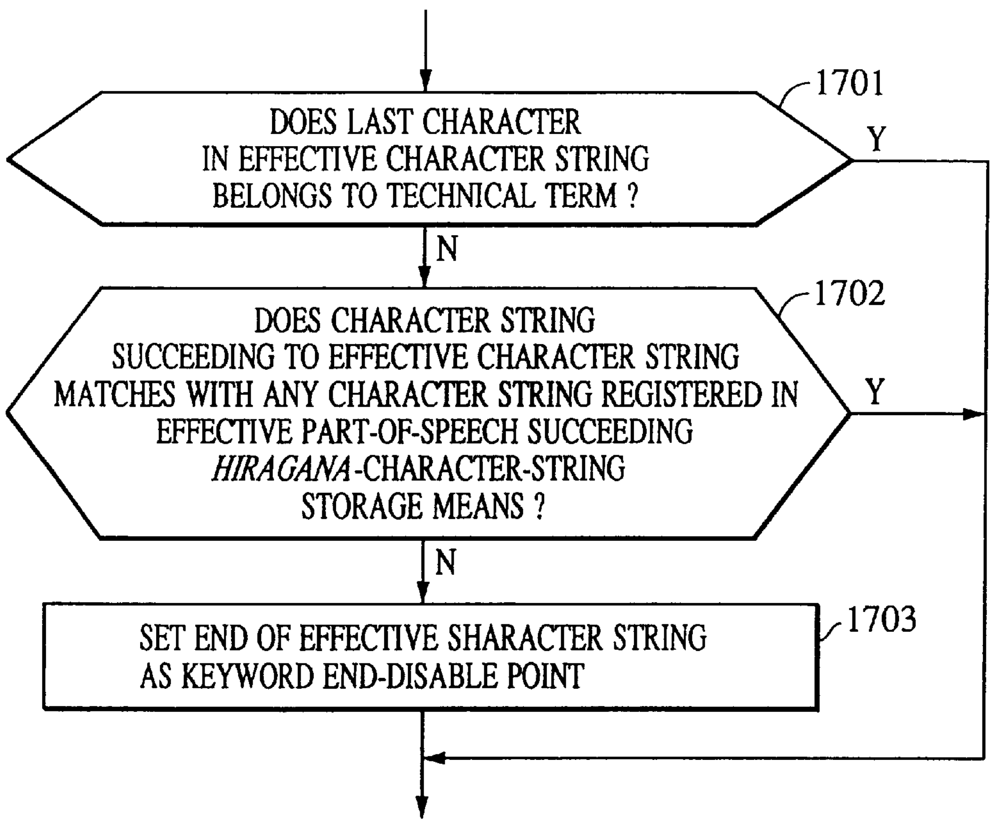
FIG. 17 is a flowchart showing the operation of processing to determine an effective part-of-speed in the present invention.

Next, in step 606 of FIG. 6, the character string succeeding to a keyword candidate is checked to determine whether or not the keyword candidate is an effective part-of-speech. FIG. 17 is a flowchart showing a flow of processing to determine the effective part-of-speech. In step 1701, it is checked whether or not the last character in the effective character string belongs to a technical term. In this case, since the end-of-technical-term segmentation point is set behind "え" in "サーバ切り替え", the determination in step 1701 is responded by YES (indicated by Y) and the processing goes out of the processing routine of FIG. 17, followed by returning to step 607 of FIG. 6.

Figure 18:
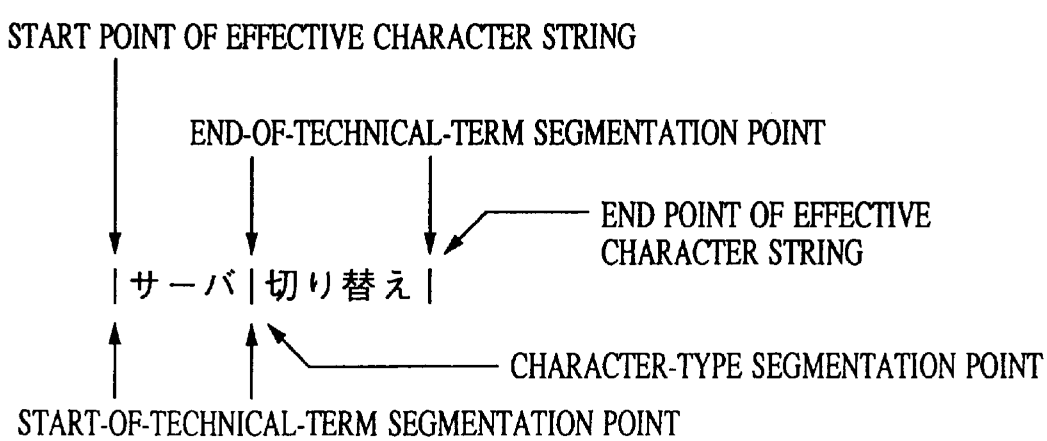
FIG. 18 is a representation showing an intermediate state of the processing made on the example of character string to be processed in the present invention.

As a result of the processing executed so far, the segmentation points are set in the first the effective character string, as shown in FIG. 18.

Figure 19:
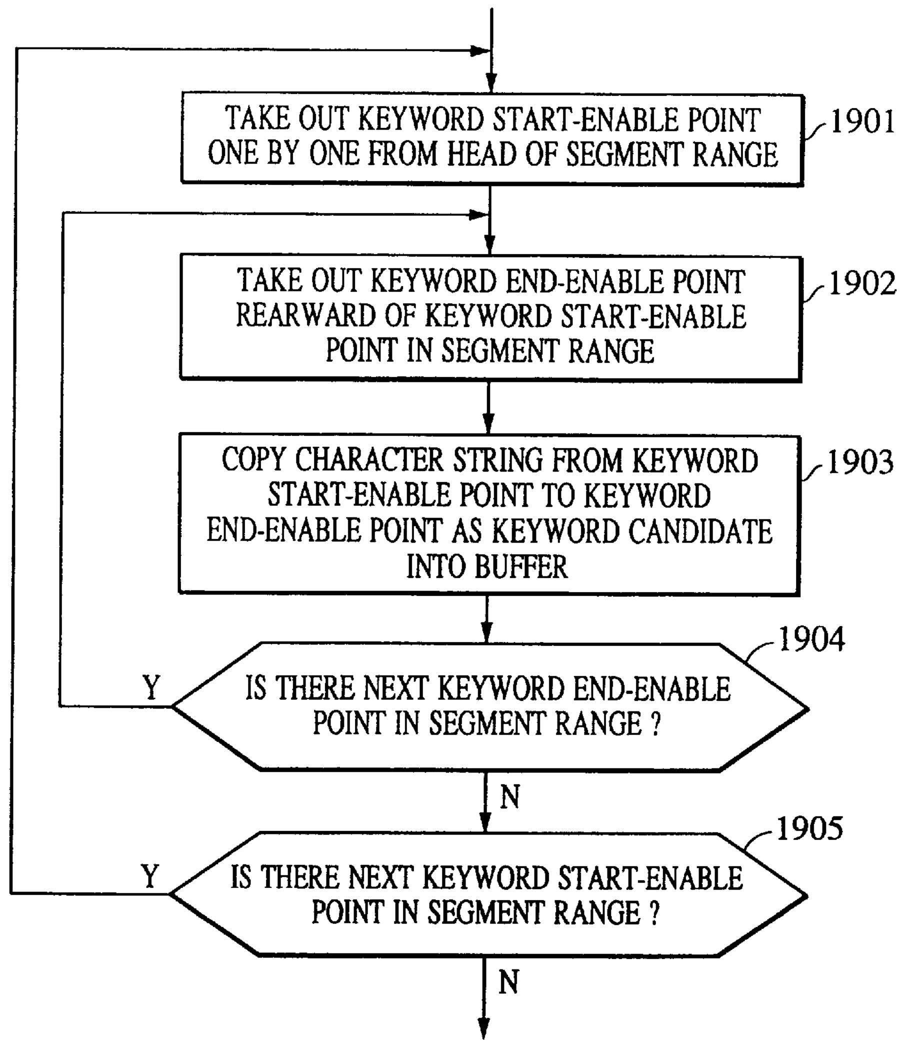
FIG. 19 is a flowchart showing the operation of processing to take out a keyword candidate in the present invention.

Subsequently, in step 607 of FIG. 6, keyword candidates are taken out based on the segmentation points and the effective part-of-speech. FIG. 19 is a flowchart showing a flow of processing to take out the keyword candidates. First, in step 1901, a keyword start-enable point is taken out one by one from the head of the effective character string.

In this embodiment, the keyword start-enable point is assumed to be given by any of the start-of-technical-term segmentation point, the start point of the effective character string, the start-of-basic-word segmentation point, and the character-type segmentation point. Also, a keyword end-enable point is assumed to be given by any of the end-of-technical-term segmentation point, the end point of the effective character string, the end-of-basic-word segmentation point, and the character-type segmentation point. Further, it is assumed that the position for which a keyword end-disable point has been set by the effective part-of-speech determining process cannot serve as the keyword end-enable point.

In the illustrated example, the start-of-technical-term segmentation point and the start point of the effective character string both set before "サ", shown in FIG. 18, are taken out as the keyword start-enable point in step 1901. Next, in step 1902, the keyword end-enable point rearward of "サ" is taken out. Since the keyword end-enable point is given by the end-of-technical-term segmentation point and the character-type segmentation point between "バ" and "切", the character string "サーバ" from the keyword start-enable point to the keyword end-enable point is copied as a keyword candidate into a buffer in step 1903.

Subsequently, it is checked in step 1904 whether or not any keyword end-enable point still remains rearward of the keyword start-enable point. In this case, the processing follows the path indicated by Y and returns to step 1902 where the end-of-technical-term segmentation point and the end point of the effective character string both set behind "え" are taken out as a keyword end-enable point. Then, in step 1903, the character string "サーバ切り替え" from the keyword start-enable point to the keyword end-enable point is copied as a keyword candidate into the buffer.

Since there is no keyword end-enable point rearward of "え", the determination in step 1904 is responded by N and the processing goes to step 1905 for checking the presence of a next keyword start-enable point. In this case, since the start-of-technical-term segmentation point and the character-type segmentation point are set between "バ" and "切", the processing follows the path indicated by Y and returns to step 1901 where the position between "バ" and "切" is taken out as a keyword start-enable point. Next, in step 1902, the end-of-technical-term segmentation point behind "え" are taken out as a keyword end-enable point. Then, in step 1903, the character string "切り替え" from the keyword start-enable point to the keyword end-enable point is copied as a keyword candidate into the buffer.

Further, since there is neither keyword end-enable point nor keyword start-enable point rearward of "え", the determinations in steps 1904 and 1905 are both responded by N and the processing goes out of the processing routine of FIG. 19, followed by returning to step 608 of FIG. 6. As a result of the above routine for the keyword candidate extraction process, three keyword candidates, i.e., "サーバ", "サーバ切り替え" and "切り替え", are taken out.

Subsequently, it is checked in step 608 of FIG. 6 whether or not any effective character string still remains in the input sentence. In this case, the processing follows the path indicated by Y and returns to step 603 for taking out a next effective character string. The characters following "に" are checked one by one in accordance with the flowchart of FIG. 12 whether or not each character is the effective character type or it is in the range between the technical-term segmentation points. As a result, "通信テスト (tsuushin tesuto= communication test" is taken out as a next effective character string.

After that, in step 604 of FIG. 6, the character-type segmentation point is set. FIG. 13 is the flowchart showing the flow of processing to set the character-type segmentation point. A character string to be now processed is "通信テスト". First, in step 1301, "通", i.e., the head character of "通信テスト", is assigned to p_moji and "信", i.e., the second character of "通信テスト", is assigned to moji. It is then checked in step 1302 whether or not p_moji and moji are positioned between the start and end segmentation points for the same technical term. In this case, since there is no technical term in the effective character string, the processing follows the path indicated by N. It is then checked in step 1303 whether or not the character types of p_moji and moji are the same. Since the character types of p_moji and moji are both kanji, the processing follows the path indicated by Y from step 1303.

Next, it is checked in step 1305 whether or not moji is the last character in the effective character string. In this case, the processing follows the path indicated by N and goes to step 1306 where the positions of p_moji and moji are shifted one character rearward. Subsequently, the processing returns to step 1302 for checking again whether or not both p_moji and moji are positioned in the range of the same technical term. The determination in step 1302 is now responded by NO and the processing goes to step 1303. Since the character type of "信" indicated by p_moji is kanji and the character type of "テ" indicated by moji is katakana, the determination in step 1303 is now responded by NO. Accordingly, in step 1304, a character-type segmentation point is set between p_moji and moji.

Figure 20:
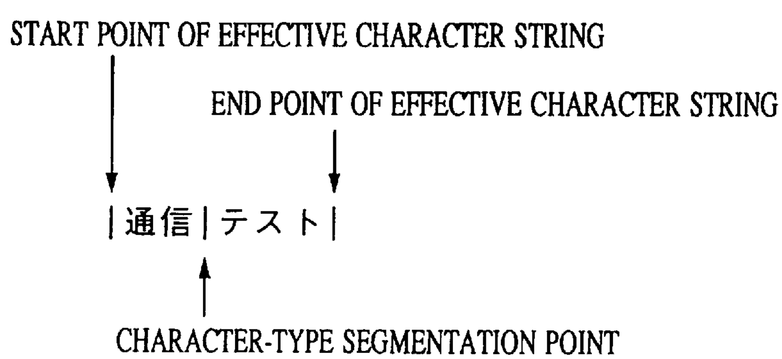
FIG. 20 is a representation showing an intermediate state of the processing made on an example of character string to be processed in the present invention.

As a result of continuing the similar processing as described above for the effective character string "通信テスト" until moji points the last character in the effective character string, the character-type segmentation point is set between "信" and "テスト", as shown in FIG. 20.

Thereafter, the basic-word segmentation points are set for "通信テスト" in step 605 of FIG. 6. FIG. 15 is the flowchart showing the flow of processing to set the basic-word segmentation points.

First, in step 1501, a segment range containing no technical terms is taken out from the effective character string. As with the above-mentioned "サーバ切り替え", the processing in step 1501 is executed in accordance with the flowchart of FIG. 16. In step 1601, one character "通" is taken out. Since "通" is in the range of effective character string, the processing follows the path indicated by N from step 1602. Further, since "通" is outside the range of technical term, the processing follows the path indicated by Y from step 1603. Next, in step 1604, the start point of the segment range containing no technical terms is set before "通". Subsequently, in step 1605, one character "信" is taken out. Since "信" is in the range of effective character string, the processing follows the path indicated by Y from step 1606. Further, since "信" is outside the range of technical term, the processing follows the path indicated by Y from step 1607, followed by taking out one character in step 1605 again.

Repeating the similar processing as described above, upon exceeding "ト" of "通信テスト", the taken-out character is positioned outside the range of the effective character string, whereupon the determination in step 1606 is responded by YES and the end point of the segment range containing no technical terms is set behind "ト" in step 1608.

Returning to FIG. 15 again, it is then checked in step 1502 whether or not there is a segment which contains no technical term. In this case, since "通信テスト" is present as a segment range which contains no technical term, the processing follows the path indicated by Y from step 1502.

Then, in step 1503, a pointer ph is assigned to the head character "通" of the segment range which contains no technical term, and a pointer pt is assigned to the tail character "ト" of the segment range. Subsequently, in step 1504, the basic word storage means 2 is searched by using the character string from ph to pt as a retrieval key. In this case, the retrieval key is given by "通信テスト". Assuming that a basic word "通信テスト" is not registered in the basic word storage means 2, the processing follows the path indicated by N from step 1505 and goes to step 1507 where pt is shifted one character toward the head so as to point "ス". It is then checked in step 1508 whether or not ph is positioned nearer to the head than pt. In this case, the processing follows the path indicated by Y and returns to step 1504 for searching the basic word storage means 2 again with "通信テス" now used as a retrieval key.

Figure 21:
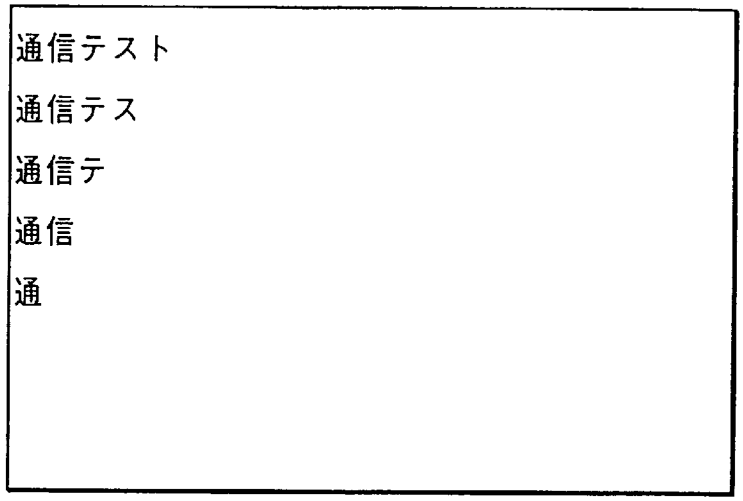
FIG. 21 is a representation showing successive states of the example of character string to be processed in the processing to set the basic-word segmentation points in the present invention.

Searching the basic word storage means 2 is repeated while using, as the retrieval key, a character string which is given by deleting characters of the segment range one by one from the tail, as shown in FIG. 21. Assuming that a word "通信" is registered in the basic word storage means 2, as shown in FIG. 3, the processing follows the path indicated by Y from step 1505 upon pt pointing "信". In step 1506, the start-of-basic-word segmentation point is set before "通" and the end-of-basic-word segmentation point is set behind "信".

Figure 22:
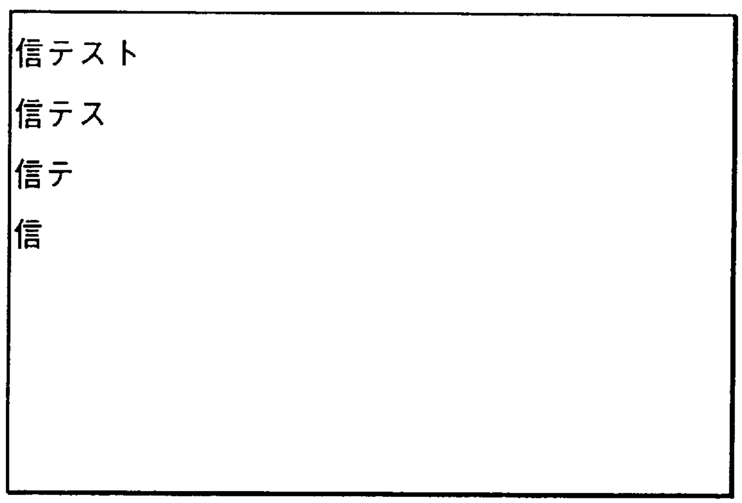
FIG. 22 is a representation showing successive states of the example of character string to be processed in the processing to set the basic-word segmentation points in the present invention.

If pt points a position before the segment range containing no technical terms as a result of shifting pt toward the head side by one character in step 1507, then the processing follows the path indicated by N from step 1508 and goes to step 1509 where ph is shifted one character toward the tail of the segment range and pt is set to the last character in the segment range containing no technical term. Thus, ph is assigned to "信" and pt is assigned to "ト". As with the processing for "通信テスト", the basic word storage means 2 is searched for "信テスト" while deleting characters thereof one by one from the tail, as shown in FIG. 22.

Figure 23:
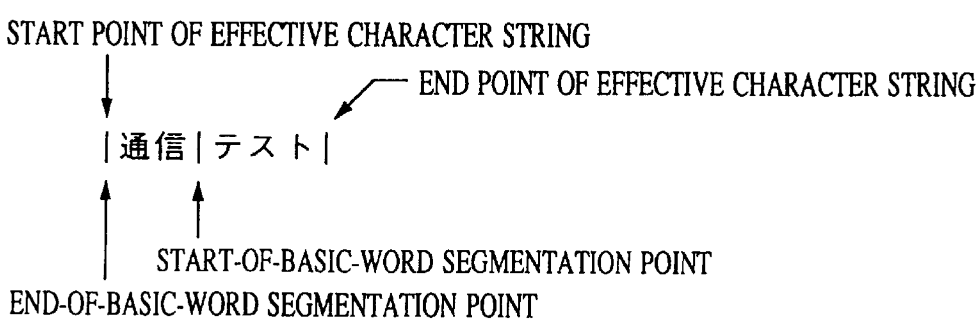
FIG. 23 is a representation showing an intermediate state of the processing made on the example of character string to be processed in the present invention.

Assuming that, of partial character strings of "通信テスト", only the character string "通信" is registered in the basic word storage means 2, the basic-word segmentation points are set for "通信テスト", as shown in FIG. 23. After that, if ph points a position behind the segment range containing no technical terms as a result of shifting ph rearward one-character by one-character, then the determination in step 1510 is responded by NO. The processing returns to step 1501 for executing the process of taking out a next segment range containing no technical terms from "通信テスト". In this case, since the next segment range containing no technical terms is not present, the determination in step 1502 is responded by NO and the processing goes out of the processing routine of FIG. 15.

Next, in step 606 of FIG. 6, the hiragana character string succeeding to the effective character string is checked to determine whether or not the effective character string is an effective part-of-speech. In step 1701 of FIG. 17, it is checked whether or not the last character in the effective character string belongs to a technical term. In this case, since the last character in the effective character string does not belong to any technical term, the processing follows the path indicated by N and goes to step 1702 for checking whether or not the character string succeeding to the effective character string matches with any character string registered in the effective part-of-speech succeeding hiragana-character-string storage means 3. In this case, the hiragana character string succeeding to "通信テスト" is "を" and, as shown in FIG. 4, "を" is registered in the effective part-of-speech succeeding hiragana-character-string storage means 3. Accordingly, the determination in step 1702 is responded by YES, followed by going out of the processing routine of FIG. 17.

Subsequently, in step 607 of FIG. 6, keyword are taken out based on the segmentation points and the effective part of speech. By executing the similar processing as for "サーバ切り替え" in accordance with the flowchart of FIG. 19, three keyword candidates, i.e., "通信", "通信テスト" and "テスト", are taken out from the routine for the keyword candidate extraction process, After that, it is checked in step 608 of FIG. 6 whether or not any effective character string still remains in the input sentence. In this case, since there still remains an effective character string, the processing follows the path indicated by Y and returns to step 603 for taking out a next effective character string. In accordance with the flowchart of FIG. 12, "行" is taken out the next effective character string. The processing goes to step 604 for setting a character-type segmentation point. In this case, since the effective character string includes no difference in character type, the processing goes to step 605 without setting the character-type segmentation point. Then, basic-word segmentation points are set in step 605. Assuming now that "行" is not registered in the basic word storage means 2, the processing goes to step 606 without setting the basic-word segmentation points.

In step 1701 of FIG. 17, it is checked whether or not the last character in the effective character string belongs to a technical term. In this case, since the last character in the effective character string does not belong to any technical term, the processing follows the path indicated by N and goes to step 1702 for checking whether or not the character string succeeding to the effective character string matches with any character string registered in the effective part-of-speech succeeding hiragana-character-string storage means 3. In this case, the hiragana character string succeeding to "行" is "う". Assuming that "う" is not registered in the effective part-of-speech succeeding hiragana-character-string storage means 3, a keyword end-disable point is set behind "行" in step 1703.

Subsequently, keyword candidates are taken out in step 607 of FIG. 6. Although this step is executed in accordance with the flowchart of FIG. 19, there is no keyword to be taken out because of the absence of keyword end-enable point.

The processing then goes to step 608, but no effective character string still remains in the input sentence. Accordingly, the determination in step 608 is responded by NO, thereby completing the processing.

As a result, six keywords, i.e., "サーバ", "サーバ", "切り替え", "切り替え", "通信", "通信テスト" and "テスト", are extracted.

Figure 24A:
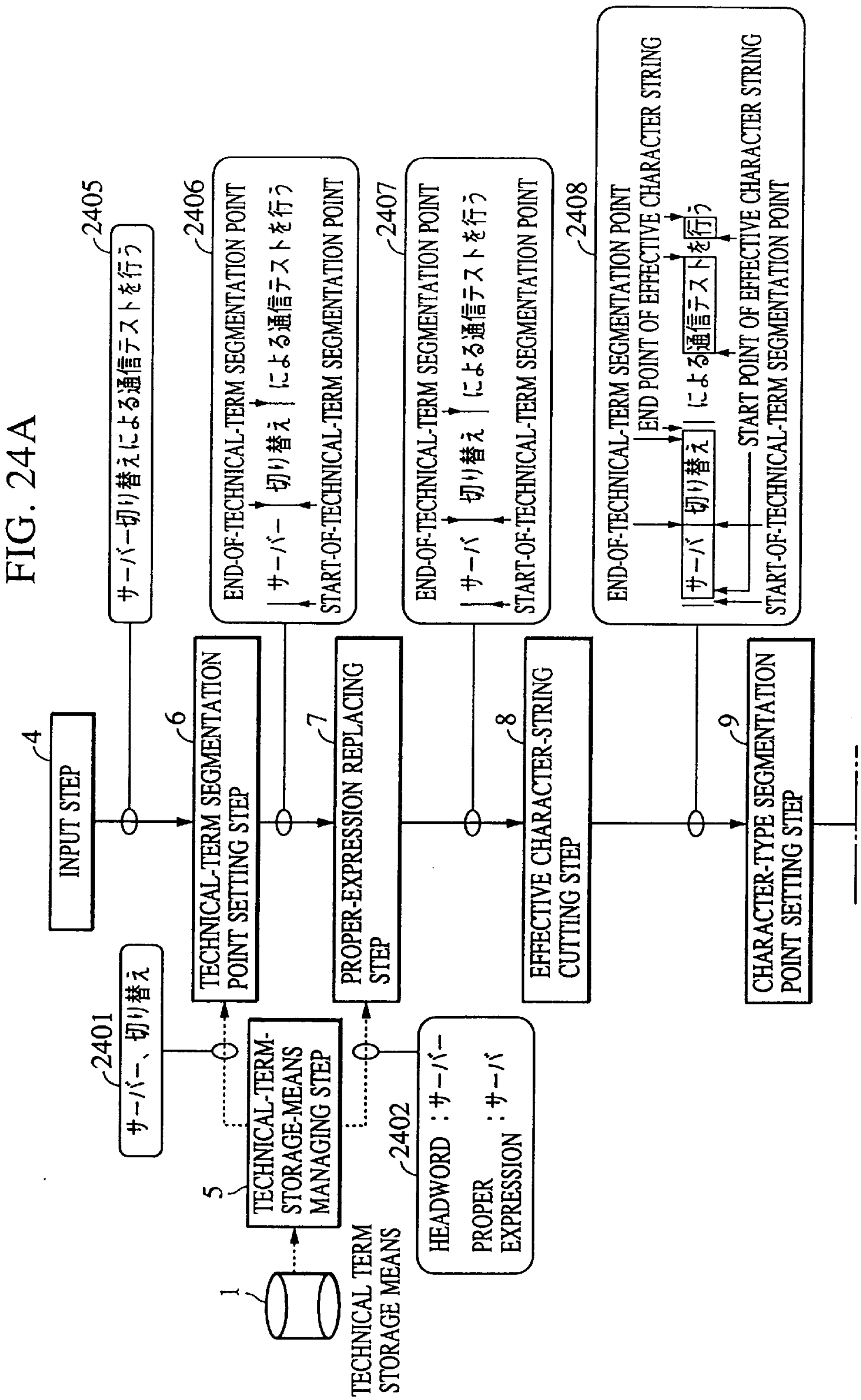
FIG. 24 is a block diagram showing an example of data flow in the keyword extraction method according to Embodiment 1 of the present invention in relation to the successive steps.
Figure 24B:
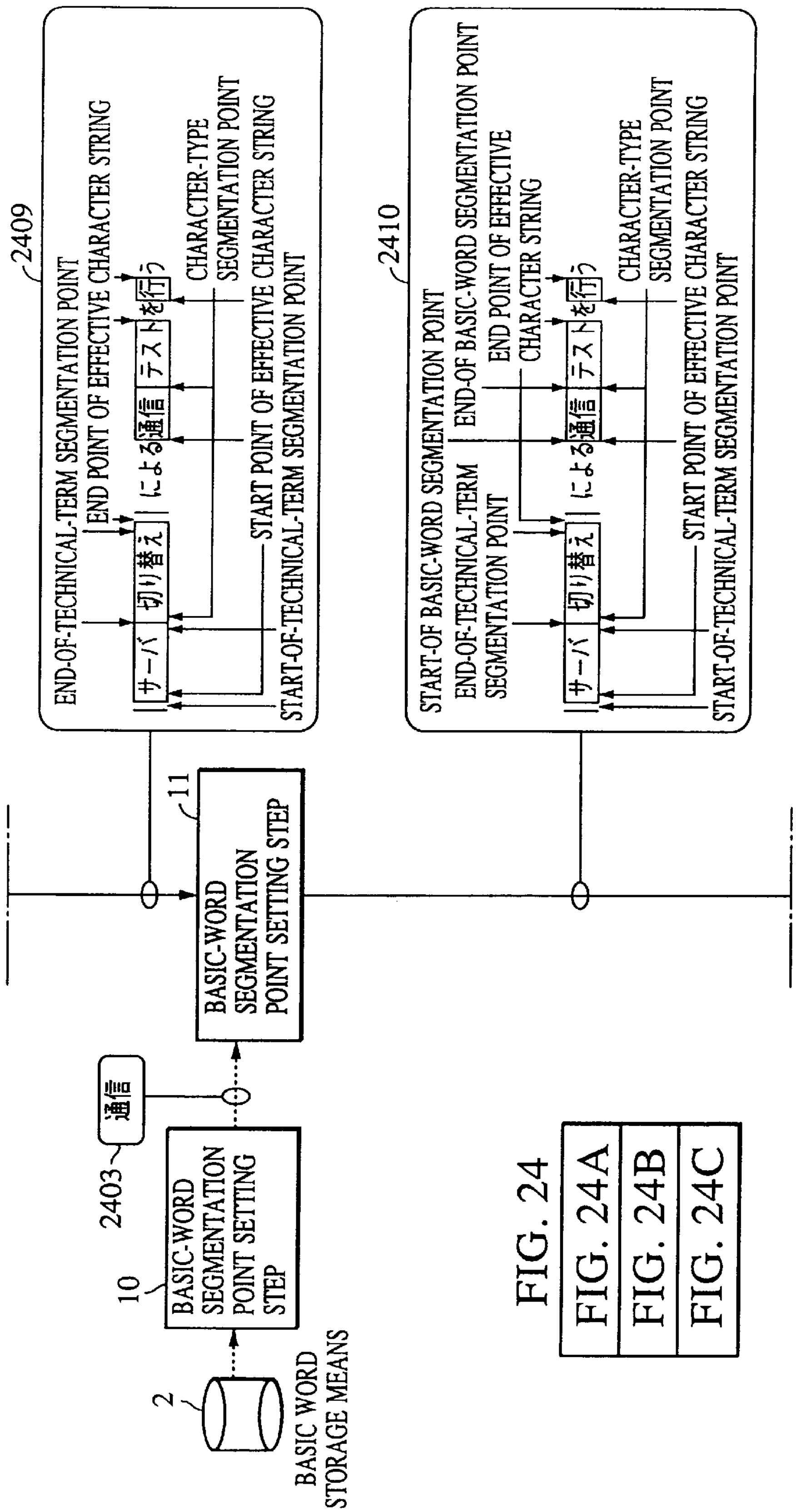
Figure 24C:
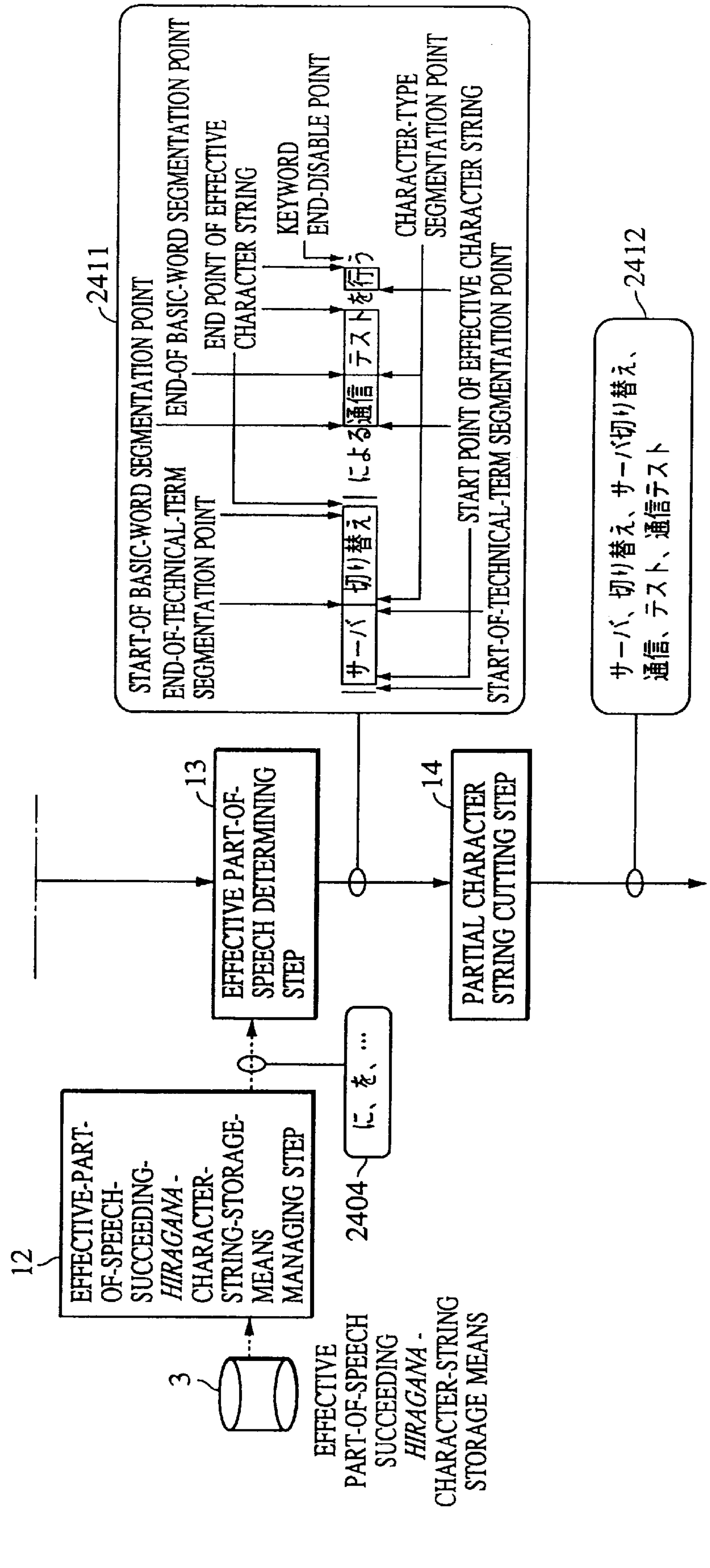

FIG. 24 is a block diagram showing an example of data flow in the present invention in relation to the steps according to a second aspect of the present invention.

Referring to FIG. 24, a Japanese input sentence "サーバー切り替えによる通信テストを行う。(sahbah kirikae niyoru tsuushin tesuto wo okonau.=A server is switched over to perform a communication test.)" 2405 is entered in the input step 4. In the technical-term-storage-means managing step 5, words "サーバー" and "切り替え" 2401 are retrieved from the technical term storage means 1. In the technical-term segmentation point setting step 6, the start-of-technical-term segmentation point and the end-of-technical-term segmentation point are set in respective positions where "サーバー" and "切り替え" appear in the input sentence, as shown in block 2406.

Then, the information that the proper expression of the word "サーバー" is "サーバ" is passed from the technical-term-storage-means managing step 5 to the proper-expression replacing step 7. As a result, the character string "サーバー" in block 2406 is replaced by the proper expression, i.e., "サーバ".

Next, in the effective character-string cutting step 8, a range of character string consisting of the effective character types, such as kanji, katakana, alphabets and numerals, or a technical term is taken out. As a result, "サーバ切り替え", "通信テスト" and "行" are taken out as effective character strings, as shown in block 2408.

Subsequently, in the character-type segmentation point setting step 9, the position where the character type changes from one to another is set as a character-type segmentation point for the character string range of the effective character string which is not itself a technical term. As a result, the character-type segmentation points are set between "サーバ" and "切り替え" and between "通信" and "テスト", as shown in block 2409.

After that, the basic-word segmentation points are set in the basic-word segmentation point setting step 11. To this end, in the basic-word-storage-means managing step 10, the basic word storage means 2 is searched and the information that a word "通信" 2403 is a basic word is passed to the basic-word segmentation point setting step 11. As a result, the start-of-basic-word segmentation point and the end-of-basic-word segmentation point are set respectively before and behind "通信", as shown in block 2410.

Then, the effective part-of-speech succeeding hiragana-character-string storage means 3 is searched in the effective-part-of-speech-succeeding-hiragana-character-string-storage-means managing step 12, and the character string succeeding to each effective character string is checked in the effective part-of-speech determining step 13. Assuming that "に" and "を" are found, but "う" is not found as indicated at 2404, the keyword end-disable point is set behind "行" as shown in block 2411.

Next, the partial character string cutting step 14 cuts out, from the effective character string, the range of character string which starts from any of the start-of-technical-term segmentation point, the start point of the effective character string, the start-of-basic-word segmentation point, and the character-type segmentation point, which terminates at any of the end-of-technical-term segmentation point, the end point of the effective character string, the end-of-basic-word segmentation point, and the character-type segmentation point, and which does not terminate at the keyword end-disable point. As a result of the above processing, "サーバ", "切り替え", サーバ切り替え", "通信", "テスト", and "通信テスト" are extracted as keywords from the input sentence, as shown in block 2412.

It is to be noted that a program for executing the above-described operation in computers may be stored in a recording medium which is readable by computers, e.g., a floppy disk, and the above-described operation may be executed by computers using such a recording medium.

Also, while the segmentation points are set in Embodiment 1 in the order of the technical-term segmentation point setting step, the character-type segmentation point setting step, and the basic-word segmentation point setting step, the order of those processing steps may be optionally selected.

With Embodiment 1, as described above, in the keyword extraction process for assigning an index to a document, a keyword of a technical term appearing in a Japanese sentence is assigned to the document after a different expression of the technical term is replaced by a proper expression thereof by referring to the technical term storage means in which technical terms are stored along with their different expressions. At this time, when the technical term having the replaced proper expression is in continuity with the character string cut out from the input sentence because of difference in character type and the presence of a basic word, a keyword in the form of a compound word is also extracted so that the keyword extraction can be performed comprehensively. By converting a different expression of the technical term into a corresponding proper expression with the same technical term storage means before starting retrieval, a keyword extraction apparatus adaptable for high-speed document retrieval can be achieved while the number of different expressions of words, which serve as retrieval keys, is avoided from increasing in a way of combinations unlike the conventional document retrieval intended to cope with the problem caused by words which have the similar meaning and pronunciation but different expressions.

Embodiment 2.

Figure 25:
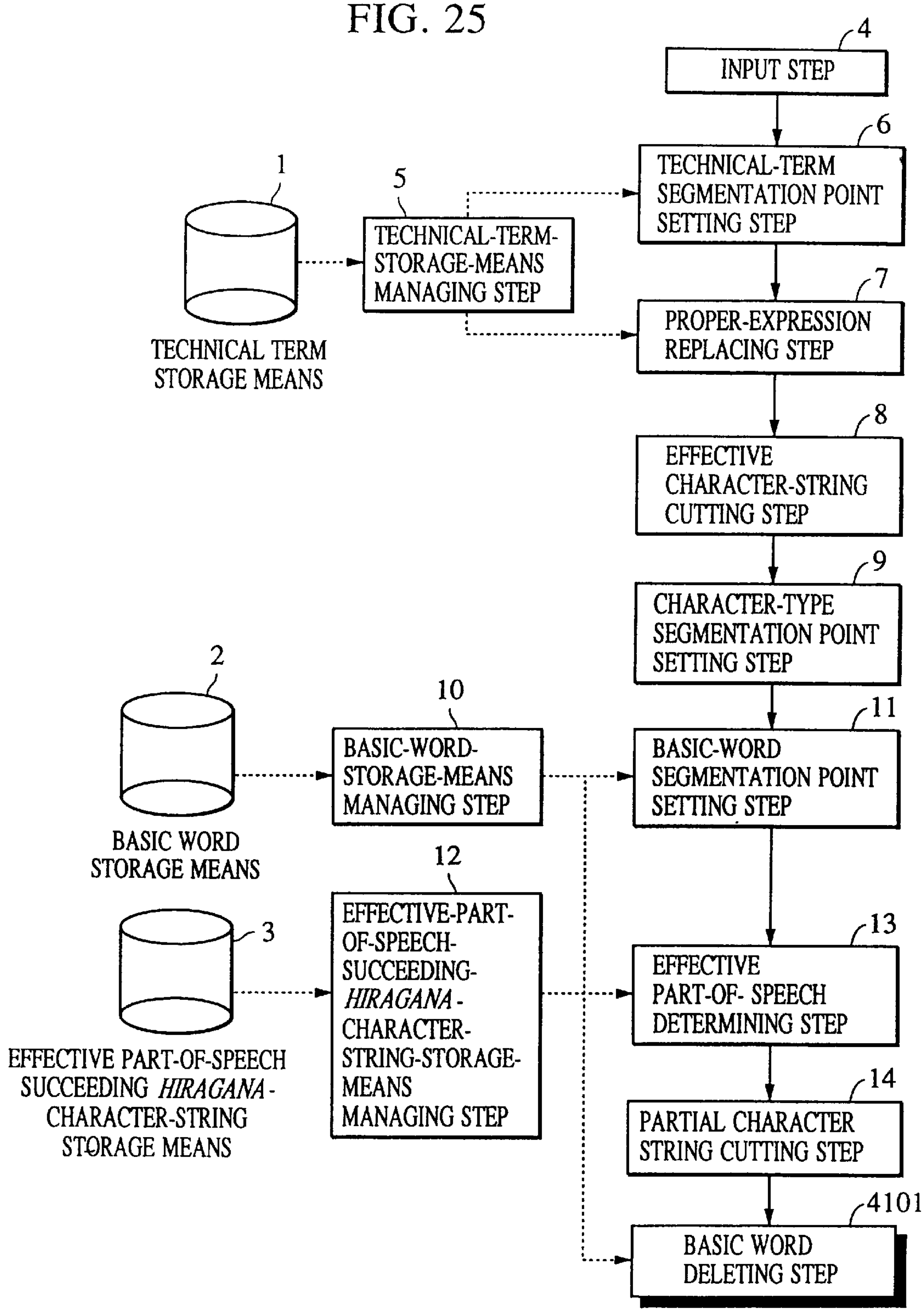
FIG. 25 is an overall block diagram of a keyword extraction method according to Embodiment 2 of the present invention.

FIG. 25 is an overall block diagram of a keyword extraction method according to Embodiment 2 of the present invention. In FIG. 25, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 4101 is a basic word deleting step for deleting those ones of keyword candidates extracted in the partial character string cutting step 14 which are present in the basic word storage means 2.

Figure 26:
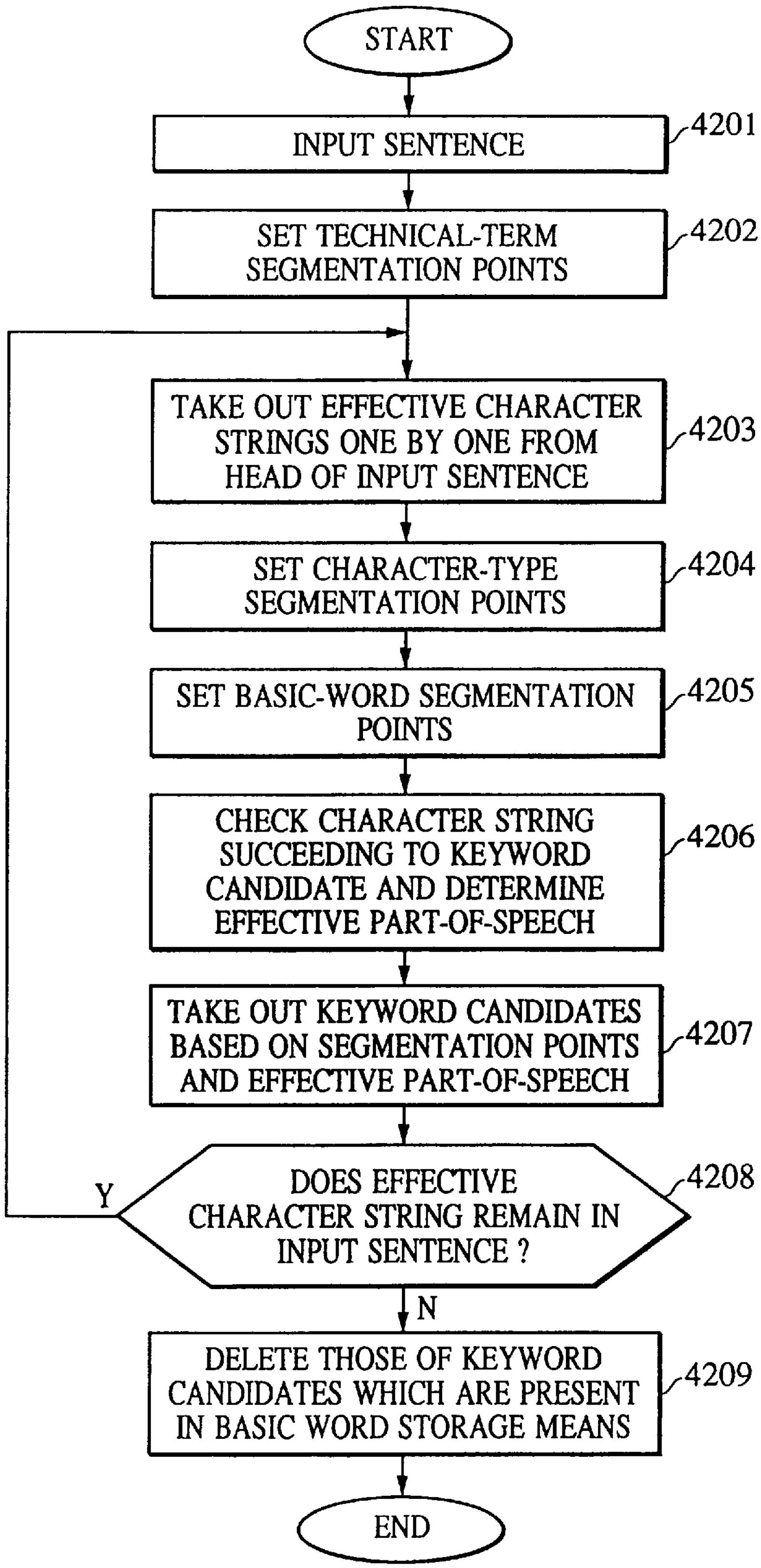
FIG. 26 is a flowchart showing the operation of the keyword extraction method according to Embodiment 2 of the present invention.

FIG. 26 is a flowchart showing the operation of another embodiment of the second aspect, i.e., Embodiment 2, of the present invention. The following description will be made on processing of, for example, a Japanese sentence "サーバー切り替えによる通信テストを行う (sahbah kirikae niyoru tsuushin tesuto wo okonau=A server is switched over to perform a communication test)".

The operation from step 4201 to step 4208 is exactly the same as in Embodiment 1. First, in step 4201, the Japanese sentence is input through a keyboard or file. Then, in step 4202, technical-term segmentation points are set in the input sentence.

Assuming that the words shown in FIG. 2 are registered in the technical term storage means 1, "サーバー" and "切り替え" are taken out as technical terms from the input sentence and "サーバー" is replaced by its proper expression, i.e., "サーバ", in accordance with the flowchart of FIG. 7. Also, the start-of-technical-term segmentation point and the end-of-technical-term segmentation point are set respectively before and behind each of "サーバ" and "切り替え".

Next, in step 4203, effective character strings are taken out one by one from the head of the input sentence. In accordance with the flowchart of FIG. 12, "サーバ切り替え" is taken out as the first effective character string.

Subsequently, a character-type segmentation point is set in step 4204. In accordance with the flowchart of FIG. 13, the character-type segmentation point is set between "バ" and "切".

After that, basic-word segmentation points are set in step 4205. It is assumed that any partial character string of "サーバ切り替え" is not registered in the basic word storage means 2. In accordance with the flowchart of FIG. 15, the processing goes to step 4206 without setting the basic-word segmentation points for that effective character string.

The character string succeeding to a keyword candidate is then checked in step 4206 to determine whether the keyword candidate is an effective part-of-speech. In accordance with the flowchart of FIG. 17, the part-of-speech determining routine is skipped because "切り替え" is a technical term.

Thereafter, in step 4207, keyword candidates are taken out based on the segmentation points and the effective part-of-speech. In this embodiment, a keyword start-enable point is assumed to be given by any of the start-of-technical-term segmentation point, the start point of the effective character string, the start-of-basic-word segmentation point, and the character-type segmentation point. Also, a keyword end-enable point is assumed to be given by any of the end-of-technical-term segmentation point, the end point of the effective character string, the end-of-basic-word segmentation point, and the character-type segmentation point. It is further assumed that the position where a keyword end-disable point is set in the effective part-of-speech determining process cannot serve as the keyword end-enable point.

In accordance with the flowchart of FIG. 19, "サーバ", "切り替え" and "サーバ切り替え" are extracted as keywords from "サーバ切り替え".

Next, it is checked in step 4208 whether or not any effective character string still remains in the input sentence. In this case, the processing follows the path indicated by Y and returns to step 4203 for taking out a next effective character string "通信テスト".

Subsequently, a character-type segmentation point is set in step 4204. In accordance with the flowchart of FIG. 13, the character-type segmentation point is set between "信" and "テ".

After that, basic-word segmentation points are set in step 4205. Assuming that "通信" is registered as a basic word in the basic word storage means 2, the start-of-basic-word segmentation point and the end-of-basic-word segmentation point are set before and behind "通信", respectively, in accordance with the flowchart of FIG. 15.

The character string succeeding to a keyword candidate is then checked in step 4206 to determine whether the keyword candidate is an effective part-of-speech. In this case, since the character succeeding to "テスト" is "を" that is registered in the effective part-of-speech succeeding hiragana-character-string storage means 3, the processing goes out of the part-of-speech determining routine without setting the keyword end-disable point in accordance with the flowchart of FIG. 17.

Thereafter, in step 4207, keyword candidates are taken out based on the segmentation points and the effective part-of-speech. In accordance with the flowchart of FIG. 19, "通信", "テスト" and "通信テスト" are extracted as keywords.

Further, the processing from step 4203 to step 4207 is executed for the next effective character string "行". Assuming that the character-type segmentation point does not exist, "行" is not present in the basic word storage means and the prefix storage means, and "う" succeeding to "行" is not present in the effective part-of-speech succeeding hiragana-character-string storage means 3, no keywords are extracted from this segment as with the processing executed in Embodiment 1 for "行".

When all the effective character strings to be processed are taken out, the processing follows the path indicated by N from step 4208 and goes to step 4209.

Figure 27:
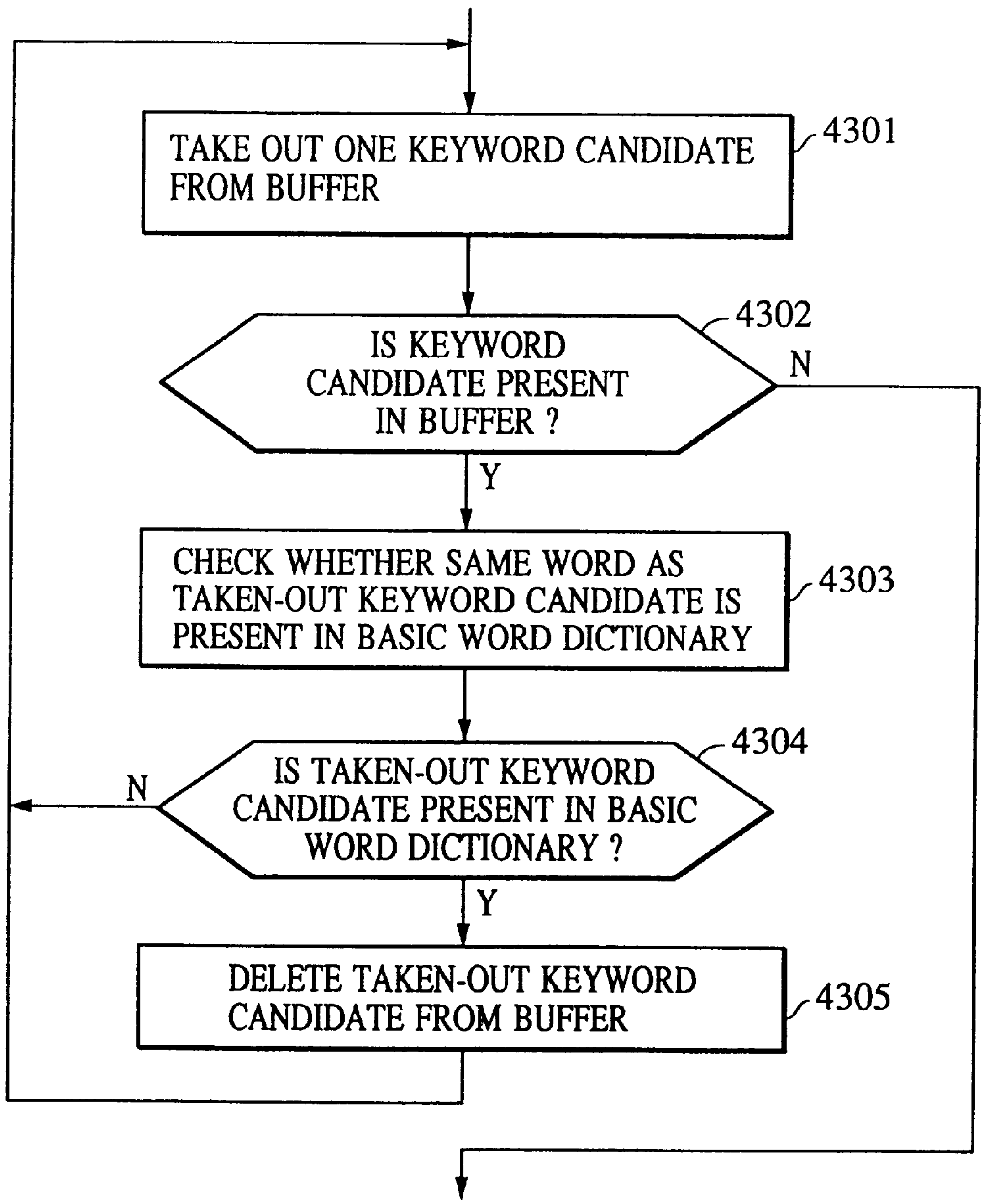
FIG. 27 is a flowchart showing the operation of processing to delete a basic word in the present invention.

In step 4209, those ones of the extracted keyword candidates which are present in the basic word storage means are discarded. This processing is executed in accordance with a flowchart shown in FIG. 27.

It is assumed that the keyword candidates, i.e., "サーバ", "切り替え", "サーバ切り替え", "通信", "テスト" and "通信テスト" are stored in a buffer. First, one of the keyword candidates is taken out from the buffer in step 4301. It is then checked in step 4303 whether or not the same word as the taken-out keyword candidate is present in the basic word storage means 2. If step 4304 determines that the same word is present, then the taken-out keyword candidate is deleted in step 4305. This processing is repeated for all the keyword candidates stored in the buffer, and is completed upon the determination in step 4302 being responded by NO.

As a result of the above processing, since "通信" is present in the basic word storage means, "通信" is deleted from the buffer. Thus, "サーバ", "切り替え", "サーバ", "切り替え", テスト" and "通信テスト" are finally extracted as keywords, thereby completing the processing sequence.

Figure 28A:
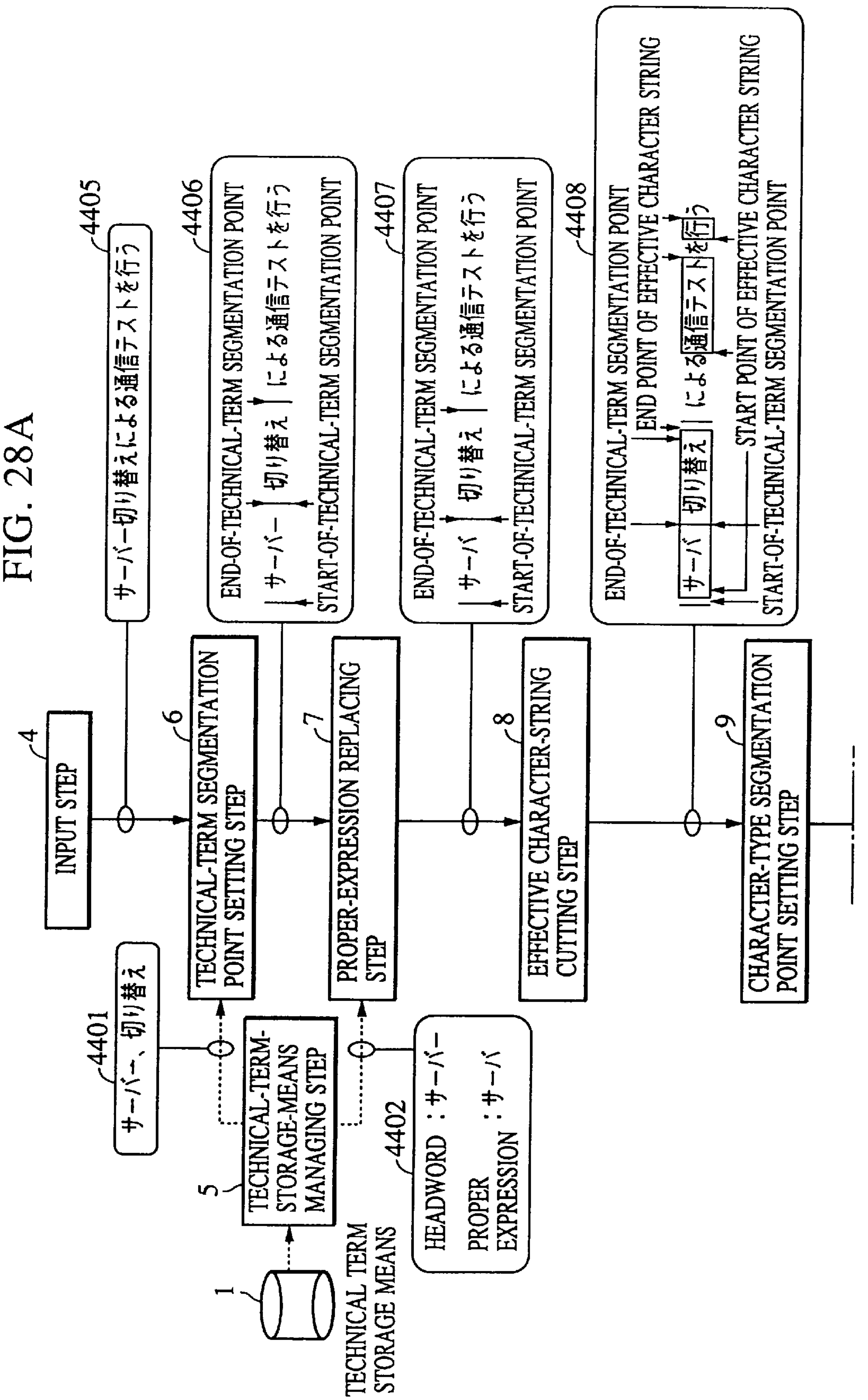
FIG. 28 is a block diagram showing an example of data flow in the keyword extraction method according to Embodiment 2 of the present invention in relation to the successive steps.
Figure 28B:
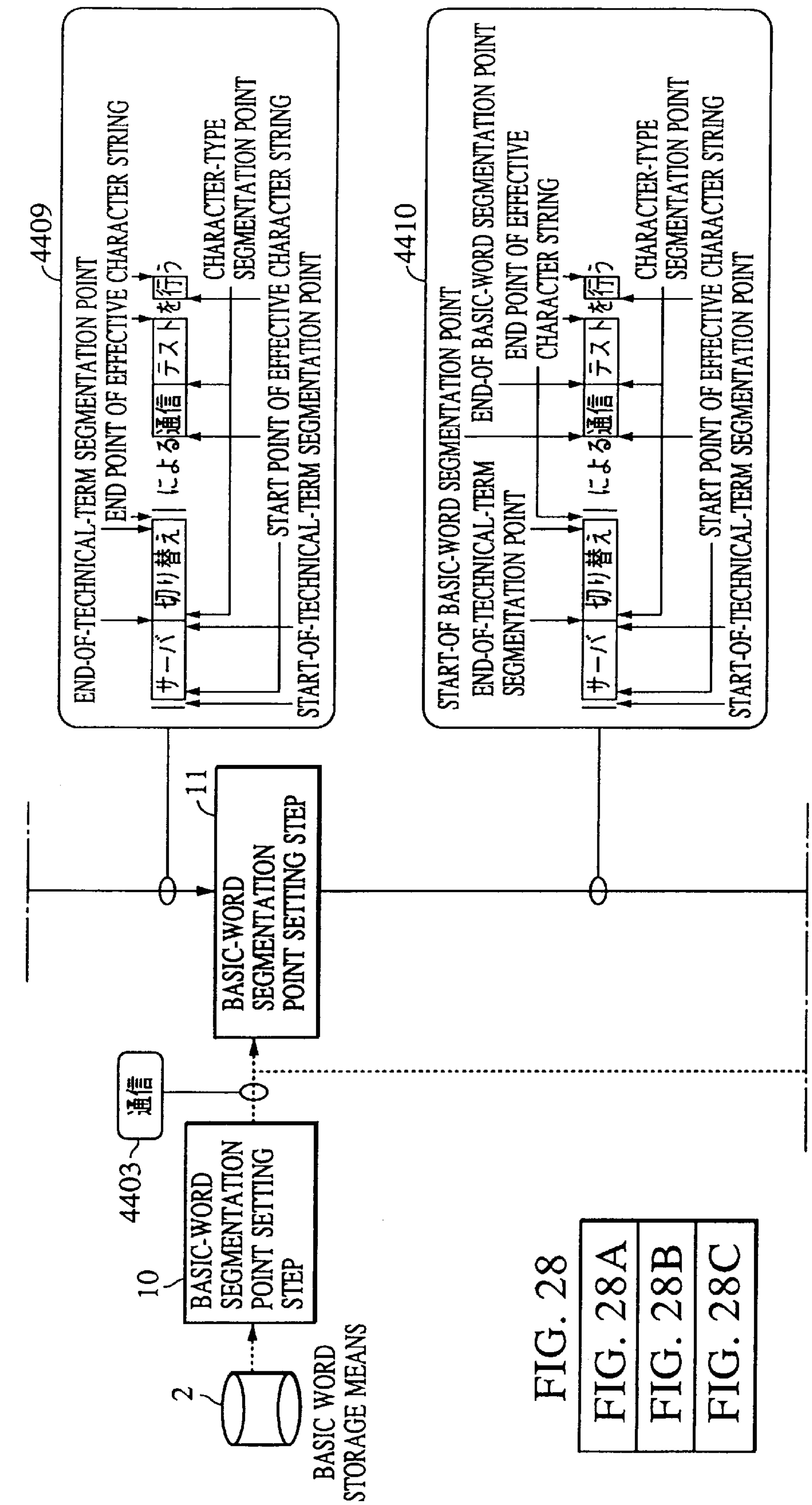
Figure 28C:
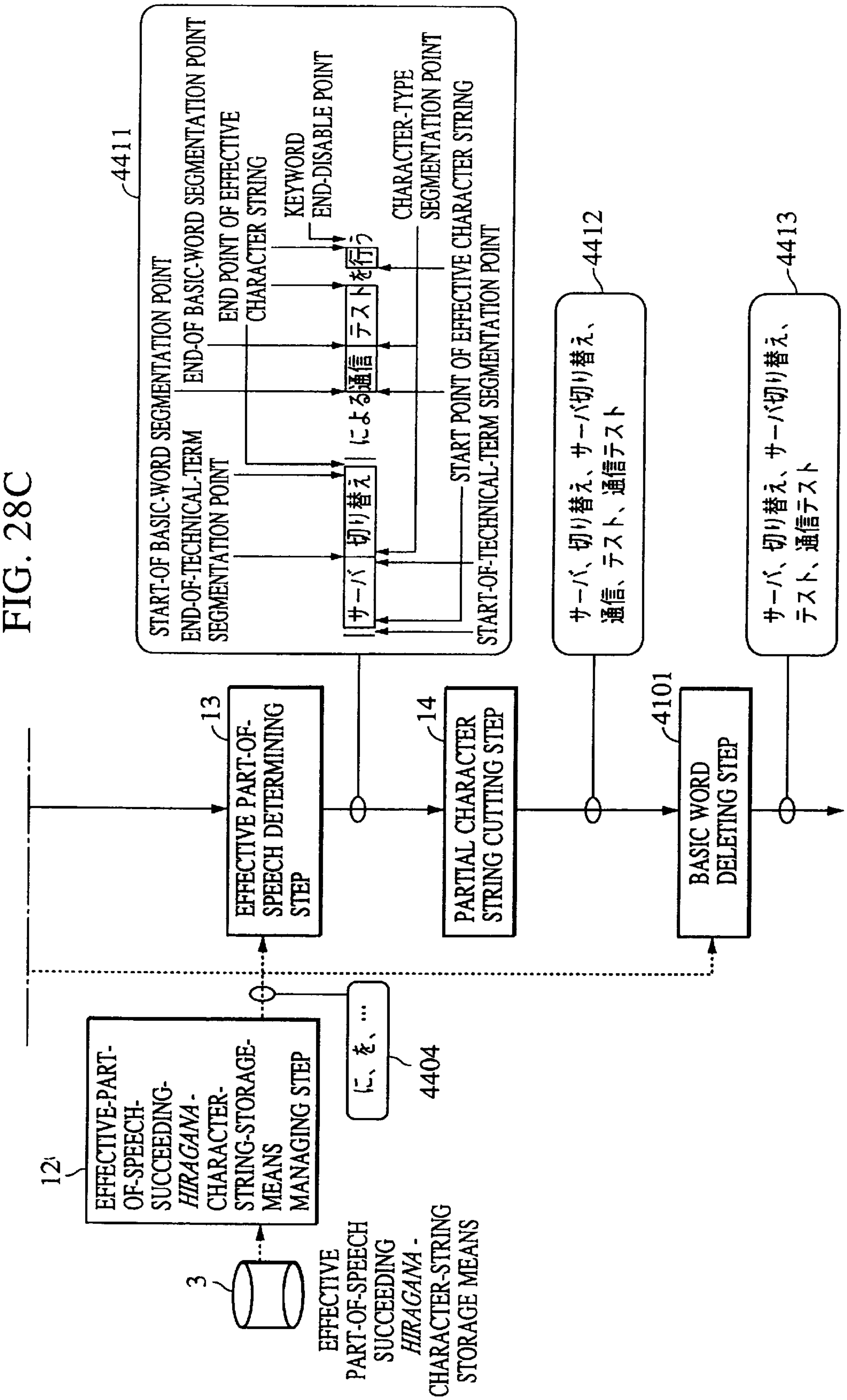

FIG. 28 is a block diagram showing an example of data flow in the present invention in relation to the steps according to the second aspect of the present invention.

Referring to FIG. 28, a Japanese input sentence "サーバー切り替えによる通信テストを行う。(sahbah kirikae niyoru tsuushin tesuto wo okonau.=A server is switched over to perform a communication test.)" 4405 is entered in the input step 4. In the technical-term-storage-means managing step 5, words 4401, i.e., "サーバー" and "切り替え", are retrieved from the technical term storage means 1. In the technical-term segmentation point setting step 6, the start-of-technical-term segmentation point and the end-of-technical-term segmentation point are set in respective positions where "サーバー" and "切り替え" appear in the input sentence, as shown in block 4406.

Then, the information that the proper expression of the word "サーバー" is "サーバ" is passed from the technical-term-storage-means managing step 5 to the proper-expression replacing step 7. As a result, the character string "サーバー" in block 4406 is replaced by the proper expression, i.e., "サーバ".

Next, in the effective character-string cutting step 8, a range of character string consisting of the effective character types, such as kanji, katakana, alphabets and numerals, or a technical term is taken out. As a result, "サーバ切り替え", "通信テスト" and "行" are taken out as effective character strings, as shown in block 4408.

Subsequently, in the character-type segmentation point setting step 9, the position where the character type changes from one to another is set as a character-type segmentation point for the character string range of the effective character string which is not itself a technical term. As a result, the character-type segmentation points are set between "サーバ" and "切り替え" and between "通信" and "テスト", as shown in block 4409.

After that, the basic-word segmentation points are set in the basic-word segmentation point setting step 11. To this end, in the basic-word-storage-means managing step 10, the basic word storage means 2 is searched and the information that a word "通信" 4403 is a basic word is passed to the basic-word segmentation point setting step 11. As a result, the start-of-basic-word segmentation point and the end-of-basic-word segmentation point are set respectively before and behind "通信", as shown in block 4410.

Then, the effective part-of-speech succeeding hiragana-character-string storage means 3 is searched in the effective-part-of-speech-succeeding-hiragana-character-string-storage-means managing step 12, and the character string succeeding to each effective character string is checked in the effective part-of-speech determining step 13. Assuming that "に" and "を" are found, but "う" is not found as indicated at 4404, the keyword end-disable point is set behind "行" as shown in block 4411.

Next, the partial character string cutting step 14 cuts out, from the effective character string, the range of character string which starts from any of the start-of-technical-term segmentation point, the start point of the effective character string, the start-of-basic-word segmentation point, and the character-type segmentation point, which terminates at any of the end-of-technical-term segmentation point, the end point of the effective character string, the end-of-basic-word segmentation point, and the character-type segmentation point, and which does not terminate at the keyword end-disable point. As a result of the above processing, "サーバ", "切り替え", "サーバ切り替え", "通信", "テスト" and "通信テスト" are extracted as keywords from the input sentence, as shown in block 4412.

Thereafter, those ones of the keyword candidates which are the same as the basic words registered in the basic word storage means 2 are deleted from the buffer in the basic word deleting step 4101. As a result of this processing, the keywords finally extracted from the input sentence are given by "サーバ", "切り替え", "サーバ切り替え", "テスト" and "通信テスト".

It is to be noted that while the segmentation points are set in Embodiment 2 in the order of the technical-term segmentation point setting step, the character-type segmentation point setting step, and the basic-word segmentation point setting step, the order of those processing steps may be optionally selected.

With Embodiment 2, as described above, the keyword extraction is carried out after replacing a different expression of the headword by a corresponding proper expression for technical terms registered in the technical term storage means, and when the technical term having the replaced proper expression is in continuity with the character string cut out from the input sentence because of difference in character type and the presence of a basic word, a keyword in the form of a compound word is also extracted so that the keyword extraction can be performed comprehensively. Since collation of words is made using their proper expressions at the time of both registration and retrieval of sentences, the number of different expressions of words, which serve as retrieval keys, from being increasing in a way of combinations, and a high-speed keyword extraction apparatus can be achieved. Moreover, with the provision of the basic word deleting step, the words which are not necessary as keywords used to identify a document can be deleted and a highly-accurate keyword extraction can be realized with a less amount of retrieval wastes.

Embodiment 3.

Figure 29:
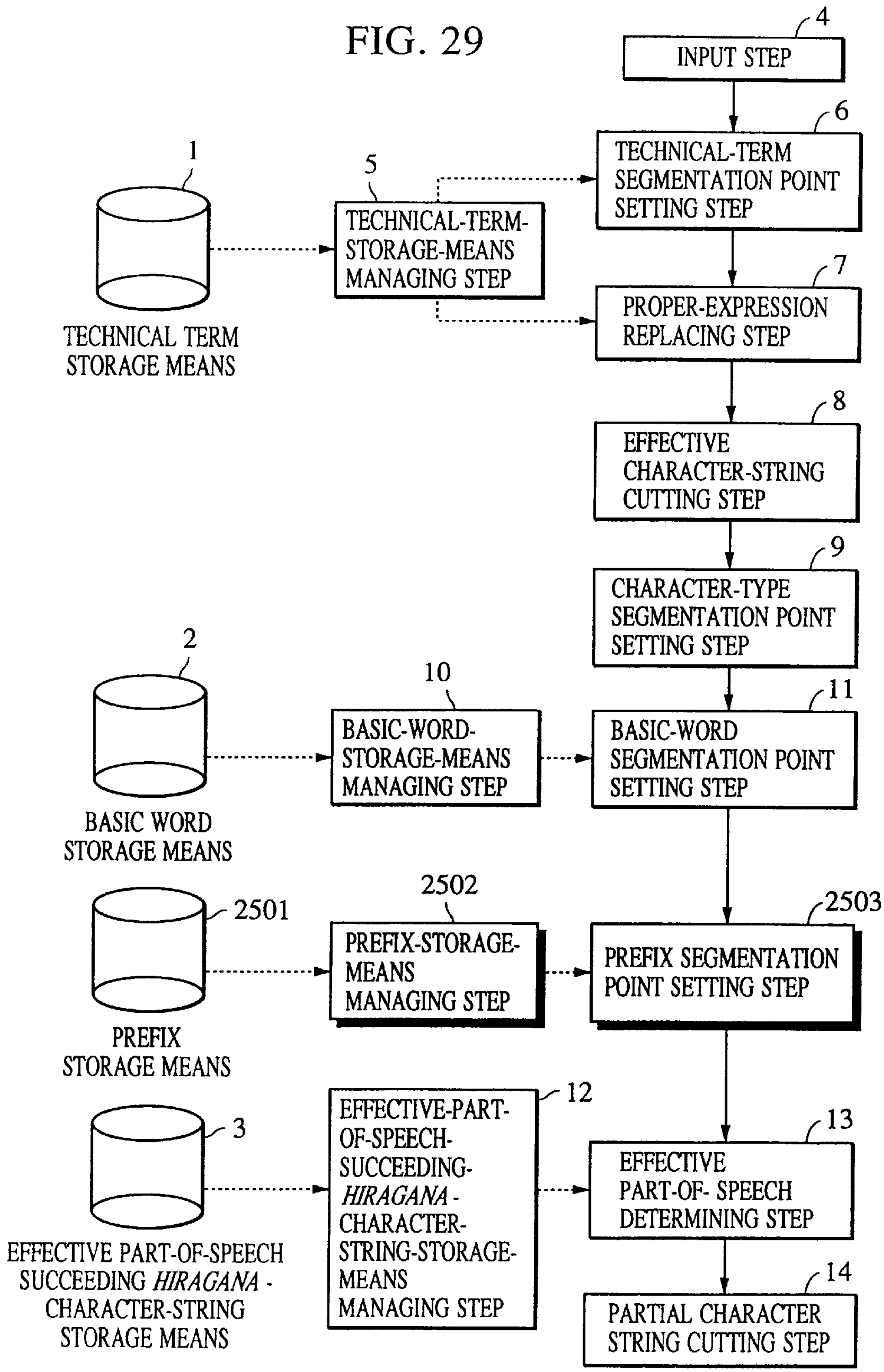
FIG. 29 is an overall block diagram of a keyword extraction method according to Embodiment 3 of the present invention.

FIG. 29 is an overall block diagram of a keyword extraction method according to one embodiment of a third aspect, i.e., Embodiment 3, of the present invention. In FIG. 29, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 2501 is prefix storage means which is made up of one field of headword alone as shown in FIG. 30, for example. Denoted by 2502 is a prefix-storage-means managing step for searching the prefix storage means 2502 to take out prefixes, and 2503 is a prefix segmentation point setting step for setting prefix segmentation points before and behind a character string which is in match with any prefix taken out in the prefix-storage-means managing step 2502.

Figure 31:
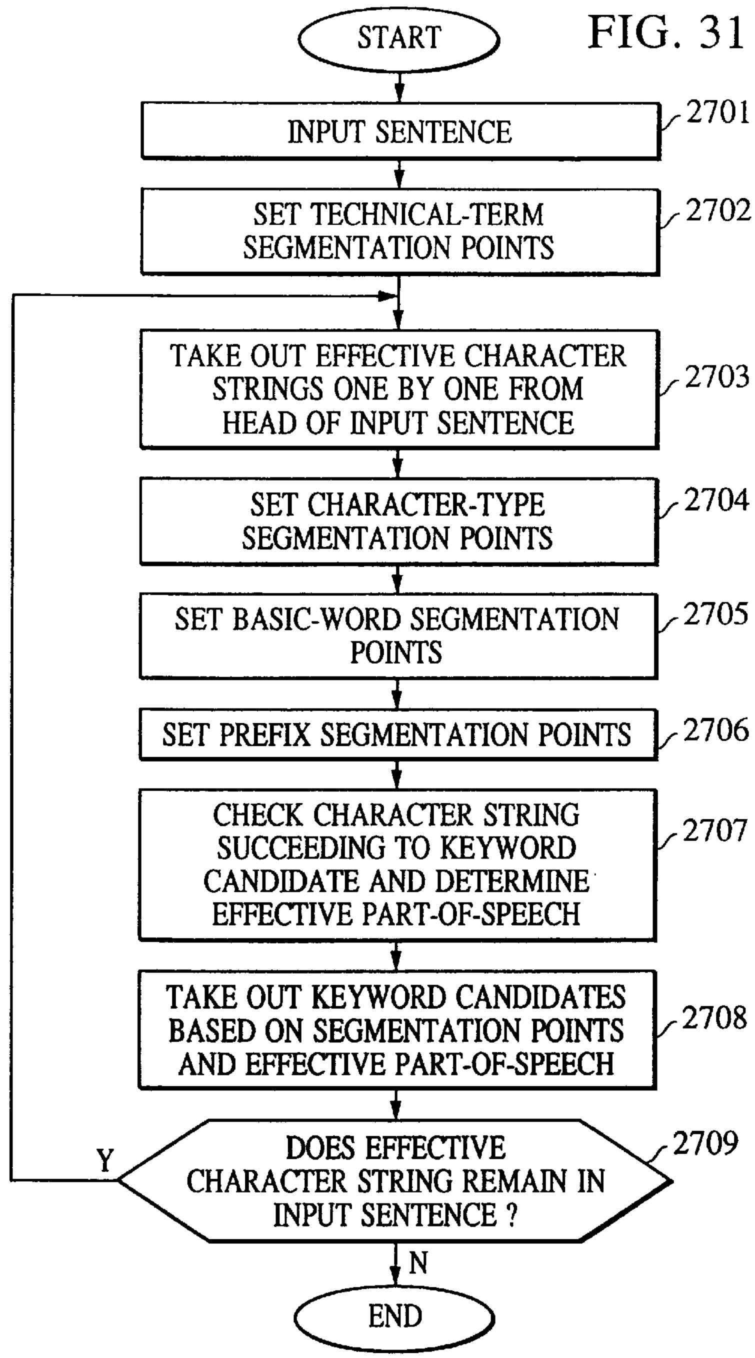
FIG. 31 is a flowchart showing the operation of the keyword extraction method according to Embodiment 3 of the present invention.

FIG. 31 is a flowchart showing the operation of the embodiment of the third aspect, i.e., Embodiment 3, of the present invention. The following description will be made on processing of, for example. a Japanese sentence "各サーバーの再確認を行う。(kakusahbah no saikakunin wo okonau.=Each server is reconfirmed.)". First, in step 2701, the Japanese sentence is input through a keyboard or file. Then, in step 2702, technical-term segmentation points are set in the input sentence.

Figure 32:
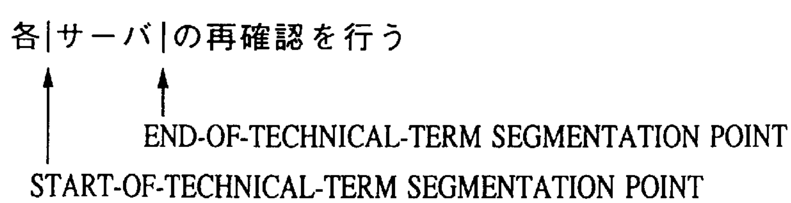
FIG. 32 is a representation showing an intermediate state of the processing made on an example of character string to be processed in the present invention.

Assuming that the words shown in FIG. 2 are registered in the technical term storage means 1, similarly to the processing in Embodiment 1, "サーバー" is taken out as a technical term from the input sentence and is replaced by its proper expression, i.e., "サーバ", in accordance with the flowchart of FIG. 7. Also, the start-of-technical-term segmentation point and the end-of-technical-term segmentation point are set respectively before and behind "サーバ", as shown in FIG. 32.

Next, in step 2703, effective character strings are taken out one by one from the head of the input sentence. In accordance with the flowchart of FIG. 12, similarly to the processing in Embodiment 1, "各サーバ" is taken out as the first effective character string.

Subsequently, a character-type segmentation point is set in step 2704. In accordance with the flowchart of FIG. 13, similarly to the processing in Embodiment 1, the character-type segmentation point is set between "各" and "サ".

After that, basic-word segmentation points are set in step 2705. It is assumed that any partial character string of "各サーバ" is not registered in the basic word storage means 2. In accordance with the flowchart of FIG. 15, similarly to the processing in Embodiment 1, the processing goes to step 2706 without setting the basic-word segmentation points for that effective character string.

Figure 33:
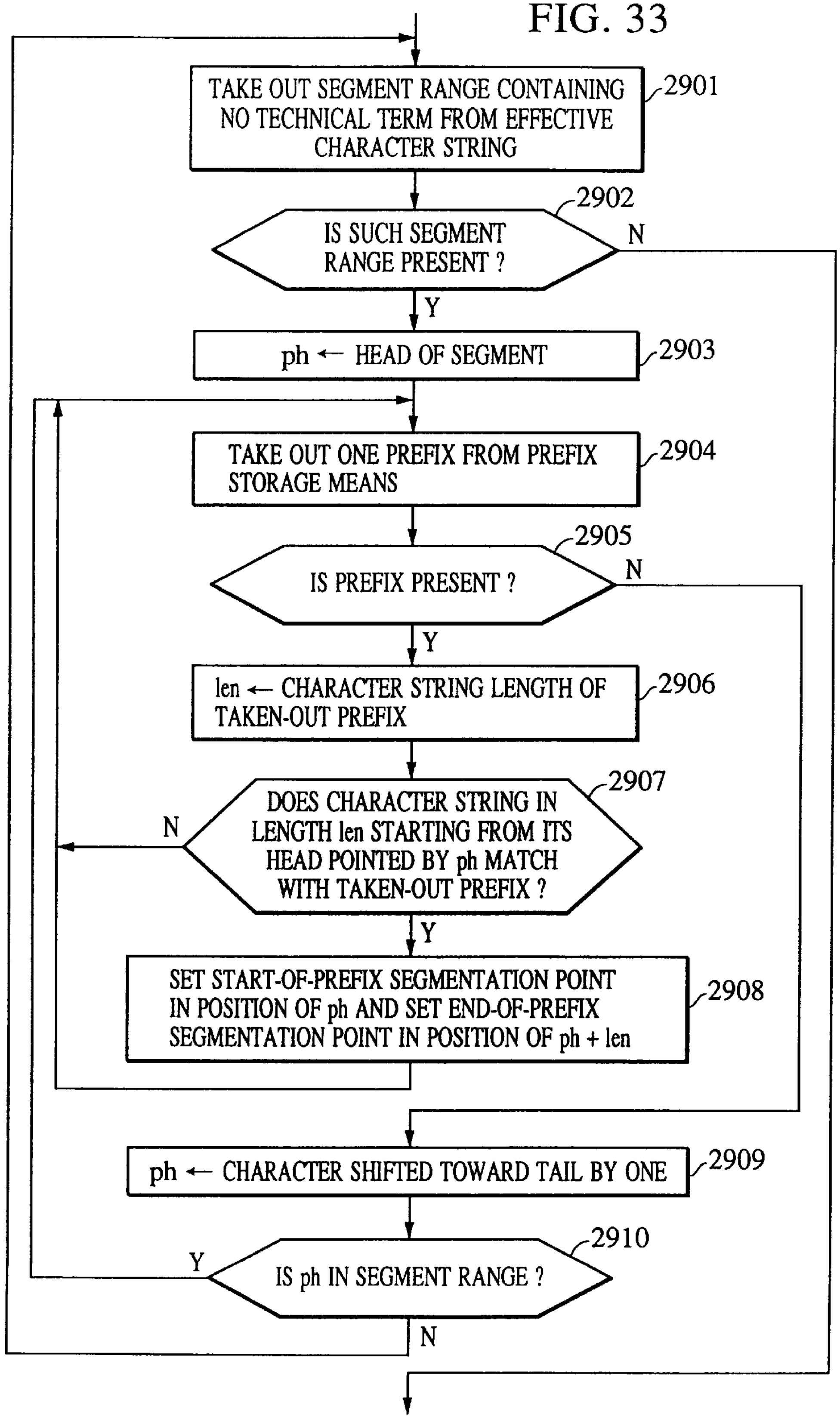
FIG. 33 is a flowchart showing the operation of processing to set prefix segmentation points in the present invention.

Prefix segmentation points are then set in step 2706. FIG. 33 shows a flow of processing to set the prefix segmentation points. First, in 2901, a segment range containing no technical terms is taken out from the effective character string. In accordance with the flowchart of FIG. 16, similarly to the processing in Embodiment 1, "各" is taken out as a segment of the effective character string containing no technical term.

Since there is such a segment to be processed, the determination in step 2902 is responded by YES. Then, in step 2903, a pointer ph is assigned to the head character "各" of the segment of effective character string which contains no technical term.

Subsequently, prefixes registered in the prefix storage means 2501 are taken out one by one in step 2904, and the length of the taken-out prefix is assigned to a variable len in step 2906. It is then checked in step 2907 whether or not the character string in length len starting from its head pointed by ph matches with the prefix taken out from the prefix storage means 2501.

Assuming that "各" is registered in the prefix storage means 2501 as shown in FIG. 30, the determination in step 2907 is responded by YES upon "各" being taken out in step 2904. After that, in step 2908, a start-of-prefix segmentation point and an end-of-prefix segmentation point are set respectively before and behind "各" in the character string to be processed. When the prefixes registered in the prefix storage means 2501 are all taken out in step 2904, the determination in step 2905 is responded by NO and the processing goes to step 2909.

In step 2909, ph is shifted one character toward the tail of the segment. So long as ph is still in the segment, the prefix is taken out from the prefix storage means 2501 to repeat the similar processing as mentioned above.

In this case, since the character succeeding to "各" is outside the range of effective character string containing no technical term, the processing follows the path indicated by N from step 2910. For "各サーバ" there is no other segment of effective character string containing no technical term. Accordingly, the processing follows the path indicated by N from step 2902, thereby going out of the routine of FIG. 33.

The character string succeeding to a keyword candidate is then checked in step 2707 in FIG. 31 to determine whether the keyword candidate is an effective part-of-speech. In accordance with the flowchart of FIG. 17, similarly to the processing in Embodiment 1, the part-of-speech determining routine is skipped because "サーバ" is a technical term.

Figure 34:
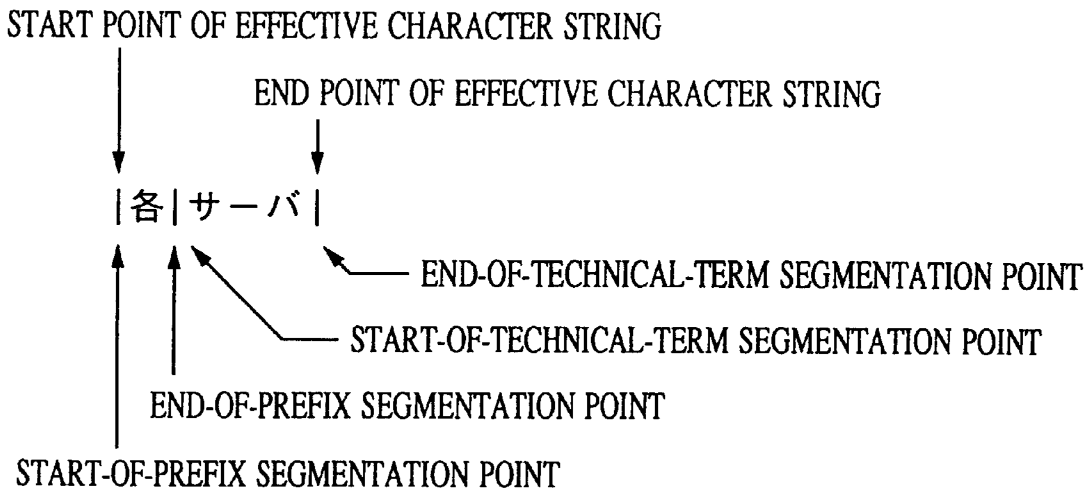
FIG. 34 is a representation showing an intermediate state of the processing made on an example of character string to be processed in the present invention.

As a result of the above processing, the segmentation points are set in the first effective character string, as shown in FIG. 34.

Thereafter, in step 2708, keyword candidates are taken out based on the segmentation points and the effective part-of-speech. In this embodiment, a keyword start-enable point is assumed to be given by any of the start-of-technical-term segmentation point, the start point of the effective character string, the start-of-basic-word segmentation point, the character-type segmentation point, the start-of-prefix segmentation point, and the end-of-prefix segmentation point. Also, a keyword end-enable point is assumed to be given by any of the end-of-technical-term segmentation point, the end point of the effective character string, the end-of-basic-word segmentation point, and the character-type segmentation point. It is further assumed that the position where a keyword end-disable point is set in the effective part-of-speech determining process cannot serve as the keyword end-enable point. In addition, it is assumed that the end-of-prefix segmentation point serves as the keyword end-disable point only and cannot serve as the keyword end-enable point.

In accordance with the flowchart of FIG. 19, similarly to the processing in Embodiment 1, "各サーバ" and "サーバ" are extracted as keywords from "各サーバ".

Next, it is checked in step 2709 whether or not any effective character string still remains in the input sentence. In this case, the processing follows the path indicated by Y and returns to step 2703 for taking out a next effective character string "再確認".

Subsequently, a character-type segmentation point is set in step 2704. This processing is executed in accordance with the flowchart of FIG. 13, but the processing goes out of the routine of FIG. 13 without setting the character-type segmentation point because there is no difference in character type in the character string "再確認".

After that, basic-word segmentation points are set in step 2705. This processing is executed in accordance with the flowchart of FIG. 15, but the processing goes out of the routine of FIG. 15 without setting the basic-word segmentation points on an assumption that any partial character string of "再確認" is not registered in the basic word storage means 2.

Subsequently, prefix segmentation points are set in step 2706. This processing is executed in accordance with the flowchart of FIG. 33. Assuming that "再" is registered in the prefix storage means 2501, the start-of-prefix segmentation point and the end-of-prefix segmentation point are set before and behind "再" of "再確認", respectively.

The character string succeeding to a keyword candidate is then checked in step 2707 to determine whether the keyword candidate is an effective part-of-speech. In this case, since the character succeeding to "再確認" is "を" that is registered in the effective part-of-speech succeeding hiragana-character-string storage means 3, the processing goes out of the part-of-speech determining routine without setting the keyword end-disable point in accordance with the flowchart of FIG. 17.

Figure 35:
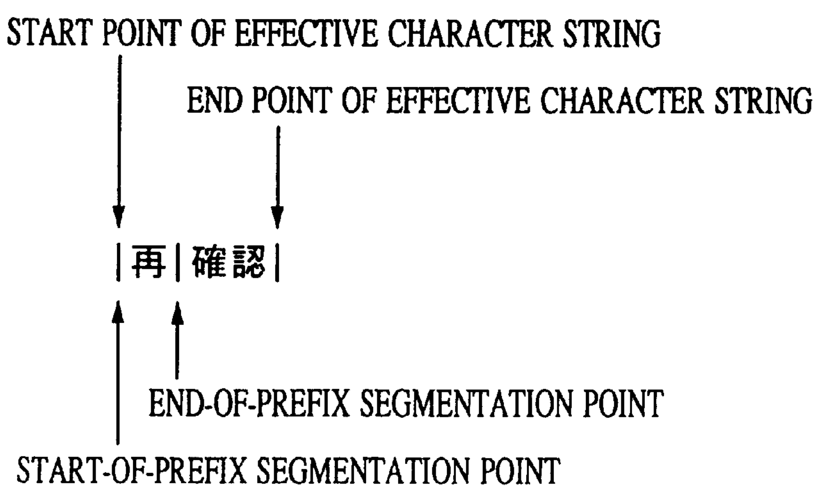
FIG. 35 is a representation showing an intermediate state of the processing made on an example of character string to be processed in the present invention.

As a result of the above processing, the segmentation points are set "再確認", as shown in FIG. 35.

Thereafter, in step 2708, keyword candidates are taken out based on the segmentation points and the effective part-of-speech. In accordance with the flowchart of FIG. 19, "再確認" and "再" are extracted as keywords.

Further, the processing from step 2703 to step 2708 is executed for the next effective character string "行". Assuming that the character-type segmentation point does not exist, "行" is not present in the basic word storage means 2 and the prefix storage means 2501, and "再確認" succeeding to "行" is not present in the effective part-of-speech succeeding hiragana-character-string storage means 3, no keywords are extracted from this segment as with the processing executed in Embodiment 1 for "行".

When all the effective character strings to be processed are taken out, the processing follows the path indicated by N from step 2709, thereby going out of the processing sequence of FIG. 31.

Figure 36A:
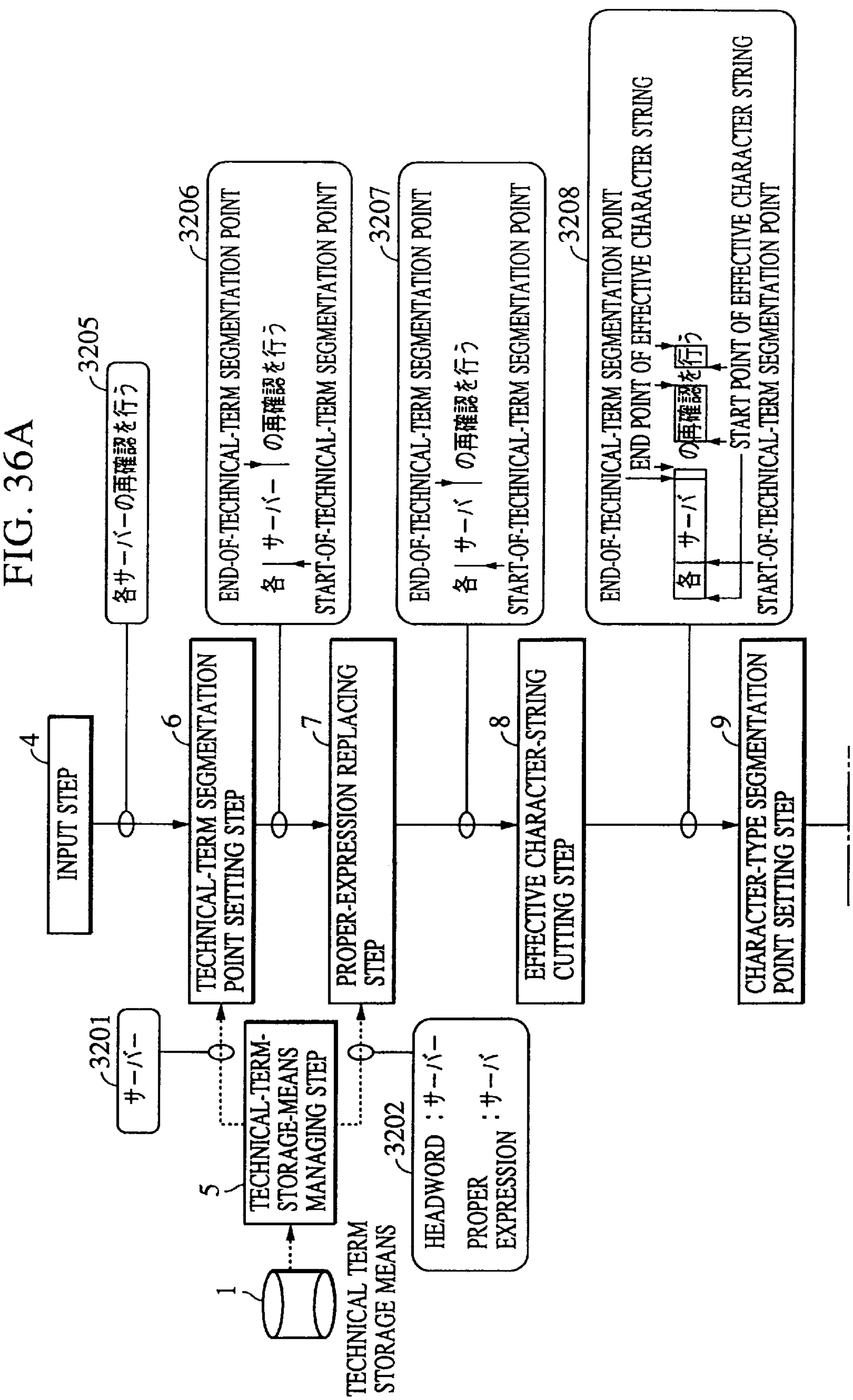
FIG. 36 is a block diagram showing an example of data flow in the keyword extraction method according to Embodiment 3 of the present invention in relation to the successive steps.
Figure 36B:
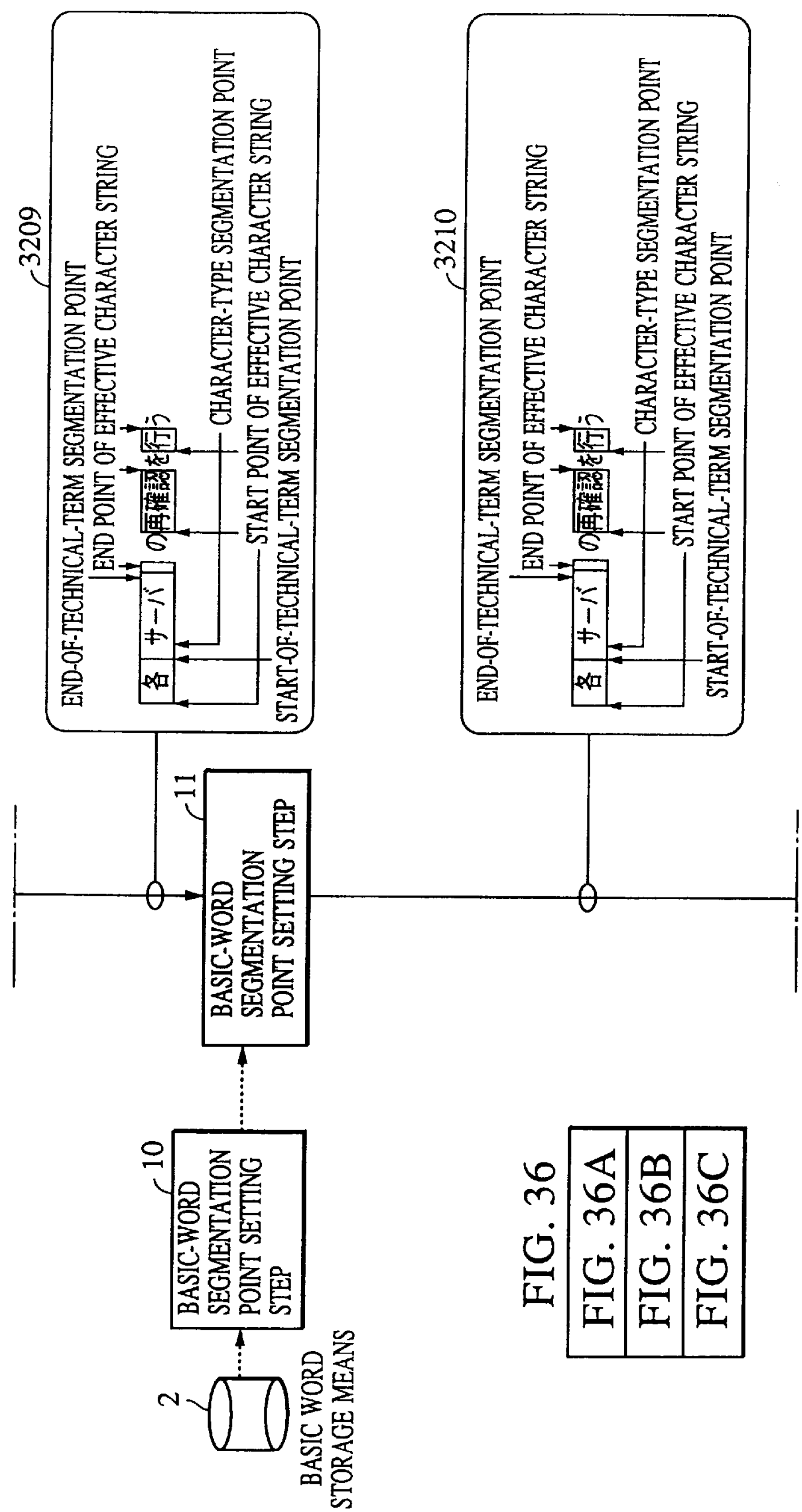
Figure 36C:
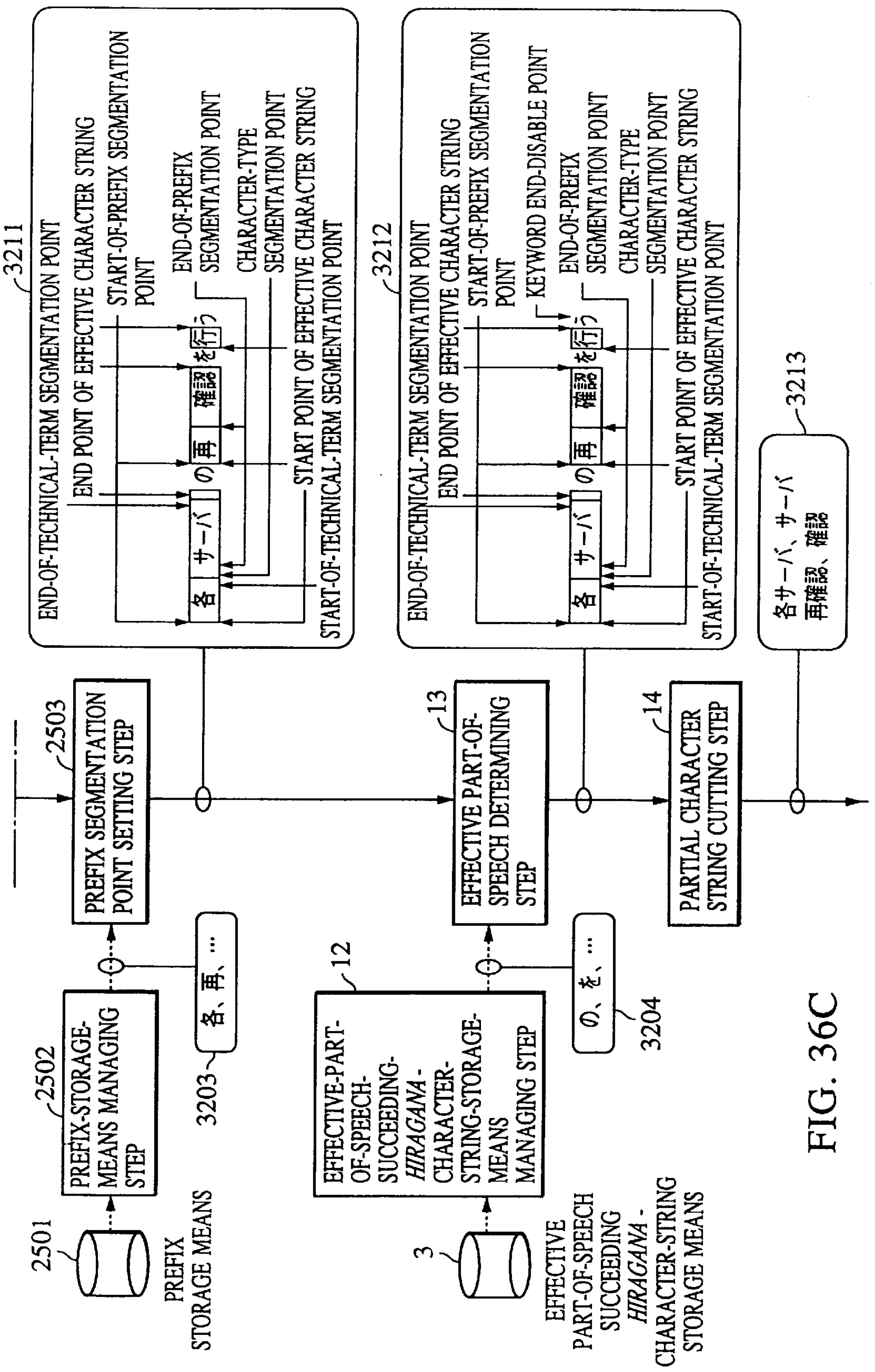

FIG. 36 is a block diagram showing an example of data flow in the present invention in relation to the steps according to the third aspect of the present invention.

Referring to FIG. 36, a Japanese input sentence "各サーバーの再確認を行う。 (kakusahbah no saikakunin wo okonau.=Each server is reconfirmed.)" 3205 is entered in the input step 4. In the technical-term-storage-means managing step 5, a word 3201, i.e., "サーバー", is retrieved from the technical term storage means 1. In the technical-term segmentation point setting step 6, the start-of-technical-term segmentation point and the end-of-technical-term segmentation point are set in respective positions where "サーバー" appears in the input sentence, as shown in block 3206.

Then, the information that the proper expression of the word "サーバー" is "サーバ" is passed from the technical-term-storage-means managing step 5 to the proper-expression replacing step 7. As a result, the character string "サーバー" in block 3206 is replaced by the proper expression, i.e., "サーバ".

Next, in the effective character-string cutting step 8, a range of character string consisted of the effective character types, such as kanji, katakana, alphabets and numerals, or a technical term is taken out. As a result, "各サーバ", "再確認" and "行" are taken out as effective character strings, as shown in block 3208.

Subsequently, in the character-type segmentation point setting step 9, the position where the character type changes from one to another is set as a character-type segmentation point for the character string range of the effective character string which is not itself a technical term. As a result, the character-type segmentation point is set between "各" and "サ", as shown in block 3209.

After that, the basic-word segmentation points are set in the basic-word segmentation point setting step 11. In this case, the basic-word segmentation points are not set as shown in block 3210.

In the prefix-storage-means managing step 2502, the prefix storage means 2501 is searched and the information that words "各" and "再" 3203 are prefixes is passed to the prefix segmentation point setting step 2503. As a result, the start-of-prefix segmentation point and the end-of-prefix segmentation point are set before and behind each of "各" and "再", respectively, as shown in block 3211.

Then, the effective part-of-speech succeeding hiragana-character-string storage means 3 is searched in the effective-part-of-speech-succeeding-hiraganacharacter-string-storage-means managing step 12, and the character string succeeding to each effective character string is checked in the effective part-of-speech determining step 13. Assuming that "の" and "を" are found, but "う" is not found as indicated at 3204, the keyword end-disable point is set behind "行" as shown in block 3212.

Next, the partial character string cutting step 14 cuts out, from the effective character string, the range of character string which starts from any of the start-of-technical-term segmentation point, the start point of the effective character string, the start-of-basic-word segmentation point, the character-type segmentation point, the start-of-prefix segmentation point, and the end-of-prefix segmentation point, which terminates at any of the end-of-technical-term segmentation point, the end point of the effective character string, the end-of-basic-word segmentation point, and the character-type segmentation point, and which does not terminate at the keyword end-disable point. As a result of the above processing, "各サーバ", "サーバ", "再確認" and "再" are extracted as keywords from the input sentence, as shown in block 3213.

It is to be noted that while the segmentation points are set in Embodiment 3 in the order of the technical-term segmentation point setting step, the character-type segmentation point setting step, the basic-word segmentation point setting step, and the prefix segmentation point setting step, the order of those processing steps may be optionally selected.

Also, quantity prefixes preceding character strings for quantity expressions, such as "の" of "約1万円 (yaku ichiman en=about ten thousand yen)" and "第" of "第３０回 (dai 30 kai=30-th)", may be selected as prefixes which are registered in the prefix storage means, enabling the keyword extraction process to be executed for those prefixes in a similar manner as described above.

With Embodiment 3, as described above, when keywords are extracted in consideration of the correlation between prefixes, which are registered in the prefix storage means, and technical terms succeeding to the prefixes, a different expression of the headword is replaced by a corresponding proper expression for the technical term, and collation of words is made using the proper expressions at the time of both registration and retrieval of documents. Accordingly, a keyword extraction method adapted for high-speed document retrieval can be realized while the number of different expressions of words, which serve as retrieval keys, is avoided from increasing in a way of combinations due to the presence/absence of a prefix and different expressions of a technical term succeeding to the prefix.

Embodiment 4.

Figure 37:
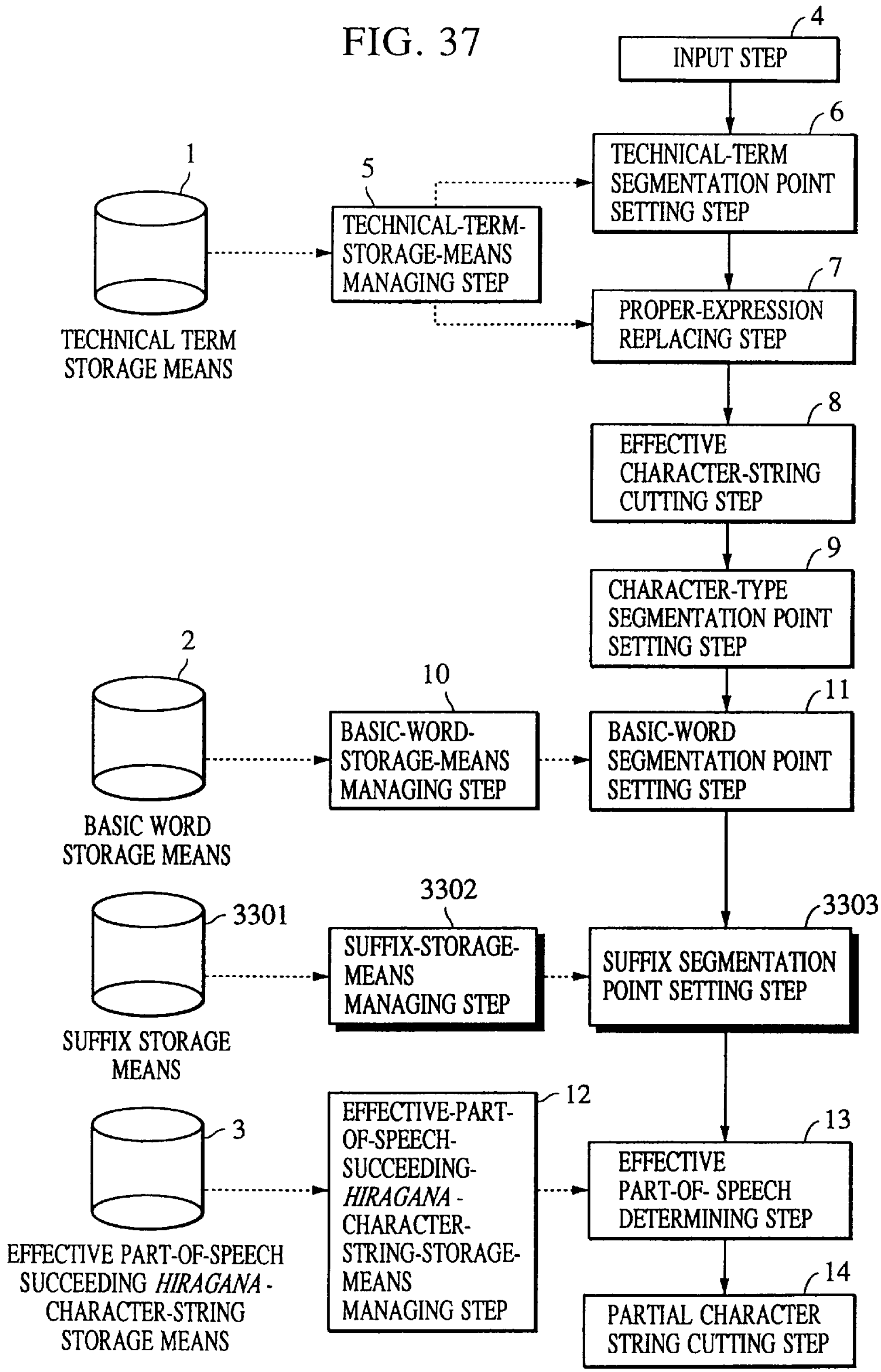
FIG. 37 is an overall block diagram of a keyword extraction method according to Embodiment 4 of the present invention.

FIG. 37 is an overall block diagram of a keyword extraction method according to one embodiment of a fourth aspect, i.e., Embodiment 4, of the present invention. In FIG. 37, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 3301 is suffix storage means which is made up of one field of headword alone as shown in FIG. 38, for example. Denoted by 3302 is a suffix-storage-means managing step for searching the suffix storage means 3301 to take out suffixes, and 3303 is a suffix segmentation point setting step for setting suffix segmentation points before and behind a character string which is in match with any suffix taken out in the suffix-storage-means managing step 3302.

Figure 39:
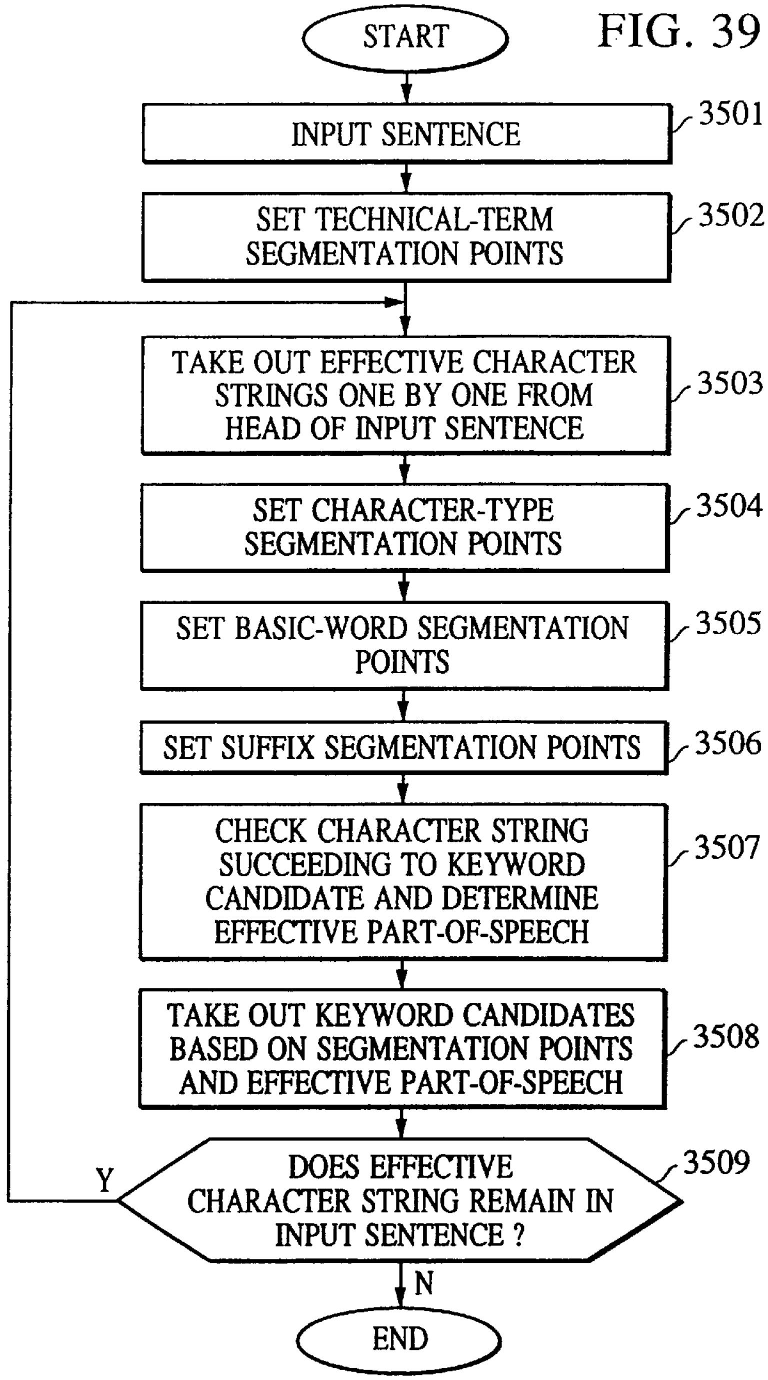
FIG. 39 is a flowchart showing the operation of the keyword extraction method according to Embodiment 4 of the present invention.

FIG. 39 is a flowchart showing the operation of the embodiment of the fourth aspect, i.e., Embodiment 4, of the present invention. The following description will be made on processing of, for example. a Japanese sentence "サーバー側を確認中とする。(sahbahgawa wo kakuninchuu tosuru.=Assume server side to be under confirmation.)". First, in step 3501, the Japanese sentence is input through a keyboard or file. Then, in step 3502, technical-term segmentation points are set in the input sentence.

Figure 40:
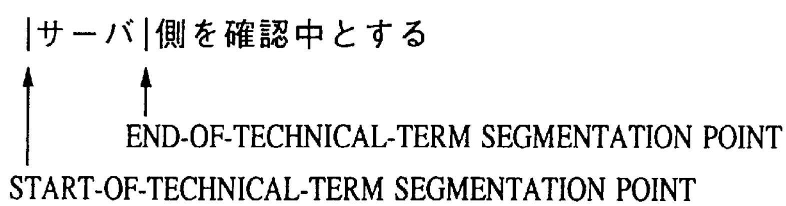
FIG. 40 is a representation showing an intermediate state of the processing made on an example of character string to be processed in the present invention.

Assuming that the words shown in FIG. 2 are registered in the technical term storage means 1, similarly to the processing in Embodiment 1, "サーバー" is taken out as a technical term from the input sentence and is replaced by its proper expression, i.e., "サーバ", in accordance with the flowchart of FIG. 7. Also, the start-of-technical-term segmentation point and the end-of-technical-term segmentation point are set respectively before and behind "サーバ", as shown in FIG. 40.

Next, in step 3503, effective character strings are taken out one by one from the head of the input sentence. In accordance with the flowchart of FIG. 12, similarly to the processing in Embodiment 1, "サーバ側" is taken out as the first effective character string.

Subsequently, a character-type segmentation point is set in step 3504. In accordance with the flowchart of FIG. 13, similarly to the processing in Embodiment 1, the character-type segmentation point is set between "バ" and "側".

After that, basic-word segmentation points are set in step 3505. It is assumed that any partial character string of "サーバ側" is not registered in the basic word storage means 2. In accordance with the flowchart of FIG. 15, similarly to the processing in Embodiment 1, the processing goes to step 3506 without setting the basic-word segmentation points for that effective character string.

Figure 41:
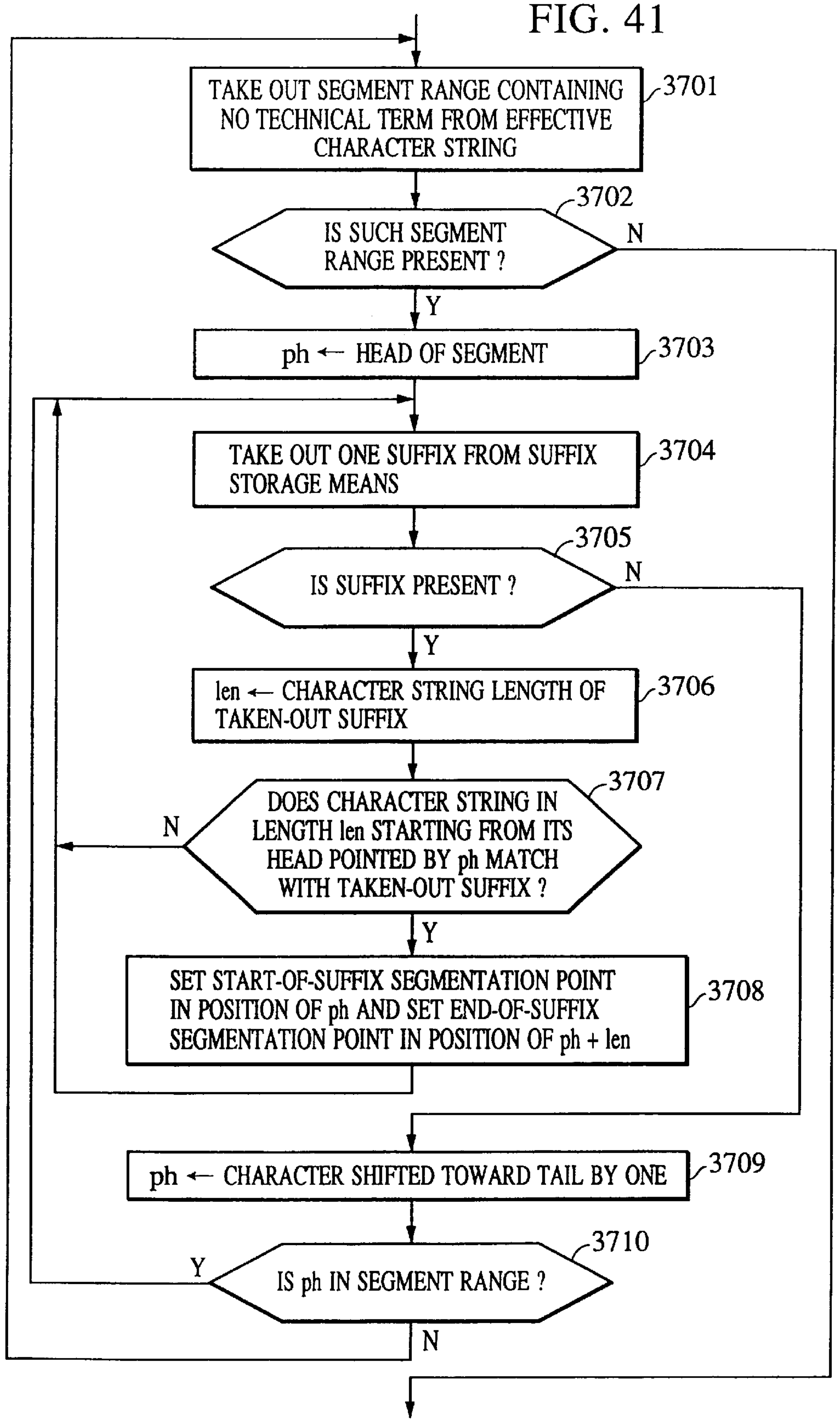
FIG. 41 is a flowchart showing the operation of processing to set suffix segmentation points in the present invention.

Suffix segmentation points are then set in step 3506. FIG. 41 shows a flow of processing to set the suffix segmentation points. First, in 3701, a segment range containing no technical terms is taken out from the effective character string. In accordance with the flowchart of FIG. 16, similarly to the processing in Embodiment 1, "側" is taken out as a segment of the effective character string containing no technical term.

Since there is such a segment to be processed, the determination in step 3702 is responded by YES. Then, in step 3703, a pointer ph is assigned to the head character "側" of the segment of effective character sting which contains no technical term.

Subsequently, suffixes registered in the suffix storage means 3301 are taken out one by one in step 3704, and the length of the taken-out suffix is assigned to a variable len in step 3706. It is then checked in step 3707 whether or not the character string in length len starting from its head pointed by ph matches with the suffix taken out from the suffix storage means 3301.

Assuming that "側" is registered in the suffix storage means 3301 as shown in FIG. 38, the determination in step 3707 is responded by YES upon "側" being taken out in step 3704. After that, in step 3708, a start-of-suffix segmentation point and an end-of-suffix segmentation point are set respectively before and behind "側" in the character string to be processed. When the suffixes registered in the suffix storage means 3301 are all taken out in step 3704, the determination in step 3705 is responded by NO and the processing goes to step 3709.

In step 3709, ph is shifted one character toward the tail of the segment. So long as ph is still in the segment, the suffix is taken out from the suffix storage means 3301 to repeat the similar processing as mentioned above.

In this case, since the character succeeding to "側" is outside the range of effective character string containing no technical term, the processing follows the path indicated by N from step 3710. For "サーバ側", there is no other segment of effective character string containing no technical term. Accordingly, the processing follows the path indicated by N from step 3702, thereby going out of the routine of FIG. 41.

The character string succeeding to a keyword candidate is then checked in step 3507 in FIG. 39 to determine whether the keyword candidate is an effective part-of-speech. In accordance with the flowchart of FIG. 17, similarly to the processing in Embodiment 1, the processing goes out of the part-of-speech determining routine without setting the keyword end-disable point because the character succeeding to "側" is "を" that is registered in the effective part-of-speech succeeding hiragana-character-string storage means 3 in this case.

Figure 42:
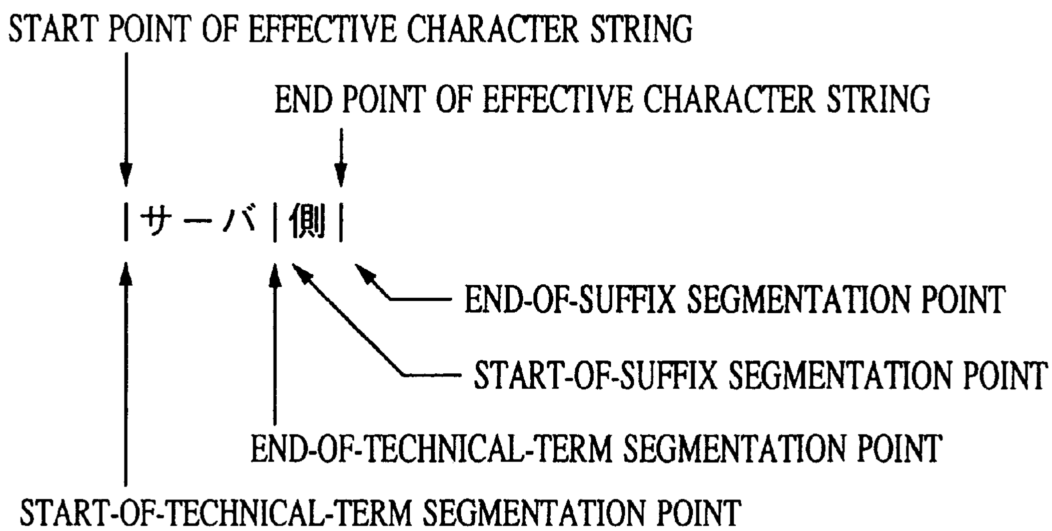
FIG. 42 is a representation showing an intermediate state of the processing made on an example of character string to be processed in the present invention.

As a result of the above processing, the segmentation points are set in the first effective character string, as shown in FIG. 42.

Thereafter, in step 3508, keyword candidates are taken out based on the segmentation points and the effective part-of-speech. In this embodiment, a keyword start-enable point is assumed to be given by any of the start-of-technical-term segmentation point, the start point of the effective character string, the start-of-basic-word segmentation point, and the character-type segmentation point. Also, a keyword end-enable point is assumed to be given by any of the end-of-technical-term segmentation point, the end point of the effective character string, the end-of-basic-word segmentation point, the character-type segmentation point, the start-of-suffix segmentation point, and the end-of-suffix segmentation point. It is further assumed that the position where a keyword end-disable point is set in the effective part-of-speech determining process cannot serve as the keyword end-enable point. In addition, it is assumed that the start-of-suffix segmentation point serves as the keyword start-disable point only and cannot serve as the keyword start-enable point.

In accordance with the flowchart of FIG. 19, similarly to the processing in Embodiment 1, "サーバ側" and "サーバ" are extracted as keywords from "サーバ側".

Next, it is checked in step 3509 whether or not any effective character string still remains in the input sentence. In this case, the processing follows the path indicated by Y and returns to step 3503 for taking out a next effective character string "確認中".

Subsequently, a character-type segmentation point is set in step 3504. This processing is executed in accordance with the flowchart of FIG. 13, but the processing goes out of the routine of FIG. 13 without setting the character-type segmentation point because there is no difference in character type in the character string "確認中".

After that, basic-word segmentation points are set in step 3505. This processing is executed in accordance with the flowchart of FIG. 15, but the processing goes out of the routine of FIG. 15 without setting the basic-word segmentation points on an assumption that any partial character string of "確認中" is not registered in the basic word storage means 2.

Subsequently, suffix segmentation points are set in step 3506. This processing is executed in accordance with the flowchart of FIG. 41. Assuming that "中" is registered in the suffix storage means 3301, the start-of-suffix segmentation point and the end-of-suffix segmentation point are set before and behind "中" of "確認中", respectively.

The character string succeeding to a keyword candidate is then checked in step 3507 to determine whether the keyword candidate is an effective part-of-speech. In this case, since the character succeeding to "確認中" is "と" that is registered in the effective part-of-speech succeeding hiragana-character-string storage means 3, the processing goes out of the part-of-speech determining routine without setting the keyword end-disable point in accordance with the flowchart of FIG. 17.

Figure 43:
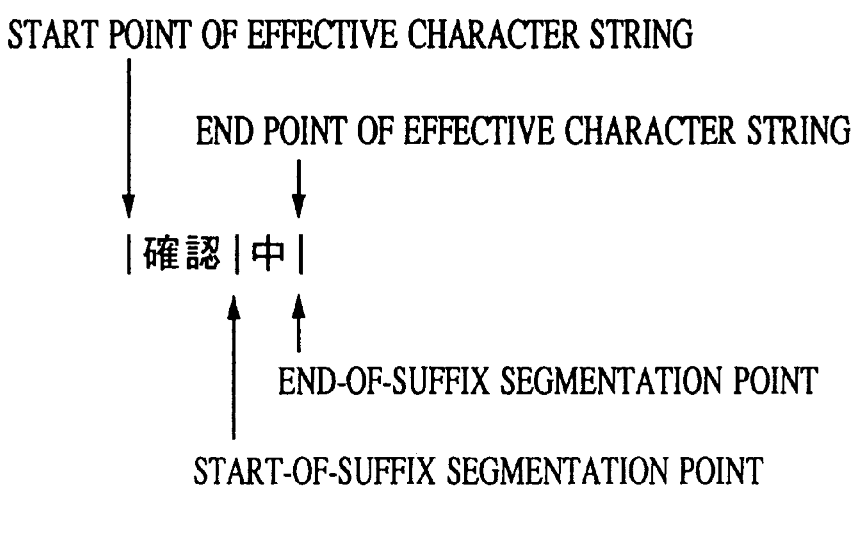
FIG. 43 is a representation showing an intermediate state of the processing made on an example of character string to be processed in the present invention.

As a result of the above processing, the segmentation points are set in "確認中", as shown in FIG. 43.

Thereafter, in step 3508, keyword candidates are taken out based on the segmentation points and the effective part-of-speech. In accordance with the flowchart of FIG. 19, "確認中" and "再" are extracted as keywords.

It is then checked in step 3509 whether or not any segment of effective character string remains in the input sentence. In this case, since there remains no such a segment, the processing sequence of FIG. 39 is completed.

Figure 44A:
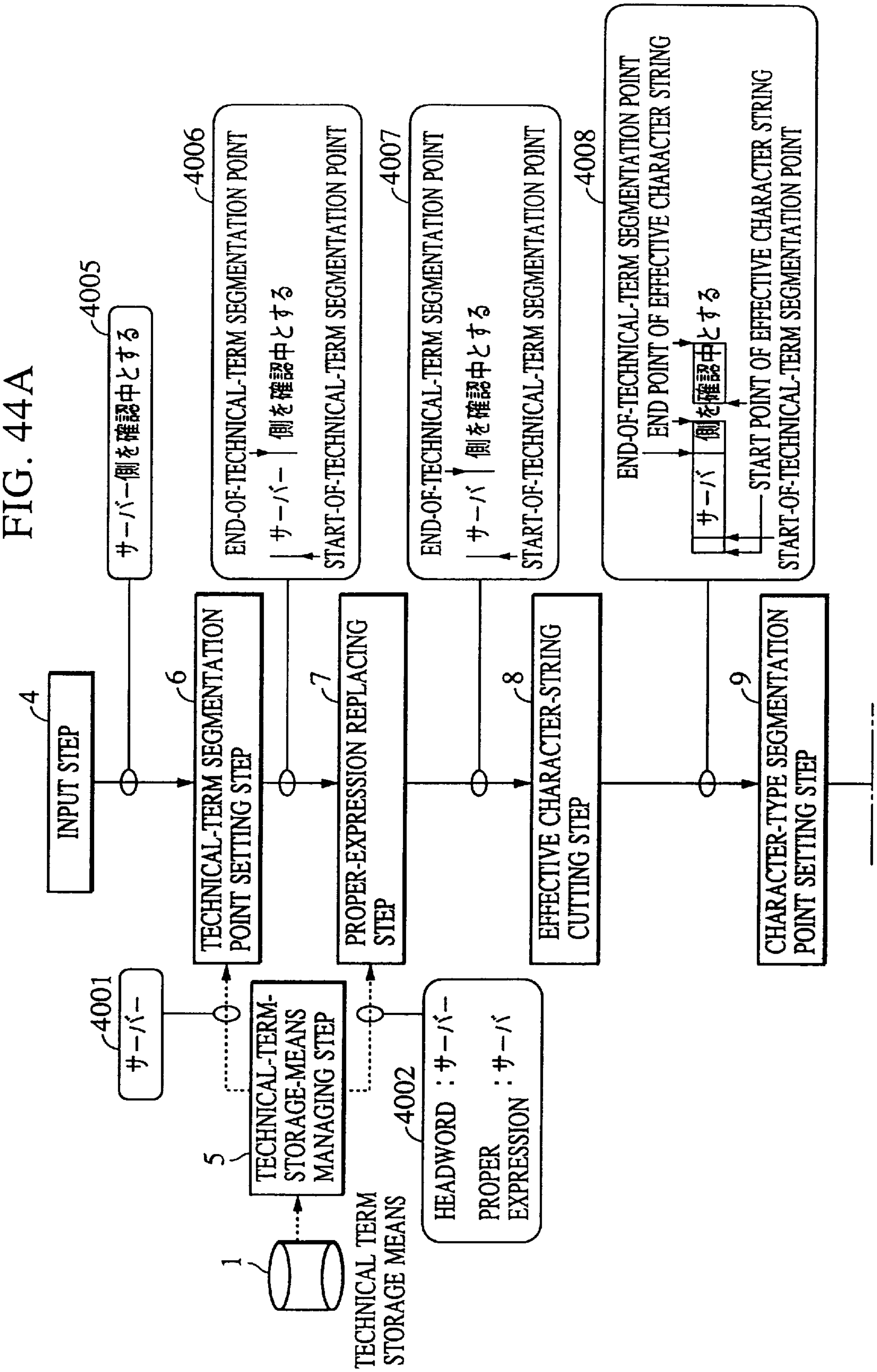
FIG. 44 is a block diagram showing an example of data flow in the keyword extraction method according to Embodiment 4 of the present invention in relation to the successive steps.
Figure 44B:
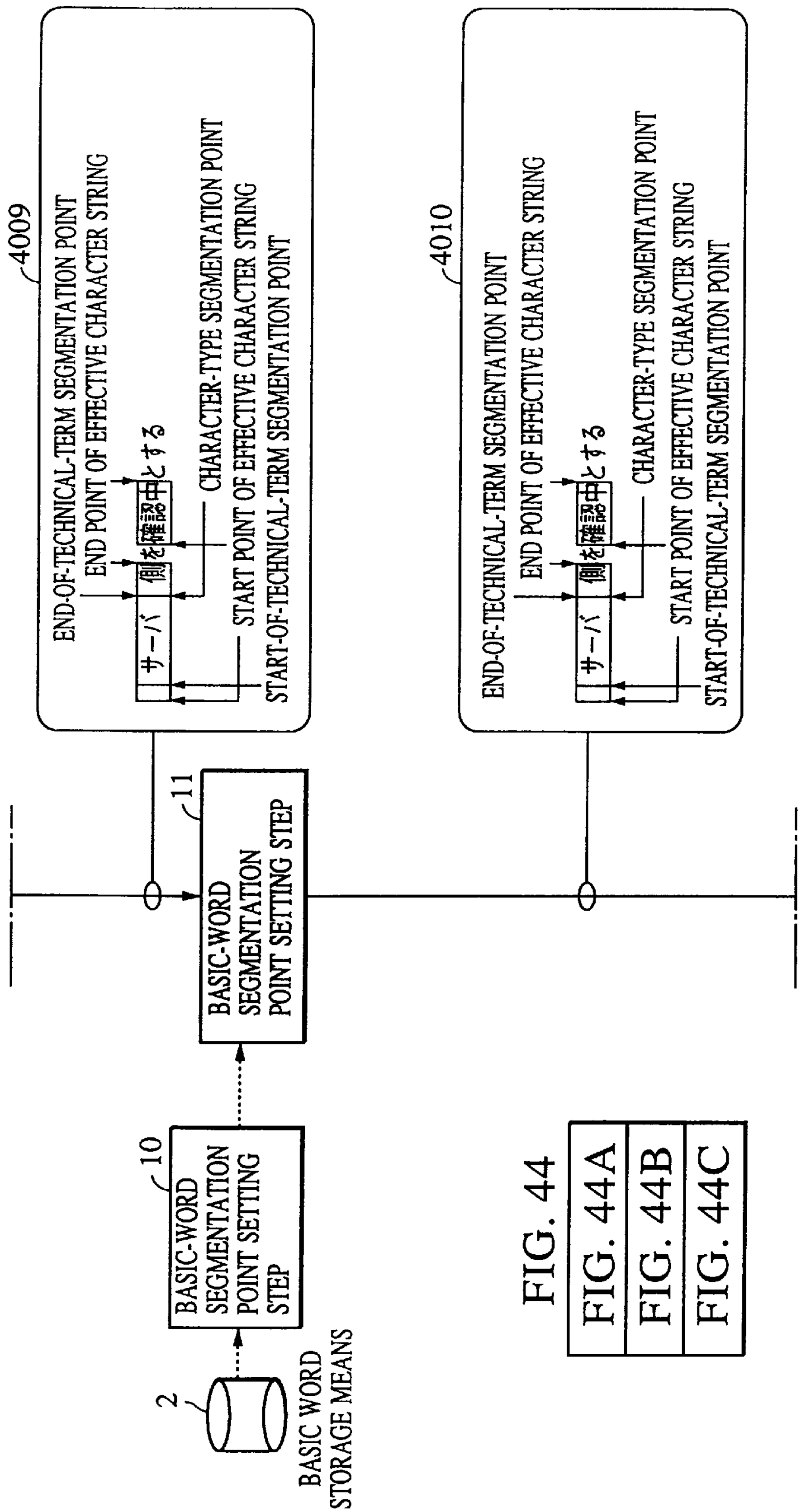
Figure 44C:
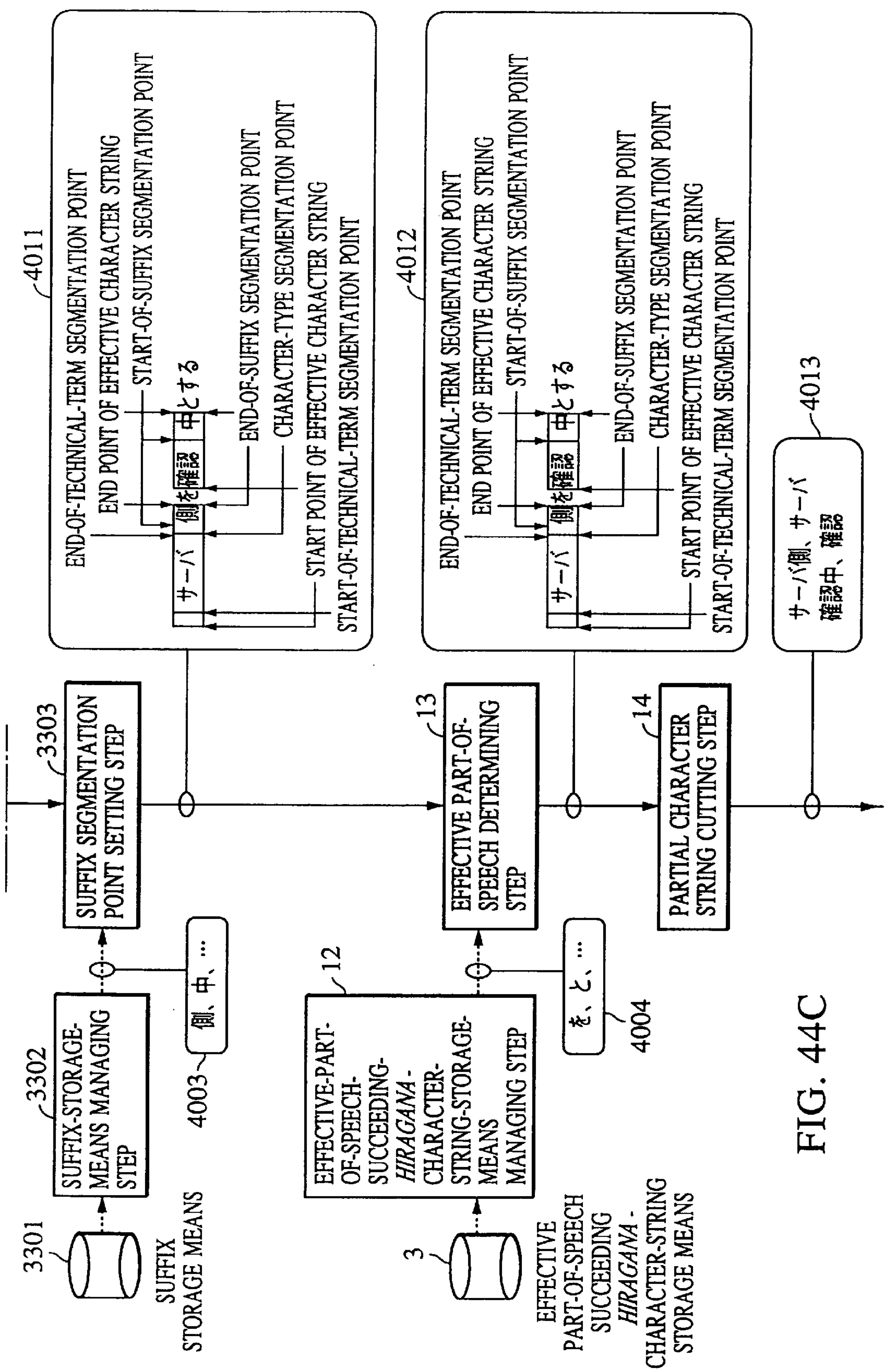

FIG. 44 is a block diagram showing an example of data flow in the present invention in relation to the steps according to the fourth aspect of the present invention.

Referring to FIG. 44, a Japanese input sentence "サーバー側を確認中とする。(sahbahgawa wo kakuninchuu tosuru.=Assume server side to be under confirmation.)" 4005 is entered in the input step 4. In the technical-term-storage-means managing step 5, a word "サーバー" 4001 is retrieved from the technical term storage means 1. In the technical-term segmentation point setting step 6, the start-of-technical-term segmentation point and the end-of-technical-term segmentation point are set in respective positions where "サーバー" appears in the input sentence, as shown in block 4006.

Then, the information that the proper expression of the word "サーバーサーバ" is "サーバ" is passed from the technical-term-storage-means managing step 5 to the proper-expression replacing step 7. As a result, the character string "サーバー" in block 4006 is replaced by the proper expression, i.e., "サーバ".

Next, in the effective character-string cutting step 8, a range of character string consisted of the effective character types, such as kanji, katakana, alphabets and numerals, or a technical term is taken out. As a result, "サーバ" and "側確認中" are taken out as effective character strings, as shown in block 4008.

Subsequently, in the character-type segmentation point setting step 9, the position where the character type changes from one to another is set as a character-type segmentation point for the character string range of the effective character string which is not itself a technical term. As a result, the character-type segmentation point is set between "バ" and "側", as shown in block 4009.

After that, the basic-word segmentation points are set in the basic-word segmentation point setting step 11. In this case, the basic-word segmentation points are not set as shown in block 4010.

In the suffix-storage-means managing step 3302, the suffix storage means 3301 is searched and the information that words "側" and "中" 4003 are suffixes is passed to the suffix segmentation point setting step 3303. As a result, the start-of-suffix segmentation point and the end-of-suffix segmentation point are set before and behind each of "側" and "中", respectively, as shown in block 4011.

Then, the effective part-of-speech succeeding hiragana-character-string storage means 3 is searched in the effective-part-of-speech-succeeding-hiragana-character-string-storage-means managing step 12, and the character string succeeding to each effective character string is checked in the effective part-of-speech determining step 13. Assuming that "を" and "と" are found, the keyword end-disable point is not set as shown in block 4004.

Next, the partial character string cutting step 14 cuts out, from the effective character string, the range of character string which starts from any of the start-of-technical-term segmentation point, the start point of the effective character string, the start-of-basic-word segmentation point, and the character-type segmentation point, which terminates at any of the end-of-technical-term segmentation point, the end point of the effective character string, the end-of-basic-word segmentation point, the character-type segmentation point, the start-of-suffix segmentation point, and the end-of-suffix segmentation point, and which does not start from the start-of-suffix segmentation point and does not terminate at the keyword end-disable point. As a result of the above processing, "サーバ側" "サーバ", 確認中 and "約1万円" are extracted as keywords from the input sentence, as shown in block 4013.

It is to be noted that while this embodiment has been described in connection with suffixes, the keyword extraction process can be performed for an infix, for example, "対" of "通信 (nihon tai amerika=Japan versus America), by setting segmentation points before and behind 対 through the similar processing as described above.

Also, quantity suffixes succeeding to character strings for quantity expressions, such as "円" of "約1万円 (yaku ichiman en=about ten thousand yen)" and "回" of "第３０回 (dai 30 kai=30-th)", may be selected as suffixes which are registered in the suffix storage means, enabling the keyword extraction process to be executed for those suffixes in a similar manner as described above. further, while the segmentation points are set in the order of the technical-term segmentation point setting step, the character-type segmentation point setting step, the basic-word segmentation point setting step, and the suffix segmentation point setting step, the order of those processing steps may be optionally selected.

With Embodiment 4, as described above, when keywords are extracted in consideration of the correlation between suffixes, which are registered in the suffix storage means, and technical terms preceding the suffixes, a different expression of the headword is replaced by a corresponding proper expression for the technical term, and collation of words is made using the proper expressions at the time of both registration and retrieval of documents. Accordingly, a keyword extraction method adapted for high-speed document retrieval can be realized while the number of different expressions of words, which serve as retrieval keys, is avoided from increasing in a way of combinations due to the presence/absence of a suffix and different expressions of a technical term preceding the suffix.

Embodiment 5.

Figure 45:
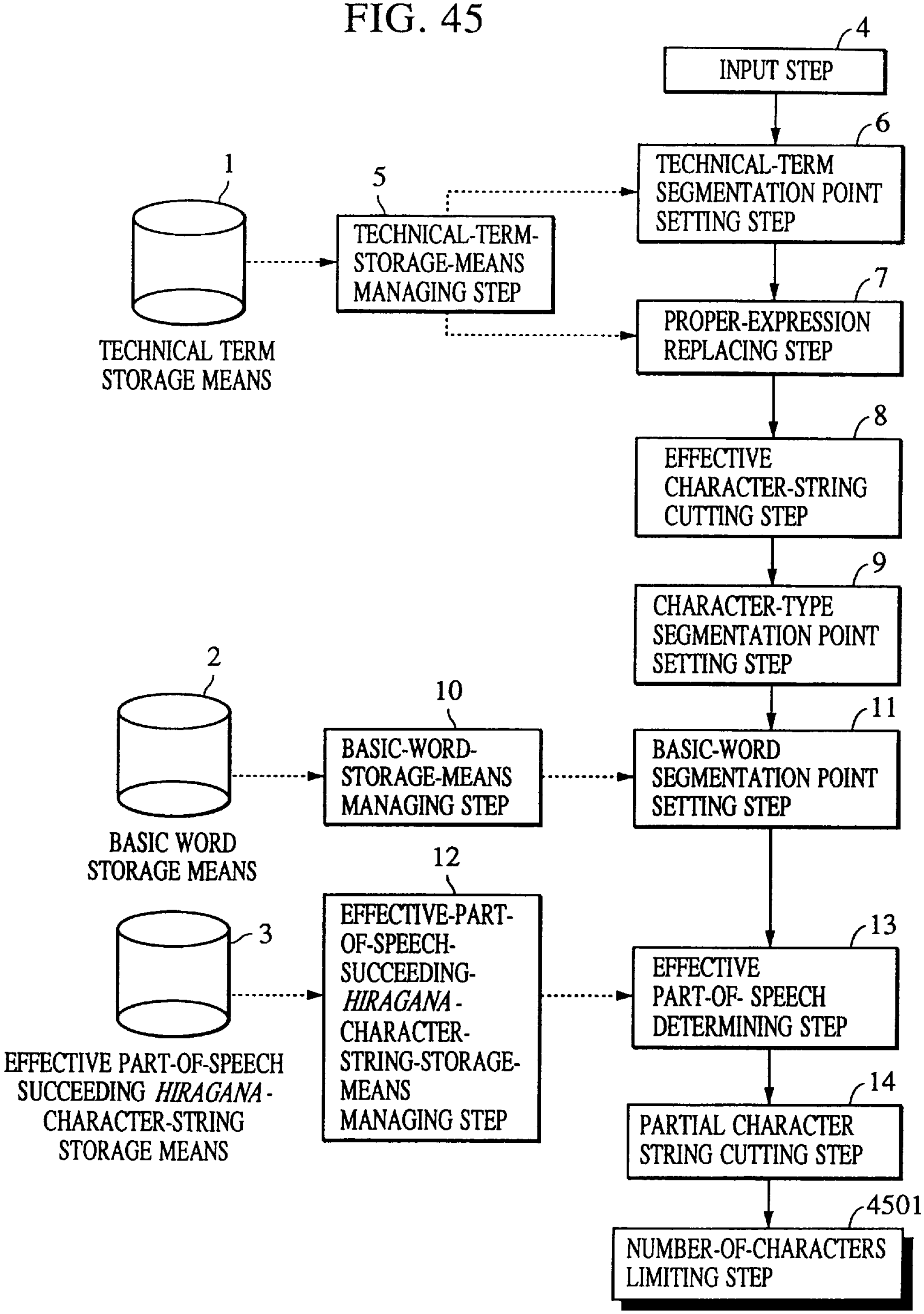
FIG. 45 is an overall block diagram of a keyword extraction method according to Embodiment 5 of the present invention.

FIG. 45 is an overall block diagram of a keyword extraction method according to one embodiment of a fifth-aspect, i.e., Embodiment 5, of the present invention. In FIG. 45, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 4501 is a number-of-character limiting step for deleting those ones of keyword candidates extracted in the partial character string cutting step 14, which have the number of characters not less than a certain value.

Figure 46:
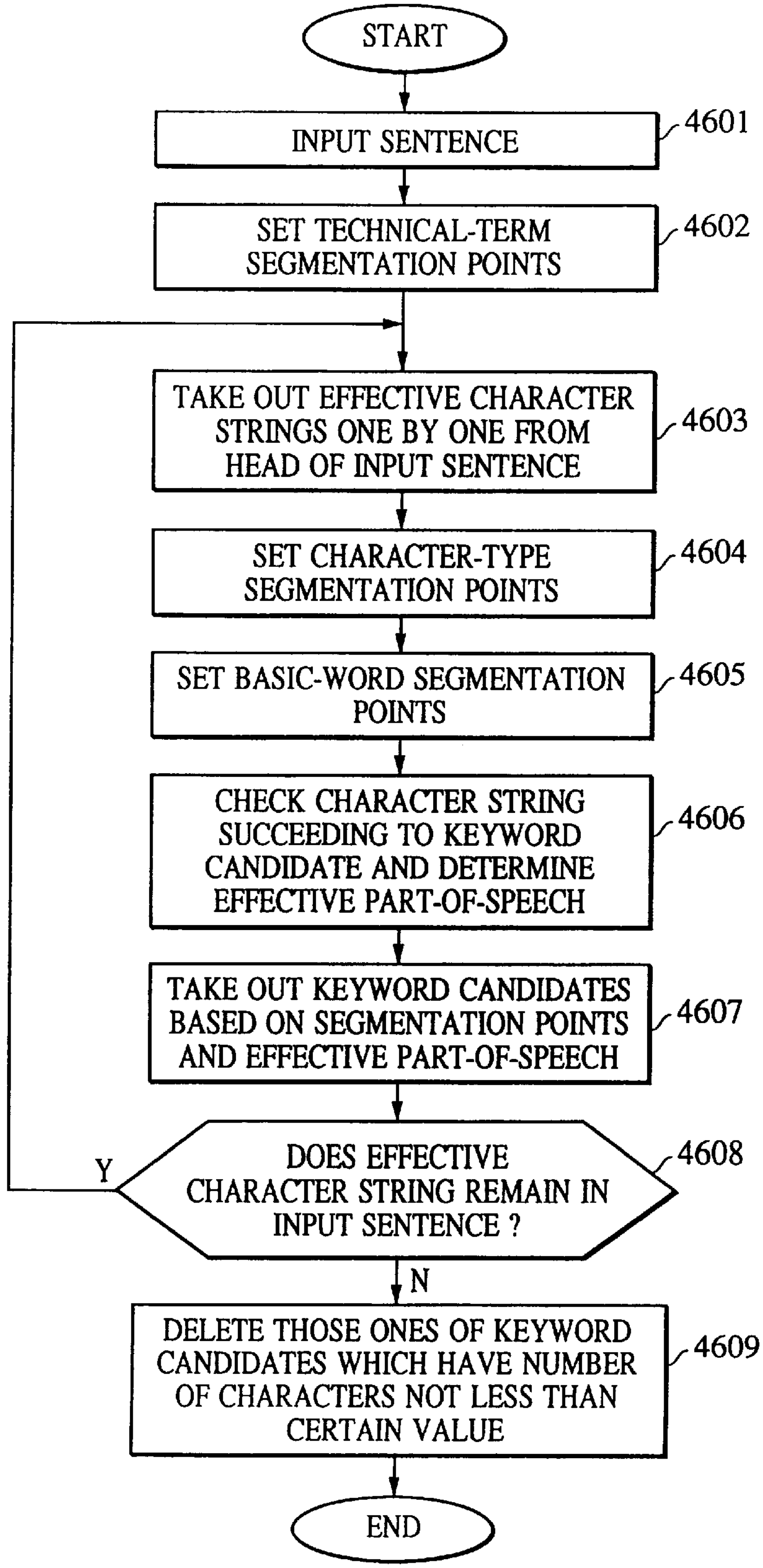
FIG. 46 is a flowchart showing the operation of the keyword extraction method according to Embodiment 5 of the present invention.

FIG. 46 is a flowchart showing the operation of the embodiment of the fifth aspect, i.e., Embodiment 5, of the present invention. The following description will be made on processing of, for example, a Japanese sentence "う切り替え切り替えを行う (yuza intafehsu kirikae wo okonau=A user interface is switched over)". First, in step 4601, the Japanese sentence is input through a keyboard or file. Then, in step 4602, technical-term segmentation points are set in the input sentence.

Assuming that the words shown in FIG. 2 are registered in the technical term storage means 1, "切り替え" is taken out as a technical term from the input sentence, and the start-of-technical-term segmentation point and the end-of-technical-term segmentation point are set respectively before and behind "切り替え" in accordance with the flowchart of FIG. 7.

Next, in step 4603, effective character strings are taken out one by one from the head of the input sentence. In accordance with the flowchart of FIG. 12, "う切り替え切り替え" is taken out as the first effective character string.

Subsequently, a character-type segmentation point is set in step 4604. In accordance with the flowchart of FIG. 13, the character-type segmentation point is set between "を行う" and "切".

After that, basic-word segmentation points are set in step 4605. It is assumed that any partial character string of "ウインタフォーン切り替え" is not registered in the basic word storage means 2. In accordance with the flowchart of FIG. 15, the processing goes to step 4606 without setting the basic-word segmentation points for that effective character string.

The character string succeeding to a keyword candidate is then checked in step 4606 to determine whether the keyword candidate is an effective part-of-speech. In accordance with the flowchart of FIG. 17, the part-of-speech determining routine is skipped because "切り替え" is a technical term.

Thereafter, in step 4607, keyword candidates are taken out based on the segmentation points and the effective part-of-speech. In this embodiment, a keyword start-enable point is assumed to be given by any of the start-of-technical-term segmentation point, the start point of the effective character string, the start-of-basic-word segmentation point, and the character-type segmentation point. Also, a keyword end-enable point is assumed to be given by any of the end-of-technical-term segmentation point, the end point of the effective character string, the end-of-basic-word segmentation point, and the character-type segmentation point. It is further assumed that the position where a keyword end-disable point is set in the effective part-of-speech determining process cannot serve as the keyword end-enable point.

In accordance with the flowchart of FIG. 19, "を切り替え", "切り替え" and "う切り替え切り替え" are extracted as keywords from "う切り替え切り替え".

Next, it is checked in step 4608 whether or not any effective character string still remains in the input sentence.

Further, the processing from step 4603 to step 4607 is executed for the next effective character string "行". Assuming that there is no character-type segmentation point in the effective character string, "行" is not present in the basic word storage means and the prefix storage means, and "う" succeeding to "行" is not present in the effective part-of-speech succeeding hiragana-character-string storage means 3, no keywords are extracted from this segment as with the processing executed in Embodiment 1 for "行".

When all the effective character strings to be processed are taken out, the processing follows the path indicated by N from step 4608 and goes to step 4609.

Figure 47:
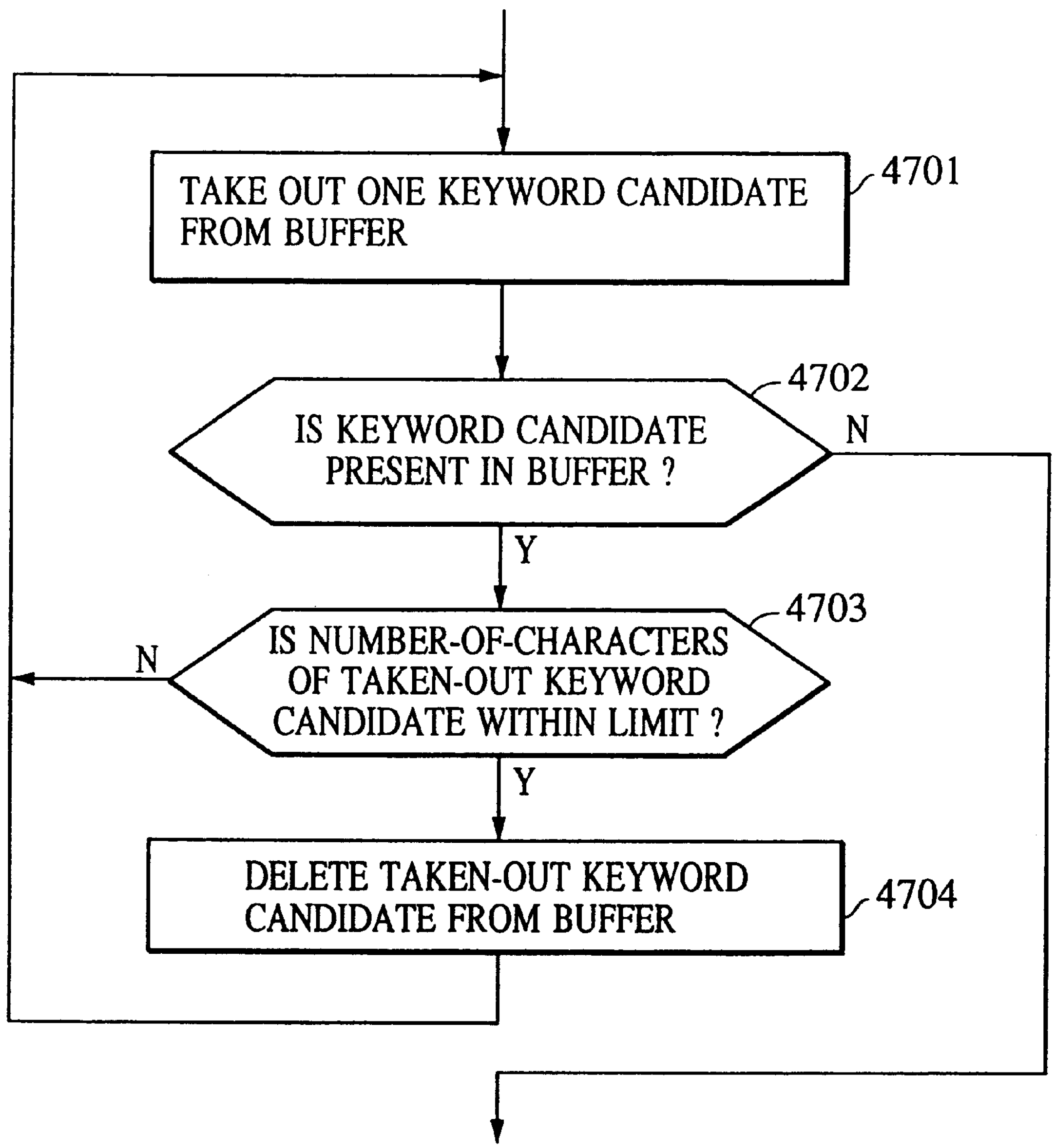
FIG. 47 is a flowchart showing the operation of a number-of-character limiting process in the present invention.

In step 4609, those ones of the extracted keyword candidates which have the number of characters not less than a certain value are deleted. This processing is executed in accordance with a flowchart shown in FIG. 47. In this embodiment, the number of characters is assumed to be limited within 12 characters.

It is assumed that the keyword candidates "う", "切り替え", 切り替え" and "う切り替え 切り替え" are stored in a buffer. First, one of the keyword candidates is taken out from the buffer in step 4701. It is then checked in step 4703 whether or not the number of characters of the taken-out keyword is equal to or less than 12. If the number of characters exceeds 12, then that word is deleted in step 4704. This processing is repeated for all the keyword candidates stored in the buffer, and is completed upon the determination in step 4702 being responded by NO.

As a result of the above processing, since the number of characters of "う切り替え 切り替え" exceeds 12, it is deleted from the buffer. Thus, "う" 切り替え" and 切り替え" are finally extracted as keywords, thereby completing the processing sequence.

Figure 48A:
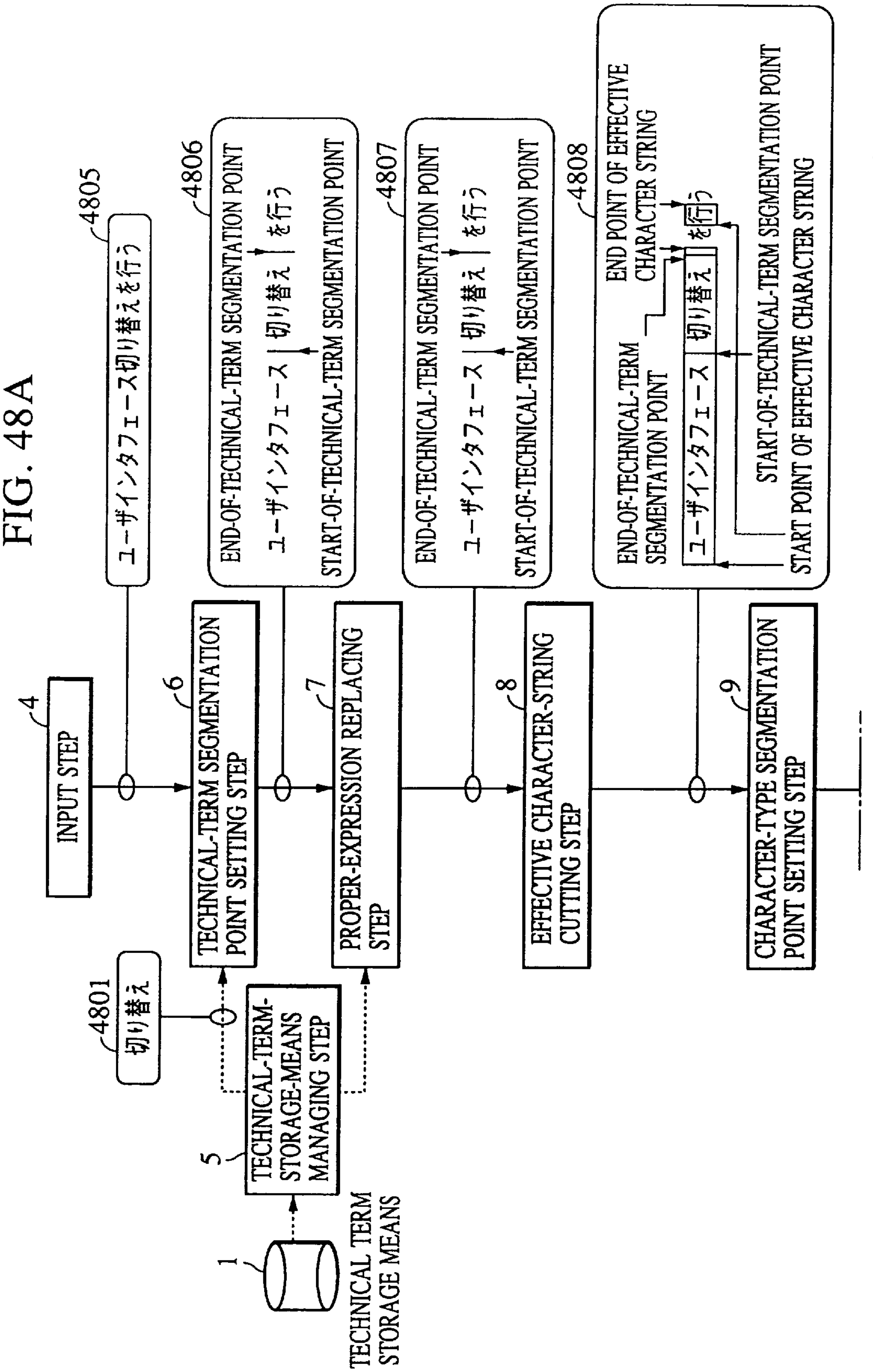
FIG. 48 is a block diagram showing an example of data flow in the keyword extraction method according to Embodiment 5 of the present invention in relation to the successive steps.
Figures 48, 48B:
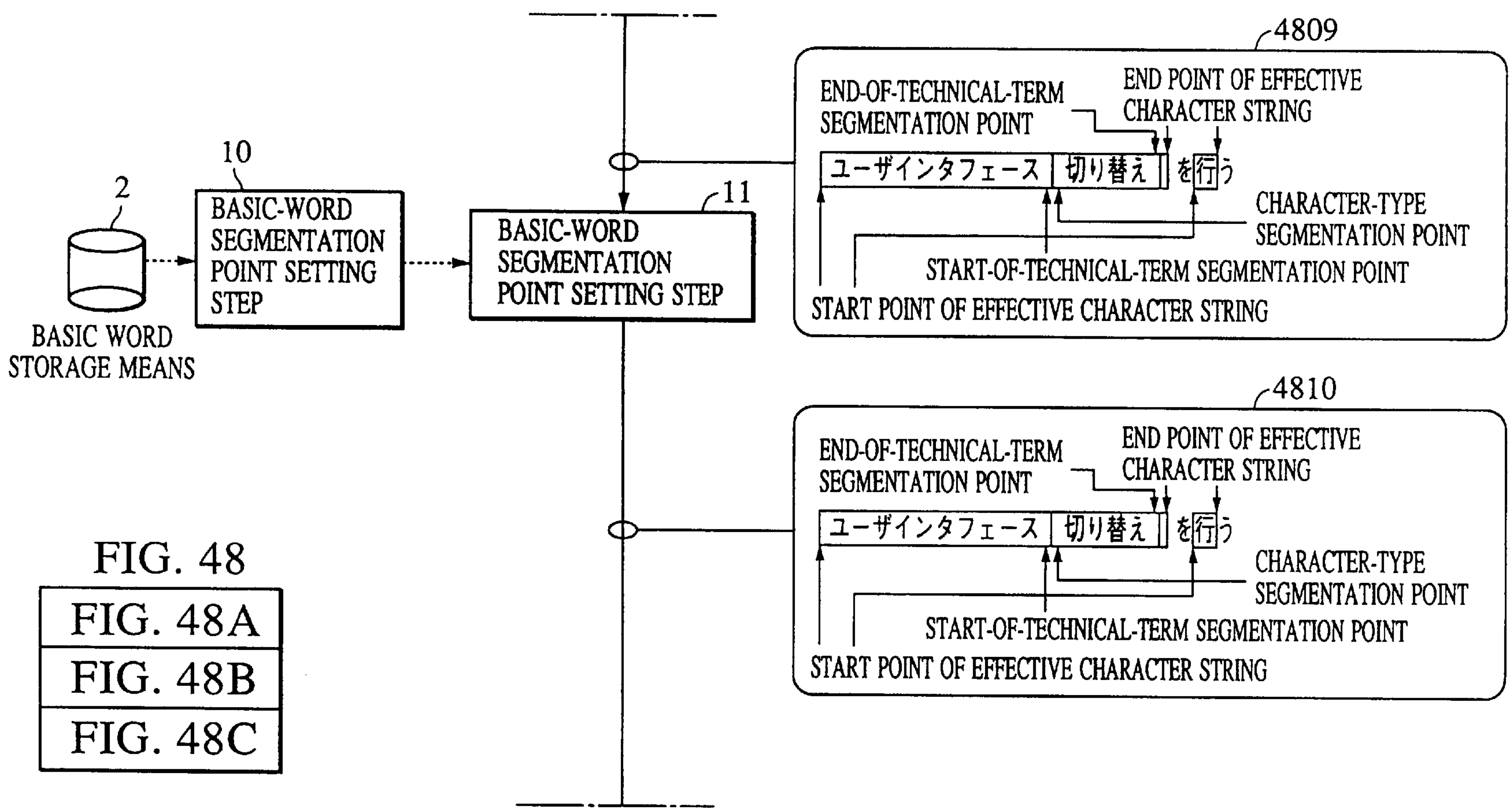
Figure 48C:
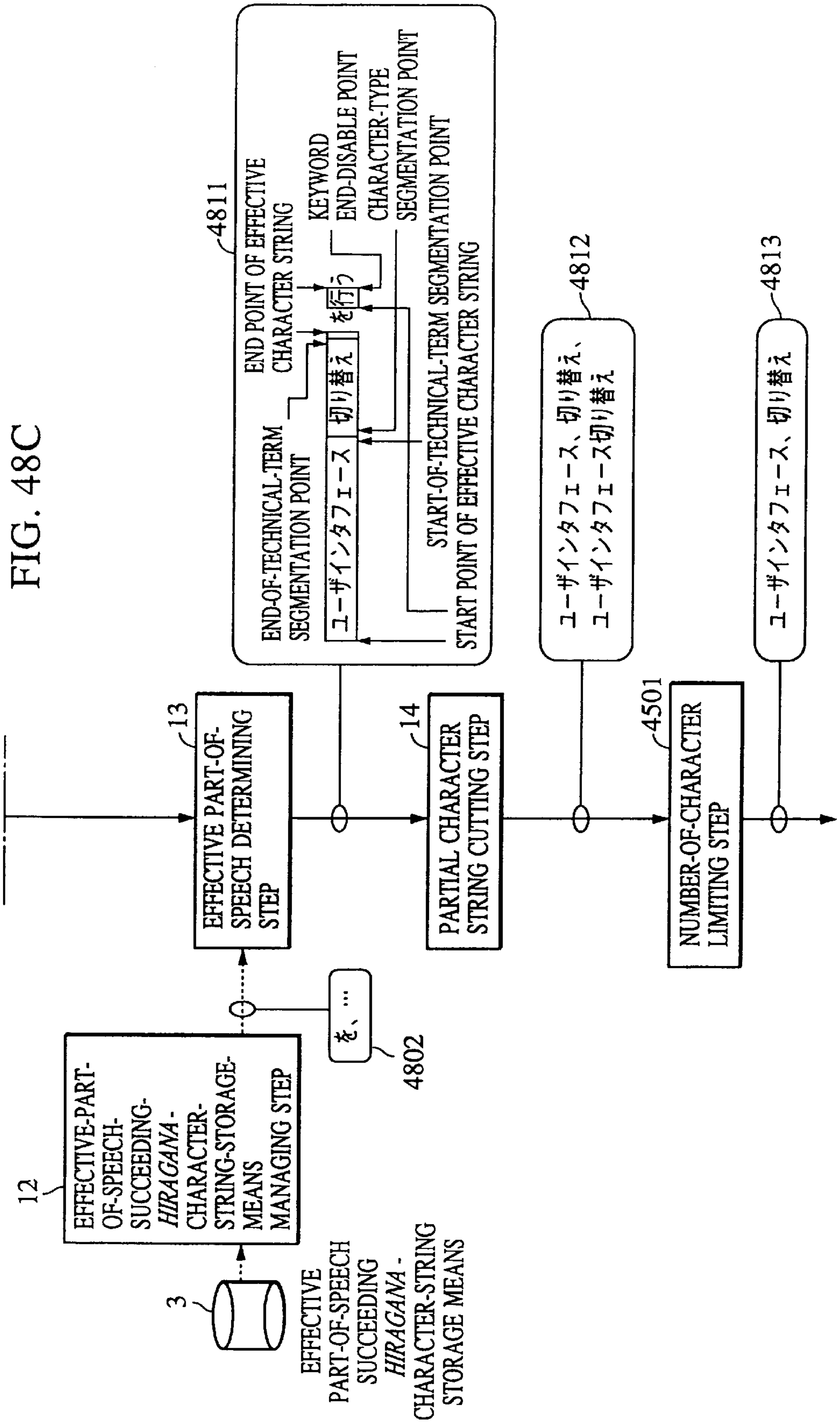

FIG. 48 is a block diagram showing an example of data flow in the present invention in relation to the steps according to the fifth aspect of the present invention.

Referring to FIG. 48, a Japanese input sentence "う切り替え 切り替えを行う (yuza intafehsu kirikae wo okonau=A user interface is switched over)" 4805 is entered in the input step 4. In the technical-term-storage-means managing step 5, a word "切り替え" 4801 is retrieved from the technical term storage means 1. In the technical-term segmentation point setting step 6, the start-of-technical-term segmentation point and the end-of-technical-term segmentation point are set in respective positions where "切り替え" appears in the input sentence, as shown in block 4806.

Then, a different expression of the technical term is replaced by a corresponding proper expression in the proper-expression replacing step 7. In this case, since the input sentence contains no technical terms is written in different expression, the proper-expression replacing step 7 is skipped.

Next, in the effective character-string cutting step 8, a range of character string consisted of the effective character types, such as kanji, katakana, alphabets and numerals, or a technical term is taken out. As a result, "う切り替え 切り替え" and "行" are taken out as effective character strings, as shown in block 4808.

Subsequently, in the character-type segmentation point setting step 9, the position where the character type changes from one to another is set as a character-type segmentation point for the character string range of the effective character string which is not itself a technical term. As a result, the character-type segmentation point is set between "う切り替え" and "切り替え", as shown in block 4809.

After that, the basic-word segmentation points are set in the basic-word segmentation point setting step 11. In this case, since the input sentence contains no basic words, the basic-word segmentation point setting step 11 is skipped.

Then, the effective part-of-speech succeeding hiragana-character-string storage means 3 is searched in the effective-part-of-speech-succeeding-hiragana-character-string-storage-means managing step 12, and the character string succeeding to each effective character string is checked in the effective part-of-speech determining step 13. Assuming that "を" is found, but "う" is not found as indicated at 4802, the keyword end-disable point is set behind "行" as shown in block 4811.

Next, the partial character string cutting step 14 cuts out, from the effective character string, the range of character string which starts from any of the start-of-technical-term segmentation point, the start point of the effective character string, the start-of-basic-word segmentation point, and the character-type segmentation point, which terminates at any of the end-of-technical-term segmentation point, the end point of the effective character string, the end-of-basic-word segmentation point, and the character-type segmentation point, and which does not terminate at the keyword end-disable point. As a result of the above processing, "う切り替え", "切り替え" and "う切り替え 切り替え" are extracted as keyword candidates from the input sentence, as shown in block 4812.

Thereafter, in the number-of-characters limiting step 4501, those ones of the extracted keyword candidates which have the number of characters in excess of 12 are deleted. As a result of this processing, "う切り替え" and "切り替え" are finally extracted as keywords from the input sentence, as shown in block 4813.

It is to be noted that while the segmentation points are set in the order of the technical-term segmentation point setting step, the character-type segmentation point setting step, and the basic-word segmentation point setting step in Embodiment 5, the order of those processing steps may be optionally selected.

With Embodiment 5, as described above, the number of characters of the extracted keyword is limited so as to fall in a certain range. To this end, for the technical terms registered in the technical term storage means, the keyword is extracted after replacing a different expression of the headword by a corresponding proper expression, and the number of characters is then counted for the keyword having the proper expression. Accordingly, a keyword extraction method is realized which can avoid such an uneven extraction of keywords where some words are registered, but other words are deleted depending on the difference in the number of characters between different expressions of even those words which have the similar meaning.

Embodiment 6.

Figure 49:
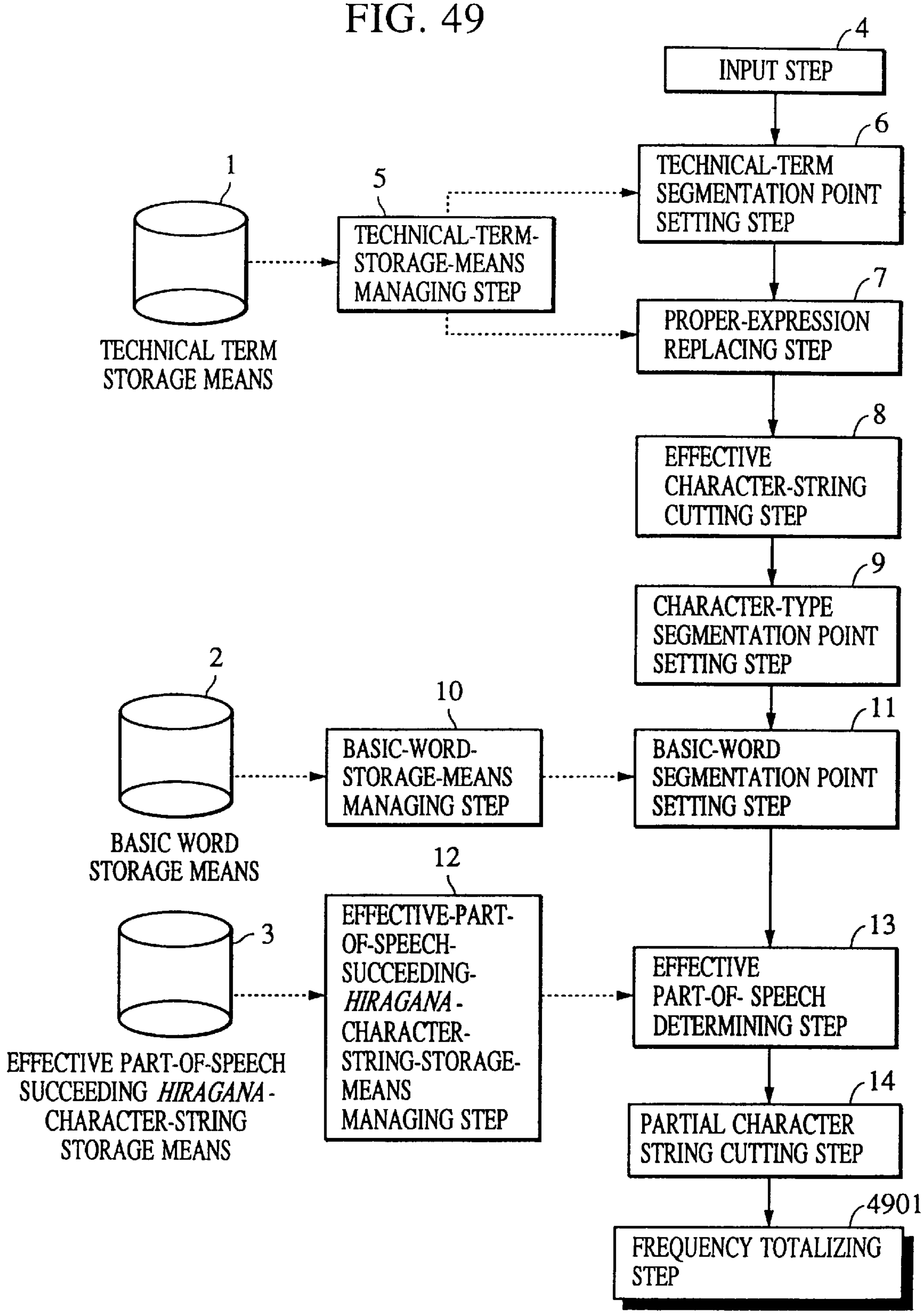
FIG. 49 is an overall block diagram of a keyword extraction method according to Embodiment 6 of the present invention.

FIG. 49 is an overall block diagram of a keyword extraction method according to one embodiment of a sixth aspect, i.e., Embodiment 6, of the present invention. In FIG. 49, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 4901 is a frequency totalizing step for totalizing the appearance frequency for each extracted keyword.

Figure 50:
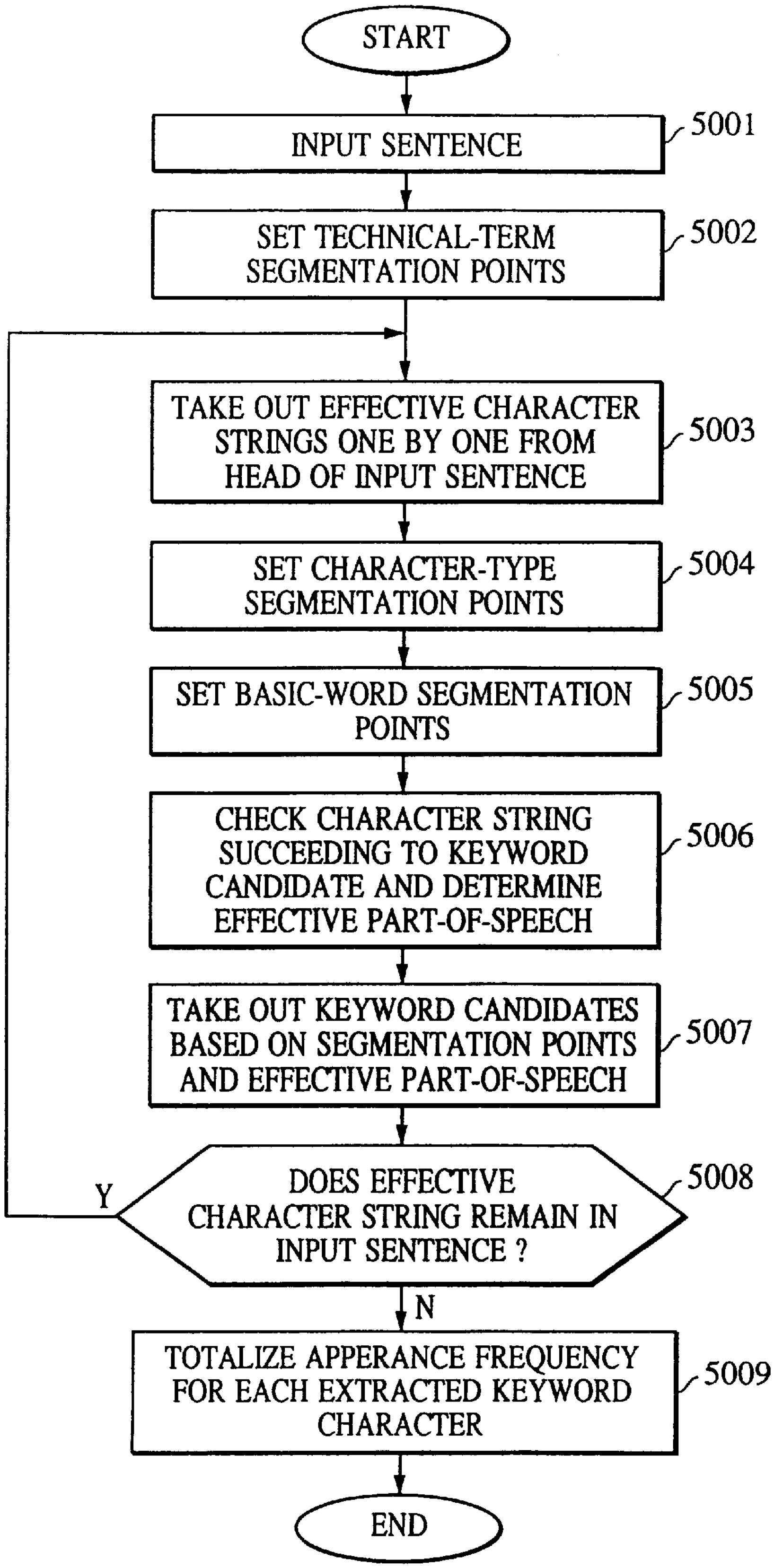
FIG. 50 is a flowchart showing the operation of the keyword extraction method according to Embodiment 6 of the present invention.

FIG. 50 is a flowchart showing the operation of the embodiment of the sixth aspect, i.e., Embodiment 6, of the present invention. The following description will be made on processing of, for example, a Japanese sentence "端末の切り替えと回線の切り換えを行う" (tanmatsuno kirikae to kaisenno kirikae wo okonau=Terminal switching and line switching are made)". First, in step 5001, the Japanese sentence is input through a keyboard or file. Then, in step 5002, technical-term segmentation points are set in the input sentence.

Assuming that the words shown in FIG. 2 are registered in the technical term storage means 1, "切り替え" and "切り換え

切り換え" are taken out as technical terms from the input sentence in accordance with the flowchart of FIG. 7. Also, the start-of-technical-term segmentation point and the end-of-technical-term segmentation point are set respectively before and behind each of "切り替え" and "切り換え". Since "切り換え" is a different expression, it is replaced by a corresponding proper expression, i.e., "切り替え".

Next, in step 5003, effective character strings are taken out one by one from the head of the input sentence. In accordance with the flowchart of FIG. 12, "端末" is taken out as the first effective character string.

Subsequently, a character-type segmentation point is set in step 5004. This processing is executed in accordance with the flowchart of FIG. 13 similarly to the processing in Embodiment 1. In this case, however, since there is no difference in character type, the processing goes to next step 5005 without setting the character-type segmentation point.

Basic-word segmentation points are set in next step 5005. It is assumed that any partial character string of "端末" is not registered in the basic word storage means 2. This processing is executed in accordance with the flowchart of FIG. 15 similarly to the processing in Embodiment 1. In this case, however, the processing goes to step 5006 without setting the basic-word segmentation points for that effective character string.

The character string succeeding to a keyword candidate is then checked in step 5006 to determine whether the keyword candidate is an effective part-of-speech. In this case, since the character succeeding to "端末" is "の" that is registered in the effective part-of-speech succeeding hiragana-character-string storage means 3, the processing goes out of the part-of-speech determining routine without setting the keyword end-disable point in accordance with the flowchart of FIG. 17.

Thereafter, in step 5007, keyword candidates are taken out based on the segmentation points and the effective part-of-speech. In this embodiment, a keyword start-enable point is assumed to be given by any of the start-of-technical-term segmentation point, the start point of the effective character string, the start-of-basic-word segmentation point, and the character-type segmentation point. Also, a keyword end-enable point is assumed to be given by any of the end-of-technical-term segmentation point, the end point of the effective character string, the end-of-basic-word segmentation point, and the character-type segmentation point. It is further assumed that the position where a keyword end-disable point is set in the effective part-of-speech determining process cannot serve as the keyword end-enable point.

In accordance with the flowchart of FIG. 19, "端末" is extracted as a keyword from "端末".

Next, it is checked in step 5008 whether or not any effective character string still remains in the input sentence. Repeating the above processing, character strings "切り替え", "回線", "切り替え" and "行" are taken out successively as effective character strings. For "切り替え", since neither character-type segmentation point and nor basic-word segmentation points are set in the range of technical term, "切り替え" is allowed to serve as a keyword candidate as it is. Assuming that there is no difference in character type in the character string "回線" and any partial character string of "回線" is not registered in the basic word storage means 2, "回線" is also allowed to serve as a keyword candidate as it is. As with Embodiment 1, no keywords are extracted from "行".

As a result, until the determination in step 5008 is responded by NO, four words "端末", "切り替え", "回線" and "切り替え" are extracted as keyword candidates.

Figure 51:
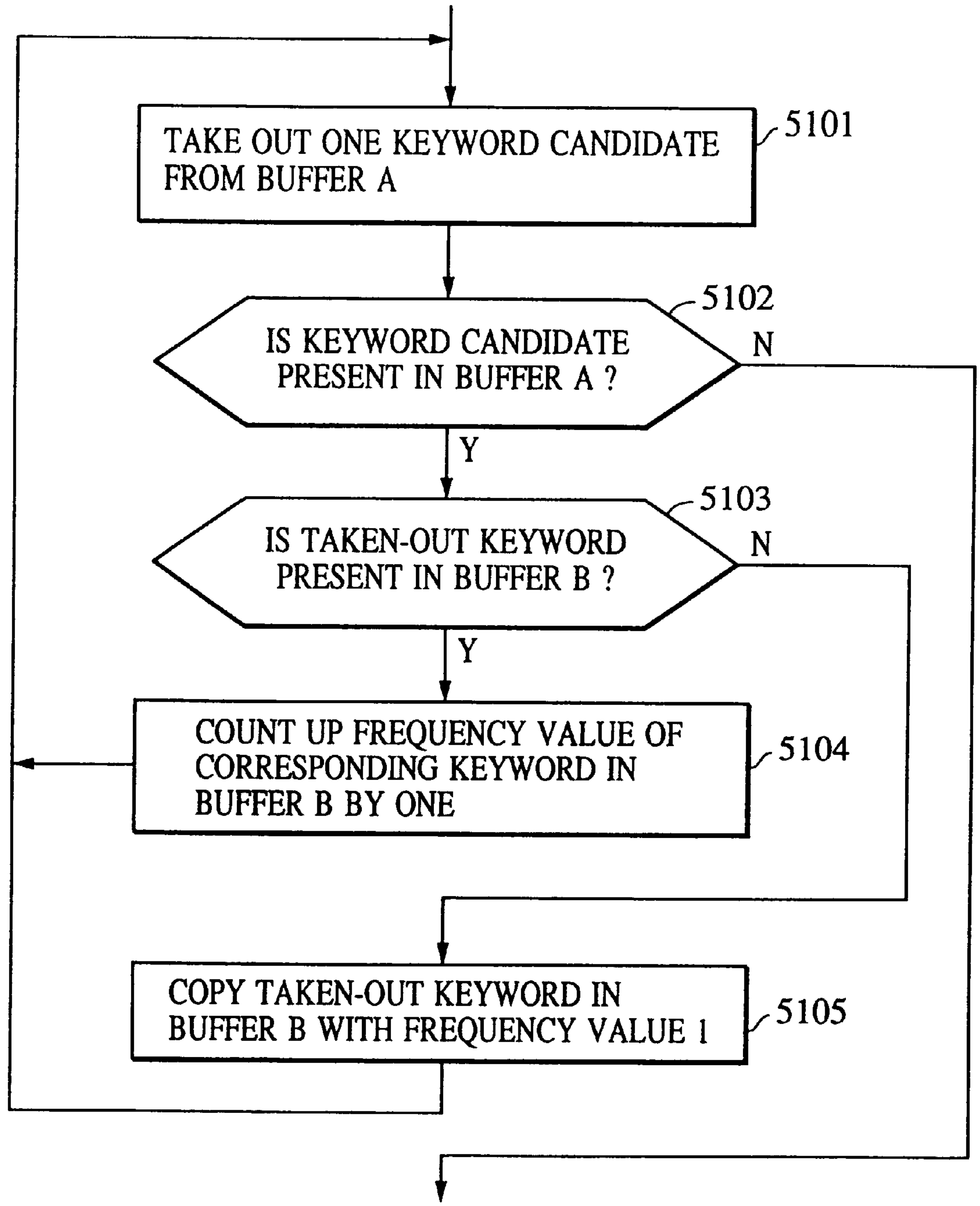
FIG. 51 is a flowchart showing the operation of a frequency totalizing process in the present invention.

In step 5009, the appearance frequency is totalized for each of the extracted candidates. This processing is executed in accordance with a flowchart shown in FIG. 51.

It is assumed that the keyword candidates "端末", "切り替え", "回線" and "切り替え" are stored in a buffer A. Also, a buffer B is assumed to be empty. First, one of the keyword candidates is taken out from the buffer A in step 5101. It is then checked in step 5103 whether or not the taken-out keyword is present in the buffer B. If the taken-out keyword is present in the buffer B, then a frequency value of that keyword in the buffer B is counted up one in step 5104. If the taken-out keyword is not present in the buffer B, then it is copied into the buffer B in step 5105 with a frequency value given 1. This processing is repeated for all the keyword candidates stored in the buffer A, and is completed upon the determination in step 5102 being responded by NO. The finally extracted keywords are those stored in the buffer B.

In the above processing, "端末", "切り替え" appearing first in the input sentence, and "回線" are copied into the buffer B in step 5105 with frequency values all given 1. For "切り替え" appearing second in the input sentence, the processing to count up the frequency value of "切り替え" in the buffer B by one is executed in step 5104. As a result, "端末", "切り替え" and "回線" are finally extracted as keywords with frequency values given 1, 2 and 1, respectively. The processing in step 5009 is thus completed.

Figure 52A:
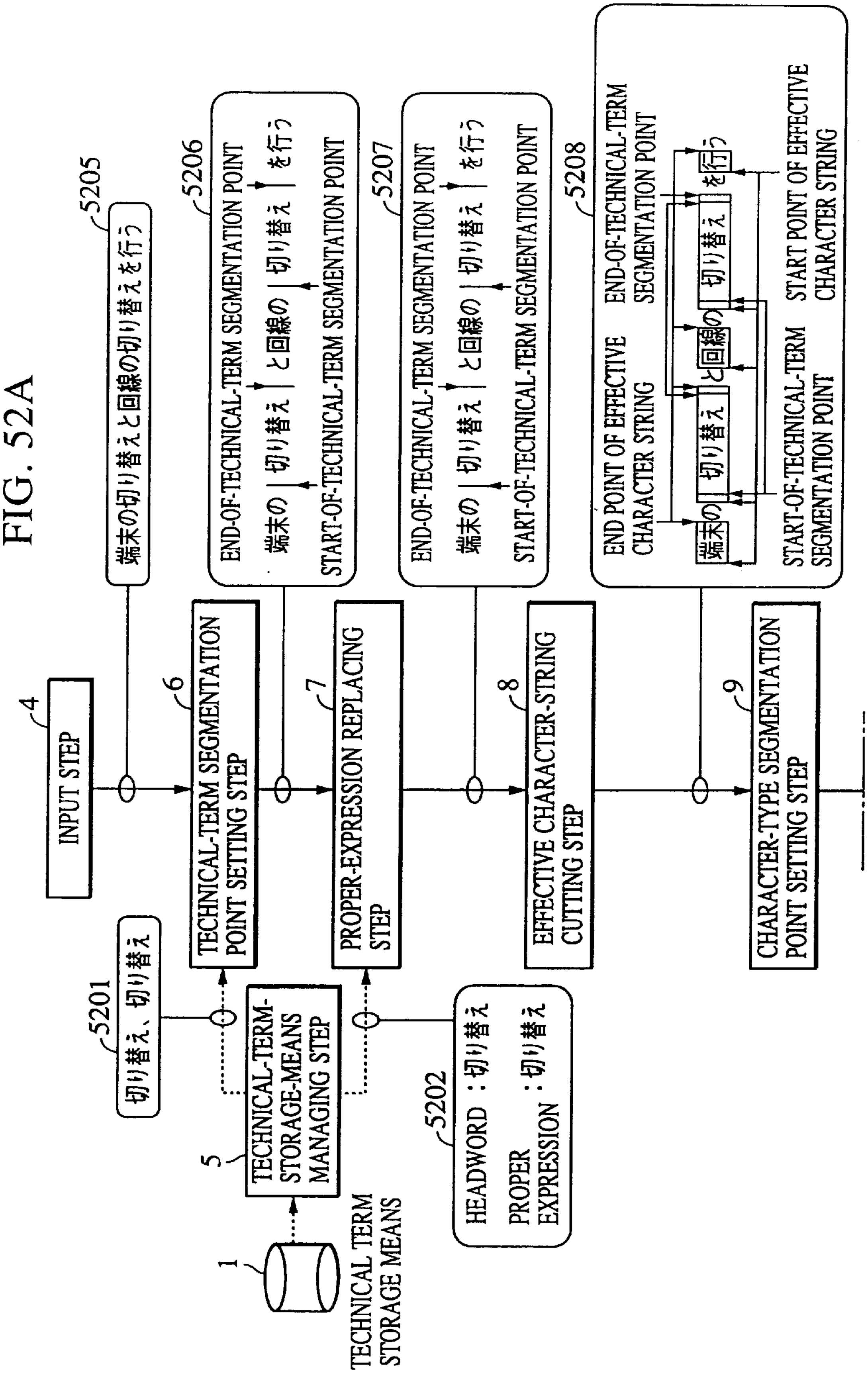
FIG. 52 is a block diagram showing an example of data flow in the keyword extraction method according to Embodiment 6 of the present invention in relation to the successive steps.
Figure 52B:
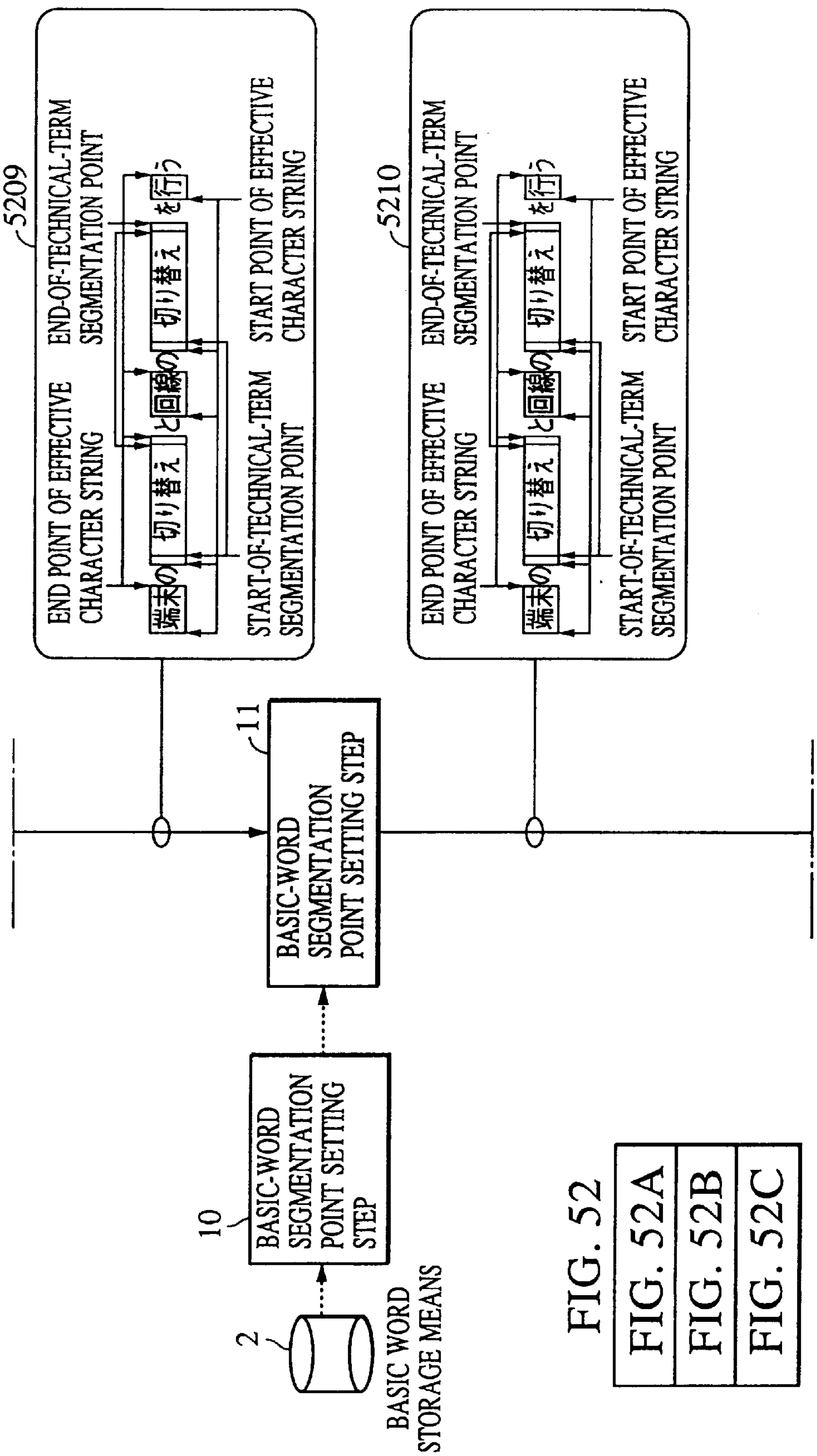
Figure 52C:
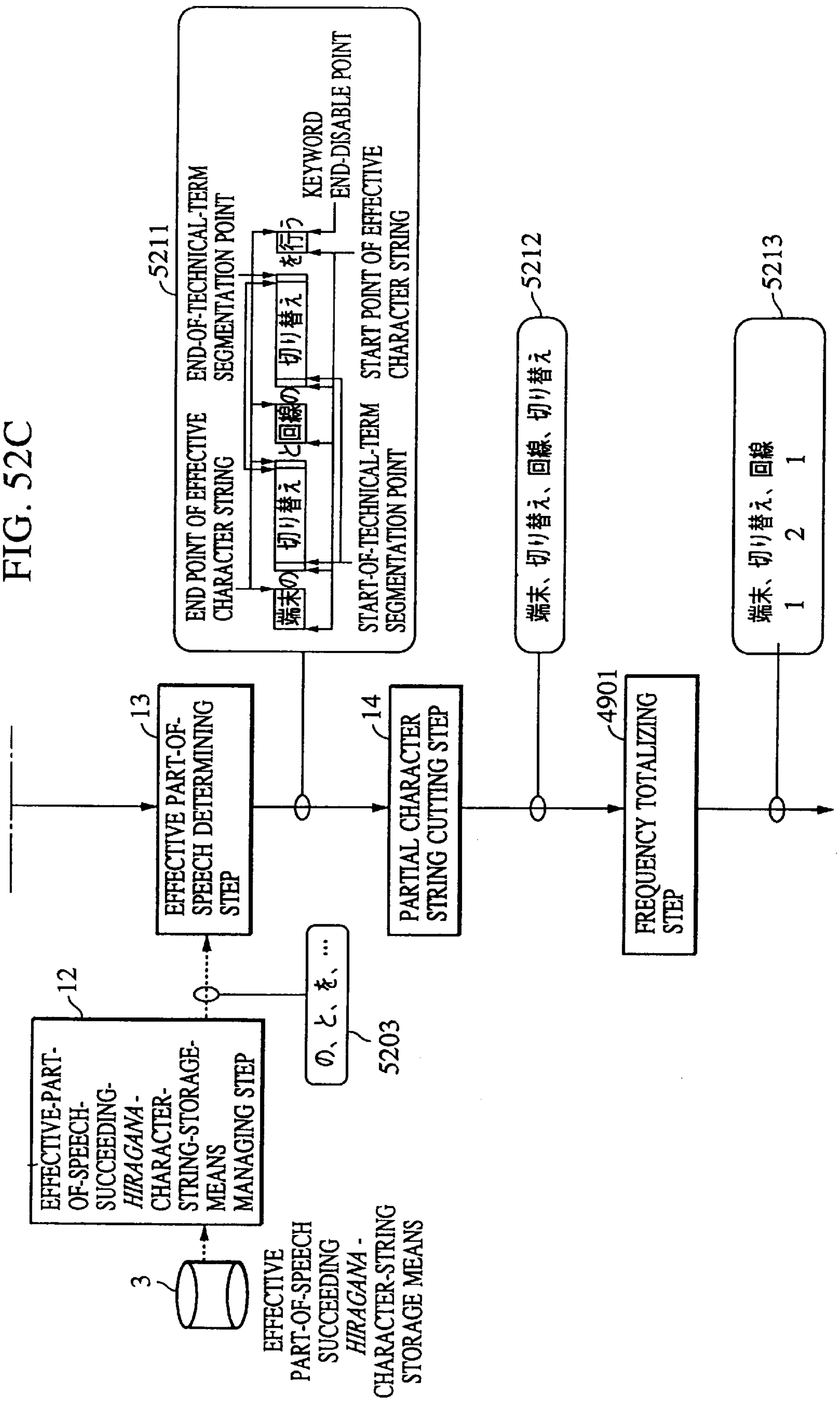

FIG. 52 is a block diagram showing an example of data flow in the present invention in relation to the steps according to the sixth aspect of the present invention.

Referring to FIG. 52, a Japanese input sentence "端末の切り替えと回線の切り換えを行う (tanmatsuno kirikae to kaisenno kirikae wo okonau=Terminal switching and line switching are made)" 5205 is entered in the input step 4. In the technical-term-storage-means managing step 5, words "切り替え" and "切り換え" 5201 are retrieved from the technical term storage means 1. In the technical-term segmentation point setting step 6, the start-of-technical-term segmentation point and the end-of-technical-term segmentation point are set in respective positions where "切り替え" and "切り換え" appears in the input sentence, as shown in block 5206.

Then, a different expression of the technical term is replaced by a corresponding proper expression in the proper-expression replacing step 7. In this case, "切り替え" is replaced by "切り替え", followed by going to the next step.

In the next effective character-string cutting step 8, a range of character string consisted of the effective character types, such as kanji, katakana, alphabets and numerals, or a technical term is taken out. As a result, "端末", "切り替え", "回線", "切り替え" and "行" are taken out as effective character strings, as shown in block 5208.

Subsequently, in the character-type segmentation point setting step 9, the position where the character type changes from one to another is set as a character-type segmentation point for the character string range of the effective character string which is not itself a technical term. In this case, since there is no point meeting the condition, the processing goes to the next step without setting the character-type segmentation point.

The basic-word segmentation points are set in the next basic-word segmentation point setting step 11. In this case, the basic-word segmentation point is not set as shown in block 5210.

Then, the effective part-of-speech succeeding hiragana-character-string storage means 3 is searched in the effective-part-of-speech-succeeding-hiragana-character-string-storage-means managing step 12, and the character string succeeding to each effective character string is checked in the effective part-of-speech determining step 13. Assuming that "の", "と" and "を" are found, but "う" is not found as indicated at 5203, the keyword end-disable point is set behind "行" as shown in block 5211.

Next, the partial character string cutting step 14 cuts out, from the effective character string, the range of character string which starts from any of the start-of-technical-term segmentation point, the start point of the effective character string, the start-of-basic-word segmentation point, and the character-type segmentation point, which terminates at any of the end-of-technical-term segmentation point, the end point of the effective character string, the end-of-basic-word segmentation point, and the character-type segmentation point, and which does not terminate at the keyword end-disable point. As a result of the above processing, "端末", "切り替え", "回線" and "切り替え" are extracted as keyword candidates from the input sentence, as shown in block 5212.

Thereafter, in the frequency totalizing step 4901, the appearance frequency is totalized for each of the extracted keywords. As a result of this processing, "端末", "切り替え" and "回線" are finally extracted as keywords with frequency values given 1, 2 and 1, respectively.

It is to be noted that while the segmentation points are set in the order of the technical-term segmentation point setting step, the character-type segmentation point setting step, and the basic-word segmentation point setting step in Embodiment 6, the order of those processing steps may be optionally selected.

With Embodiment 6, as described above, for the technical terms registered in the technical term storage means, keyword extraction is performed after replacing a different expression of the headword by a corresponding proper expression. Accordingly, a keyword extraction method is realized which can avoid the words having the similar meaning but different expressions from being determined as separate words, and can be give the keywords with respective precise values of appearance frequency.

Embodiment 7.

Figure 53:
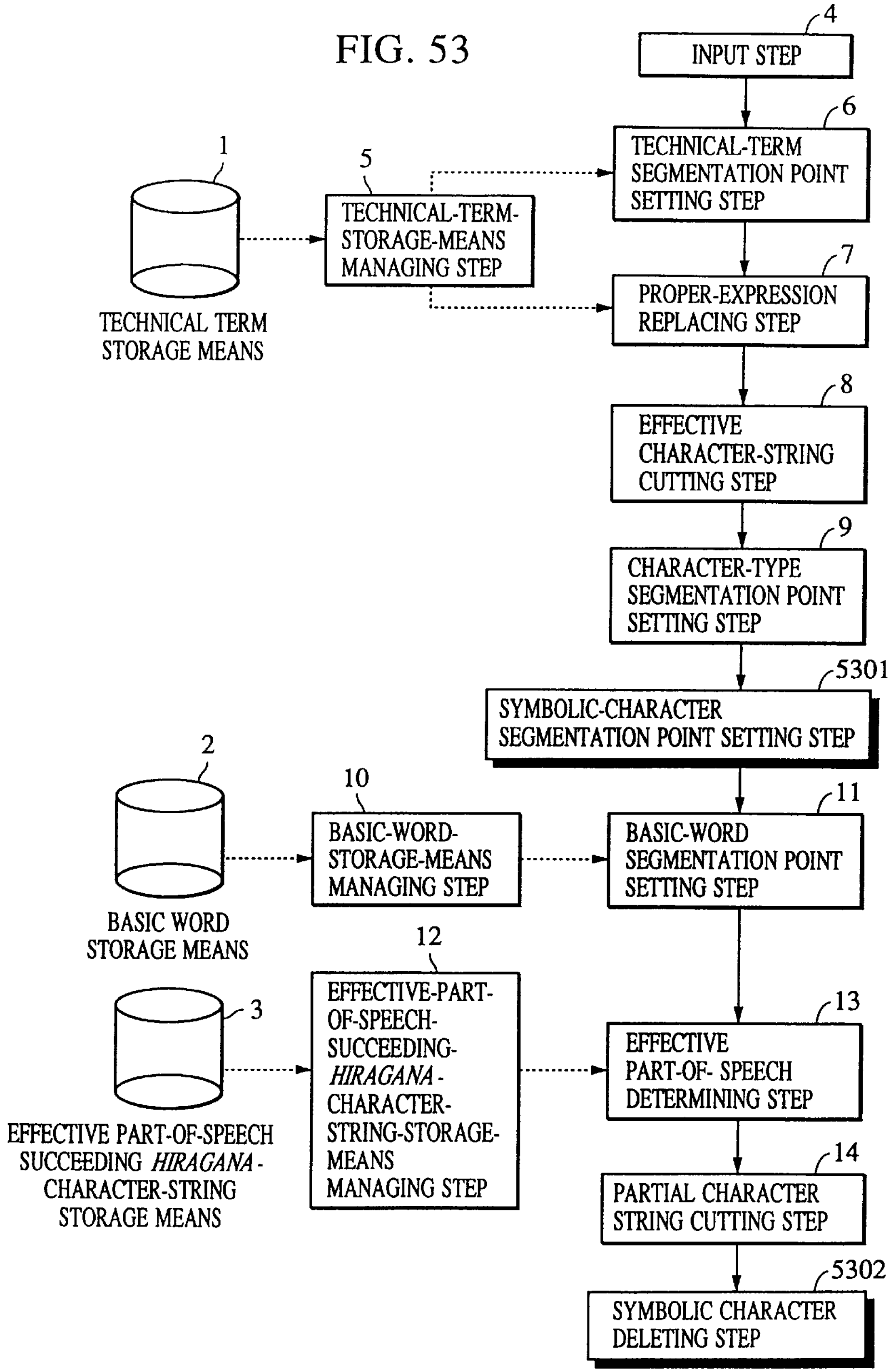
FIG. 53 is an overall block diagram of a keyword extraction method according to Embodiment 7 of the present invention.

FIG. 53 is an overall block diagram of a keyword extraction method according to one embodiment of a seventh aspect, i.e., Embodiment 7, of the present invention. In FIG. 53, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 5301 is a symbolic-character segmentation point setting step for setting symbolic-character segmentation points before and behind each of prescribed symbolic characters, such as "•" and "/". Denoted by 5302 is a symbolic character deleting step for removing the prescribed symbolic characters, such as "•" and "/", from extracted keywords.

Figure 54:
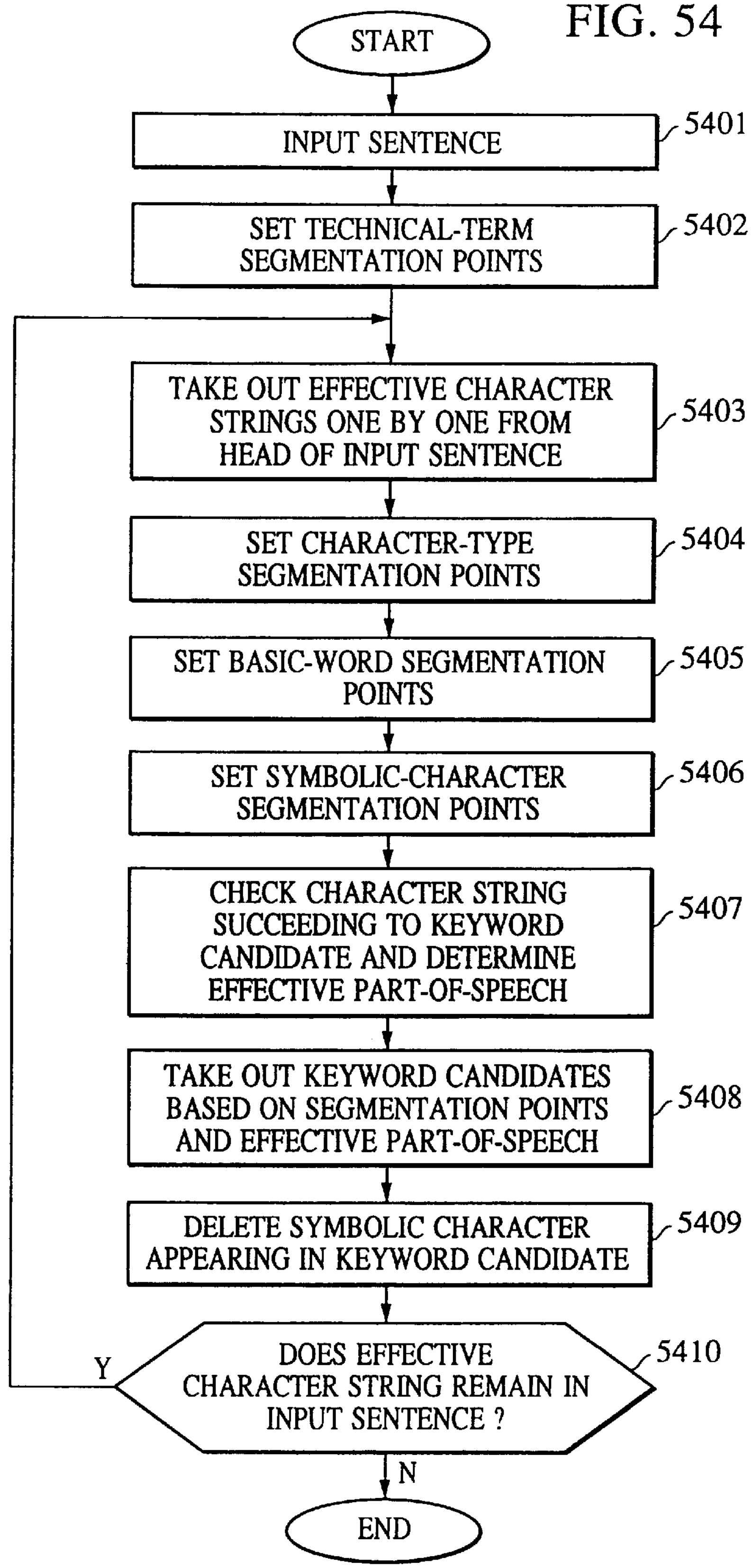
FIG. 54 is a flowchart showing the operation of the keyword extraction method according to Embodiment 7 of the present invention.

FIG. 54 is a flowchart showing the operation of the embodiment of the seventh aspect, i.e., Embodiment 7, of the present invention. The following description will be made on processing of, for example, a Japanese sentence "ユーザーインタフェイスの設定を行う (yuhzah intafeisu no settei wo okonau=Setting of a user interface is made)". First, in step 5401, the Japanese sentence is input through a keyboard or file. Then, in step 5402, technical-term segmentation points are set in the input sentence.

The technical-term segmentation points are set in accordance with the flowchart of FIG. 7. It is here assumed here that "ユーザー" and "インタフェイス" are technical terms, "う" is a proper expression for "切り替え", and "切り替え" is a proper expression for "インタフェイス". On this assumption, in the input character string, "ユーザー" is replaced by "う", "インタフェイス" is replaced by "切り替え", and the start-of-technical-term segmentation point and the end-of-technical-term segmentation point are set respectively before and behind each of "う" and "切り替え".

Next, in step 5403, effective character strings are taken out one by one from the head of the input sentence. In accordance with the flowchart of FIG. 12, "う切り替え" is taken out as the first effective character string.

Subsequently, a character-type segmentation point is set in step 5404. This processing is executed in accordance with the flowchart of FIG. 13. In this case, since there is no difference in character type in the character string "う切り替え", the processing goes to step 5405 without setting the character-type segmentation point. Note that symbolic characters such as "•" are assumed to be not regarded as different character type in the step of setting the character-type segmentation points.

Basic-word segmentation points are set in step 5405. Assuming that any partial character string of "う切り替え" is not registered in the basic word storage means 2, the processing goes to next step 5406 without setting the basic-word segmentation points in accordance with the flowchart of FIG. 15.

Figure 55:
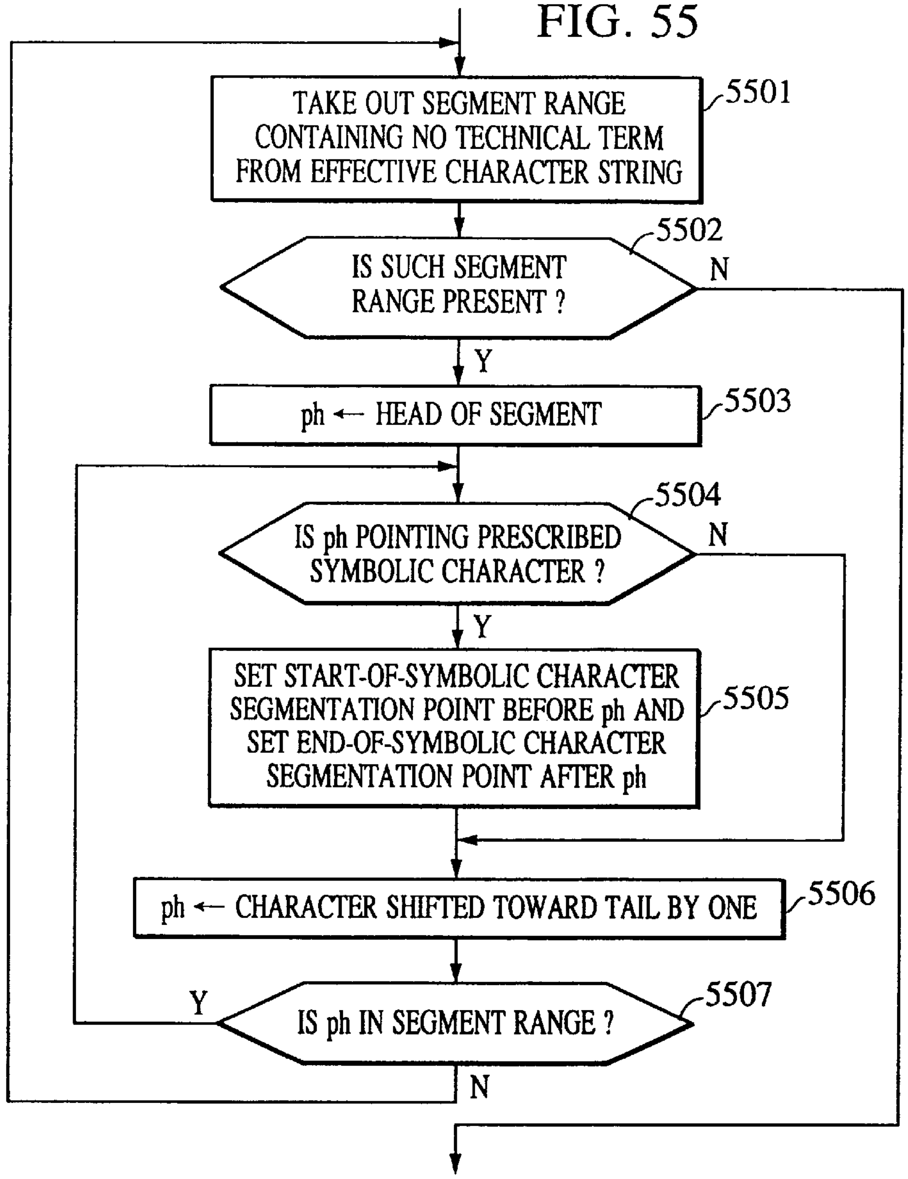
FIG. 55 is a flowchart showing the operation of processing to set symbolic-character segmentation points in the present invention.

Symbolic-character segmentation points are set in the step 5406. FIG. 55 shows a flow of processing to set the symbolic-character segmentation points. First, in 5501, a segment range containing no technical terms is taken out from the effective character string. In accordance with the flowchart of FIG. 16, "•" is taken out as a segment of the effective character string containing no technical terms.

Since there is such a segment to be processed, the determination in step 5502 is responded by YES. Then, in step 3503, a pointer ph is assigned to the head character "•" of the segment of effective character string which contains no technical terms.

Subsequently, it is checked in step 5504 whether or not ph is pointing the prescribed symbolic character. It is assumed that "•" is the prescribed symbolic character in this embodiment. The determination in step 5504 is therefore responded by YES, followed by going to step 5505.

In step 5505, a start-of-symbolic-character segmentation point and an end-of-symbolic-character segmentation point are set respectively before and behind "•" in the character string to be processed.

Then, in step 5506, ph is shifted one character toward the tail of the segment. The range of effective character string containing no technical terms is thereby exceeded; hence the determination in step 5507 is responded by NO, returning to step 5501. Since there is no other segment of effective character string containing no technical terms, the processing follows the path indicated by N from step 5502, thereby going out of the routine of FIG. 55.

The character string succeeding to a keyword candidate is then checked in step 5407 of FIG. 54 to determine whether the keyword candidate is an effective part-of-speech. On condition that "の" is registered in the effective part-of-speech succeeding hiragana-character-string storage means 3 as shown in FIG. 4, since the character succeeding to "う切り替え" is "の", the processing goes out of the part-of-speech determining routine without setting the keyword end-disable point in accordance with the flowchart of FIG. 17.

Figure 56:
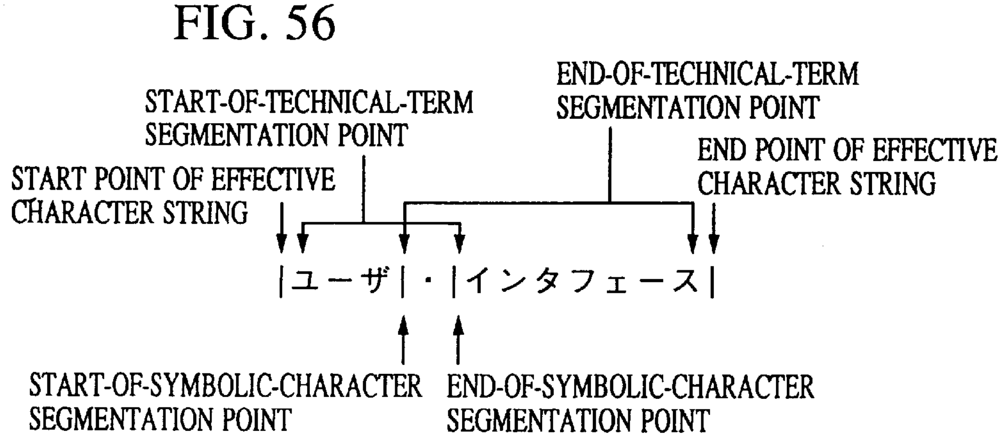
FIG. 56 is a representation showing an intermediate state of the processing made on an example of character string to be processed in the present invention.

As a result of the above processing, the segmentation points are set in the first effective character string, as shown in FIG. 56.

Thereafter, in step 5408, keyword candidates are taken out based on the segmentation points and the effective part-of-speech. In this embodiment, a keyword start-enable point is assumed to be given by any of the start-of-technical-term segmentation point, the start point of the effective character string, the start-of-basic-word segmentation point, the character-type segmentation point, and the end-of-symbolic-character segmentation point. Also, a keyword end-enable point is assumed to be given by any of the end-of-technical-term segmentation point, the end point of the effective character string, the end-of-basic-word segmentation point, the character-type segmentation point, and the start-of-symbolic-character segmentation point. It is further assumed that the position where a keyword end-disable point is set in the effective part-of-speech determining process cannot serve as the keyword end-enable point.

In accordance with the flowchart of FIG. 19, "う", "切り替え" and "う切り替え" are extracted as keyword candidates from "う切り替え". These keyword candidates are assumed to be stored in a buffer.

Figure 57:
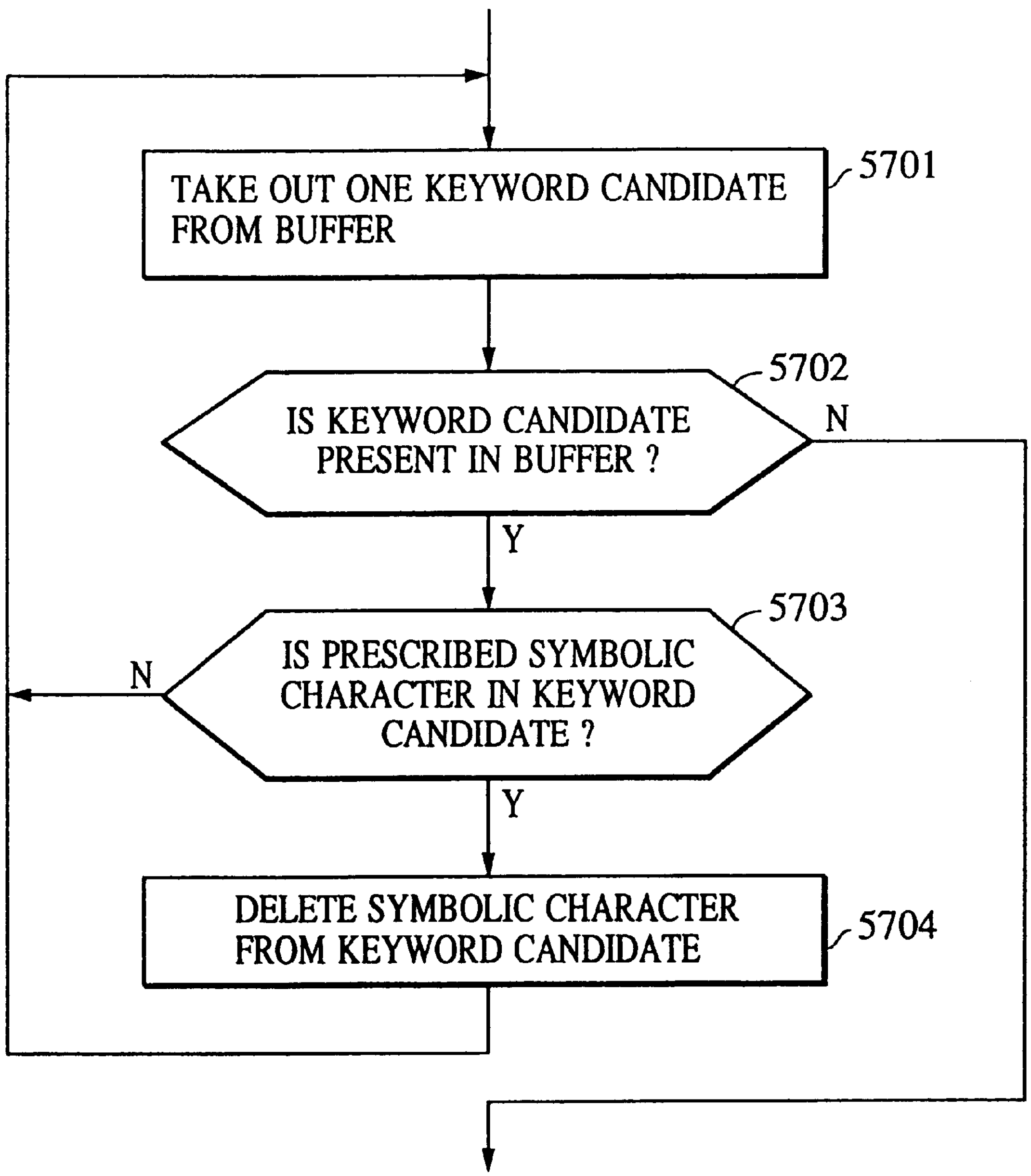
FIG. 57 is a flowchart showing the operation of processing to delete a symbolic character in the present invention.

Next, in step 5409, a symbolic character appearing in the keyword candidate is deleted. This processing is executed in accordance with a flowchart shown in FIG. 57. First, one of the keyword candidates is taken out from the buffer in step 5701. It is then checked in step 5703 whether or not "•" exists in the character string of the taken-out keyword. If so, then "•" is deleted in step 5704. This processing is repeated for all the keyword candidates stored in the buffer, and is completed upon the determination in step 5702 being responded by NO.

In this embodiment, since "•" exists in the character string "う切り替え", this symbolic character "•" is deleted to obtain "う切り替え" as a keyword candidate. As a result, "う", "切り替え" and "う切り替え" are extracted as keyword candidates.

Next, it is checked in step 5410 whether or not any effective character string still remains in the input sentence. The segment taken out next is "の設定を行う". Assuming that there is no difference in character type in the character string "の設定を行う" and any partial character string of "の設定を行う" is not stored in the basic word storage means, "の設定を行う" is extracted as a keyword candidate as it is. Further, "行" is the effective character string taken out next, but no keywords are extracted from "行" as with Embodiment 1.

As a result, "う", "切り替え", "う切り替え" and "の設定を行う" are finally extracted as keywords.

Figure 58A:
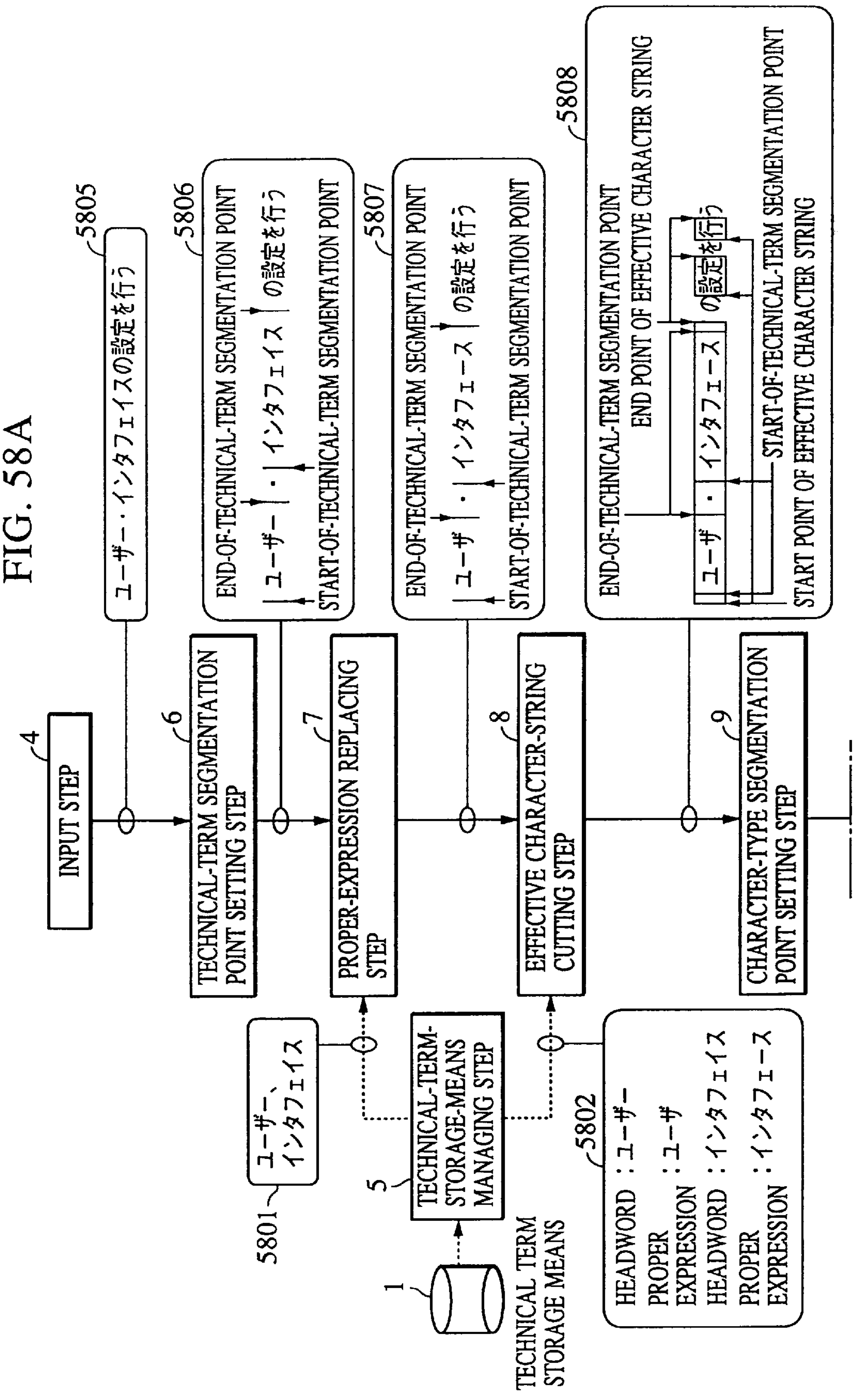
FIG. 58 is a block diagram showing an example of data flow in the keyword extraction method according to Embodiment 7 of the present invention in relation to the successive steps.
Figure 58B:
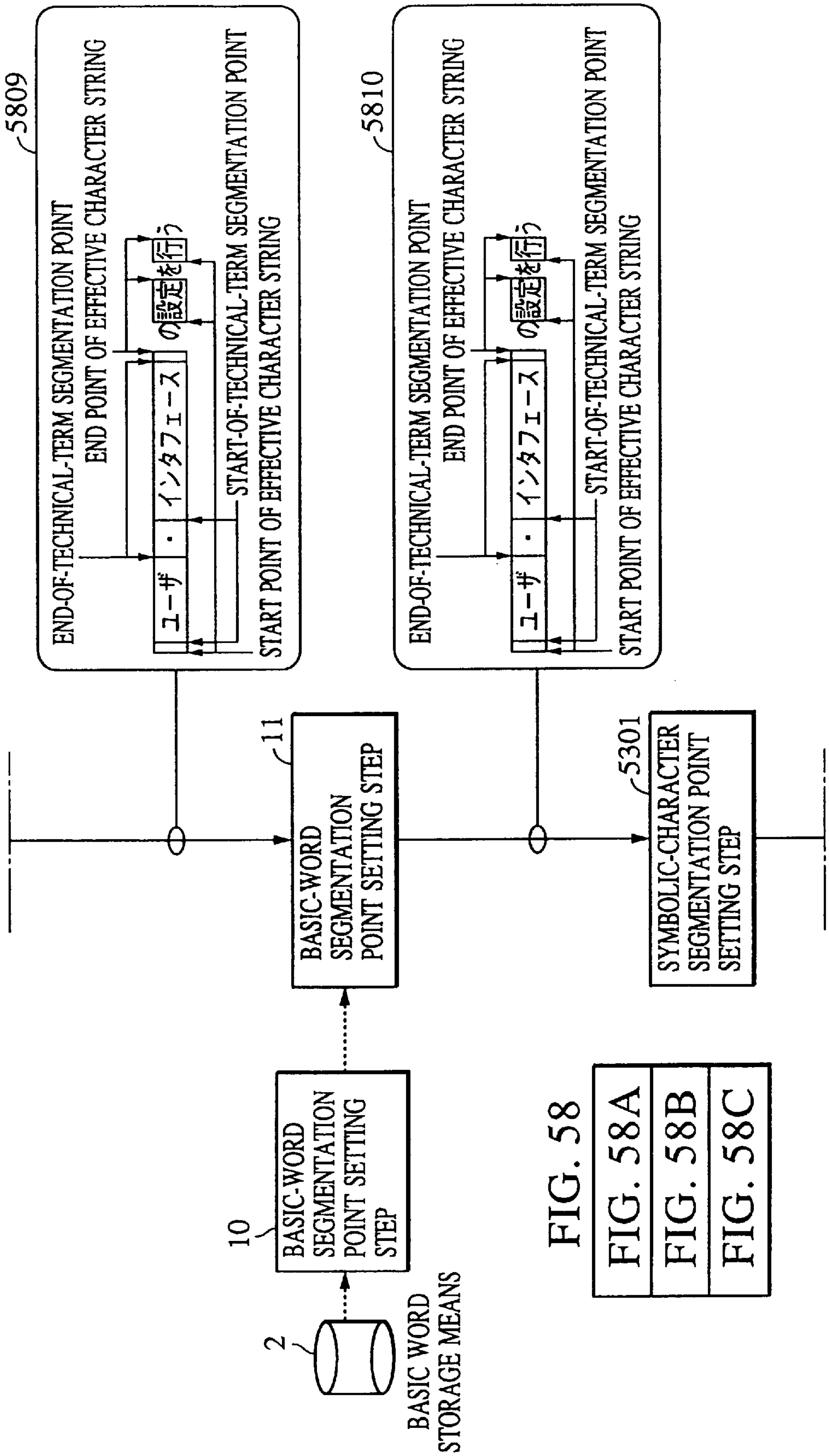
Figure 58C:
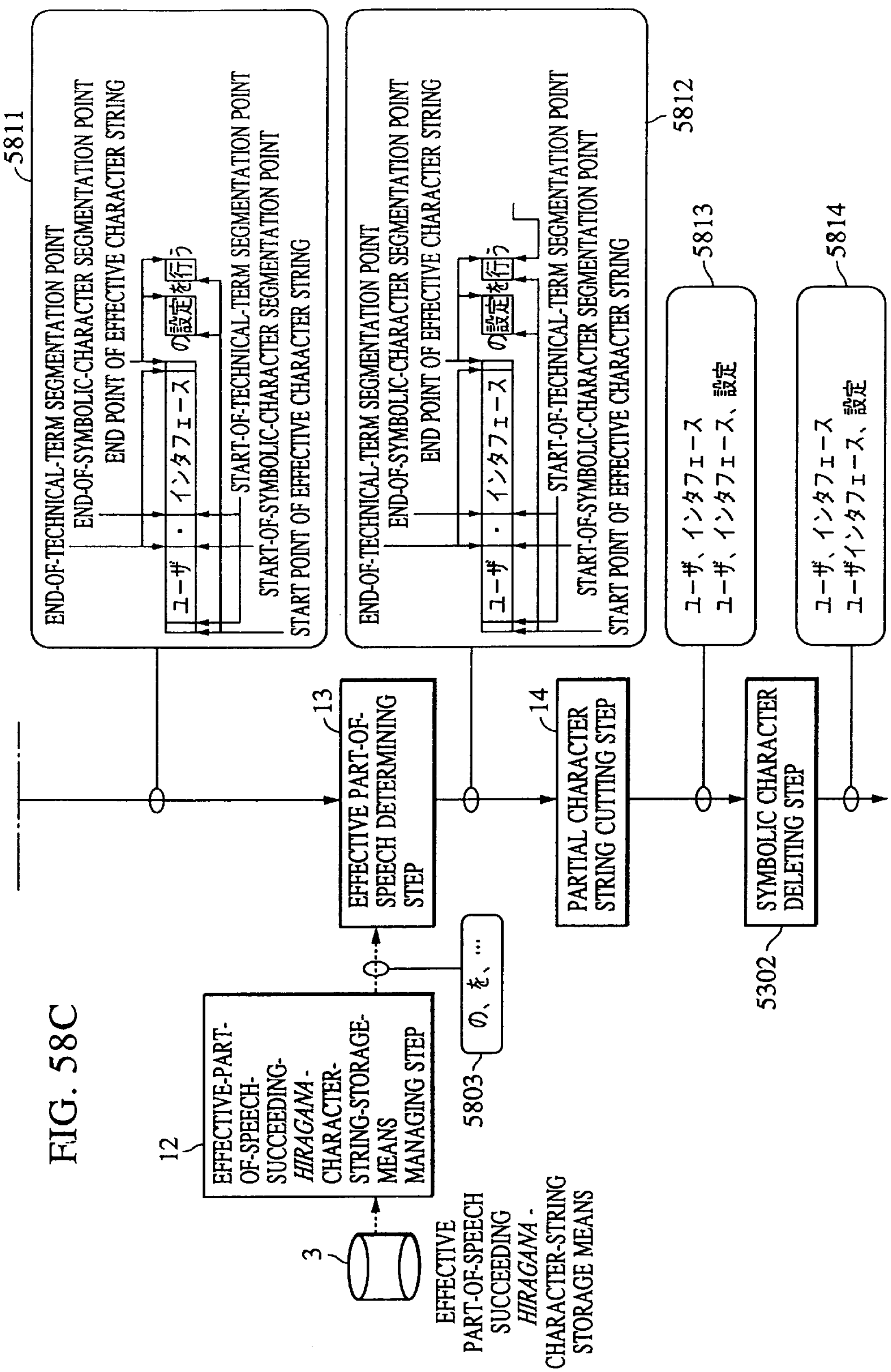

FIG. 58 is a block diagram showing an example of data flow in the present invention in relation to the steps according to the seventh aspect of the present invention.

Referring to FIG. 58, a Japanese input sentence1 "ユーザーインタフェイスの設定を行う (yuhzah intafeisu no settei wo okonau=Setting of a user interface is made) 5805 is entered in the input step 4. Assuming that "ユーザー" and "インタフェイス" are registered in the technical term storage means 1, the start-of-technical-term segmentation point and the end-of-technical-term segmentation point are set respectively front and behind each of "ユーザー" and "インタフェイス", as shown in block 5806.

Then, a different expression of the technical term is replaced by a corresponding proper expression in the proper-expression replacing step 7. Assuming that the proper expression of "ユーザー" is "う" and the proper expression of "インタフェイス" is "切り替え", different expressions "ユーザー" and "切り替え" are replaced respectively by the proper expressions "う" and "切り替え", as shown in block 5807.

Next, in the effective character-string cutting step 8, a range of character string consisted of the effective character types or a technical term is taken out. As a result, "切り替え", "の設定を行う" and "行" are taken out as effective character strings, as shown in block 5808.

Subsequently, in the character-type segmentation point setting step 9, the position where the character type changes from one to another is set as a character-type segmentation point for the character string range of the effective character string which is not itself a technical term. In this case, since there is no difference in character type in the range of effective character string, the character-type segmentation point is set as shown in block 5809.

The basic-word segmentation points are set in the next basic-word segmentation point setting step 11. In this case, the basic-word segmentation point is not set as shown in block 5810.

After that, in the symbolic-character segmentation point setting step 5301, the start-of-symbolic-character segmentation point and the end-of-symbolic-character segmentation point are set respectively front and behind "•" in the character string under processing.

Then, the effective part-of-speech succeeding hiragana-character-string storage means 3 is searched in the effective-part-of-speech-succeeding-hiragana-character-string-storage-means managing step 12, and the character string succeeding to each effective character string is checked in the effective part-of-speech determining step 13. Assuming that "の" and "を" are found, but "う" is not found as indicated at 5803, the keyword end-disable point is set behind "行" as shown in block 5812.

Next, the partial character string cutting step 14 cuts out, from the effective character string, the range of character string which starts from any of the start-of-technical-term segmentation point, the start point of the effective character string, the start-of-basic-word segmentation point, the character-type segmentation point, and the end-of-symbolic-character segmentation point, which terminates at any of the end-of-technical-term segmentation point, the end point of the effective character string, the end-of-basic-word segmentation point, the character-type segmentation point, and the start-of-symbolic-character segmentation point, and which does not terminate at the keyword end-disable point. As a result of the above processing, "う", "切り替え", "切り替え" and "の設定を行う" are extracted as keyword candidates, as shown in block 5813.

Thereafter, in the symbolic character deleting step 5302, "•" contained in the character strings of the keyword candidates is deleted. As a result, "う切り替え" turns to "う切り替え"; hence "う", "切り替え", "う切り替え" and "の設定を行う" are finally extracted as keywords.

It is to be noted that while the segmentation points are set in the order of the technical-term segmentation point setting step, the character-type segmentation point setting step, the basic-word segmentation point setting step and the symbolic-character segmentation point setting step in Embodiment 7, the order of those processing steps may be optionally selected.

With Embodiment 7, as described above, in a process of dealing with different expressions of a compound word, "•" and "/" appearing between words composing the compound word are deleted and a word resulted from replacing a different expression of each of technical terms, which are registered in the technical term storage means, by a corresponding proper expression is assigned as a keyword to a document. By executing the similar processing for an input word at the time of retrieval, different expressions in the form of a compound word and different expressions for each of words composing the compound word can be dealt with in a unified manner. Also, a keyword extraction method adapted for high-speed document retrieval can be realized without inviting an increase in the number of retrieval keys due to combinations of words composing the compound word.

Embodiment 8.

Figure 59:
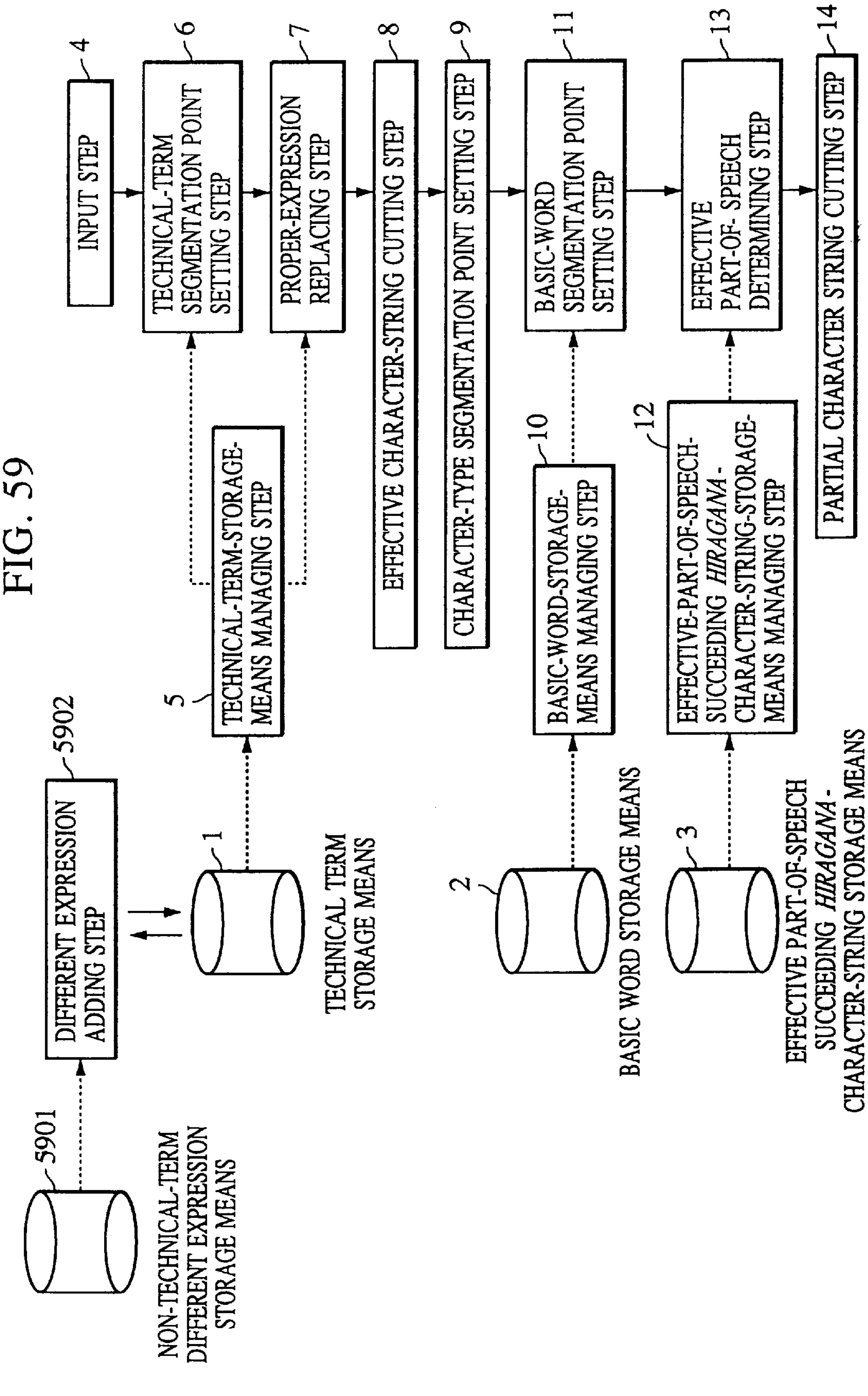
FIG. 59 is a block diagram showing correlation between a different expression adding step and the keyword extraction method in the present invention.

FIG. 59 is an overall block diagram of a keyword extraction method according to one embodiment of an eighth aspect, i.e., Embodiment 8, of the present invention. In FIG. 59, reference numerals 1, 2, 3, 4, 5, 6, 7, 8, 9, 10, 11, 12, 13 and 14 denote respectively technical term storage means, basic word storage means, effective part-of-speech succeeding hiragana-character-string storage means, an input step, a technical-term-storage-means managing step, a technical-term segmentation point setting step, a proper-expression replacing step, an effective character-string cutting step, a character-type segmentation point setting step, a basic-word-storage-means managing step, a basic-word segmentation point setting step, an effective-part-of-speech-succeeding-hiragana-character-string-storage-means managing step, an effective part-of-speech determining step, and a partial character string cutting step which are similar to those denoted by 1, 2, 3, 4, 5, 6, 7, 8, 9, 10, 11, 12, 13 and 14 in FIG. 5. Denoted by 5901 is a non-technical-term different expression storage means for storing proper expressions of general words of high frequency and different expressions thereof in corresponding relation. The non-technical-term different expression storage means 5901 is made up of each proper expression and a set of one or more different expressions corresponding to the proper expression as shown in FIG. 60, for example. Denoted by 5902 is a different expression adding step for, when a technical term is a compound word, searching the technical term storage means 1 and the non-technical-term different expression storage means 5901, and combining different expressions of words composing the compound word with each other to create different expressions of the compound word.

Figure 61:
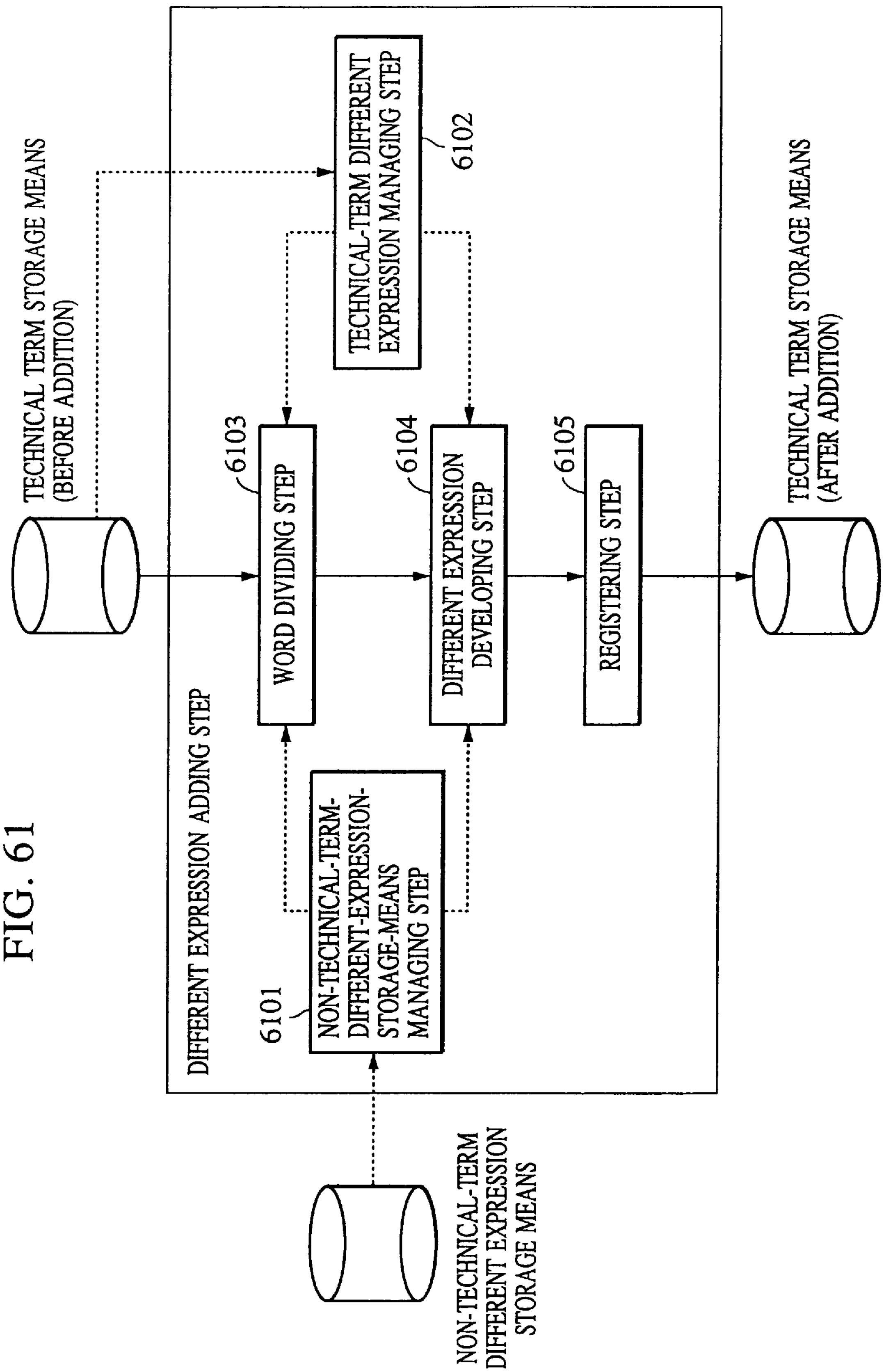
FIG. 61 is a block diagram showing the configuration of the different expression adding step in the present invention.

FIG. 61 is a block diagram showing sub-steps of the different expression adding step 5902. Denoted by 6101 is a non-technical-term-different-expression-storage-means managing step for searching the non-technical-term different expression storage means 5901 to take out different expression information. Denoted by 6102 is a technical-term different expression means managing step for searching the technical term storage means to take out different expression information. Denoted by 6103 is a word dividing step for, when a word to be processed is a compound word consisting of individual words which are searched in the non-technical-term-different-expression-storage-means managing step 6101 and the technical-term different expression managing step 6102, for dividing the compound word into the individual words. Denoted by 6104 is a different expression developing step for creating different expressions of the compound word based on combinations of different expressions for each of the individual words divided in the word dividing step 6103. Denoted by 6105 is a registering step for determining one in a set of the different expressions created in the different expression developing step 6104 to be a proper expression, creating pairs of each headword and the proper expression, and registering those pairs in the technical term storage means.

Figure 62:
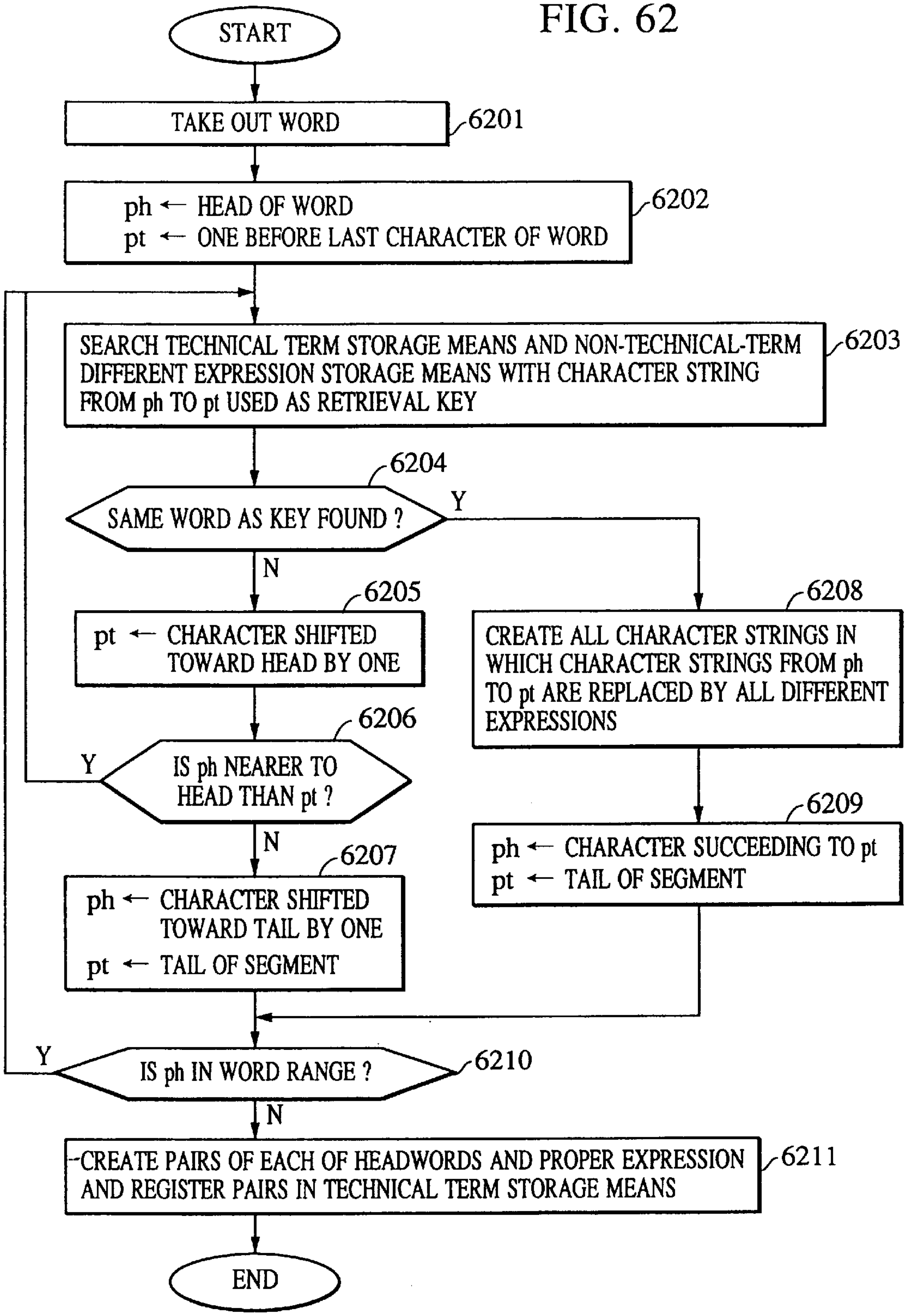
FIG. 62 is a flowchart showing the operation of the different expression adding step in the present invention.

FIG. 62 is a flowchart showing the operation of one embodiment of the eighth aspect, i.e., Embodiment 8, of the present invention. The following description will be made on processing of, for example, a Japanese word "切り換えボタン (kirikae botan=switching button)". First, in step 6201, the word "切り換え∩" is taken out. Then, in step 1503, a pointer ph is assigned to the head character "に" of the word and a pointer pt is assigned to the character "タ" one before the tail of the word.

Subsequently, in step 6203, the technical term storage means 1 and the non-technical-term different expression storage means 5901 are searched by using the character string "切り換えボタ" from ph to pt as a retrieval key. If "切り換えボタ" is not found in the technical term storage means 1 and the non-technical-term different expression storage means 5901, then pt is shifted one character toward the head of the word in step 6205. At this time, since ph is still positioned nearer to the head than pt, the determination in step 6206 is responded by YES and the processing returns to step 6203 for searching the technical term storage means 1 and the non-technical-term different expression storage means 5901 again with "切り換えボタ" now used as a retrieval key.

Assuming that "切り換え" is registered as one headword in the technical term storage means 1, upon the character string from ph to pt being given by "切り換え", the determination in step 6204 is responded by YES and the processing goes to step 6208. In step 6208, "切り換え" of "切り換えボタン" is replaced by all different expressions of "切り換え" which are registered in the technical term storage means 1. Assuming now that "切り替え" and "切替え" are registered as different expressions of "切り換え", character strings created in step 6208 are "切り換えボタン", "切り替えボタン" and "切替えボタン".

Then, in step 6209, ph is assigned to "ボ" and pt is assigned to "ン". Since ph is still in the word range, the processing follows the path indicated by Y from step 6210 and returns to step 6203 to search for "ボタン" in the dictionary. Assuming that "ボタン" is found in the non-technical-term different expression storage means 5901, the determination in step 6204 is responded by YES and the processing goes to step 6208. In step 6208, "ボタン" in each of "切り換えボタン", "切り替えボタン" and "切替えボタン" is replaced by all different expressions of "ボタン" which are registered in the non-technical-term different expression storage means 5901. Assuming now that "釦" (kanji of "ボタン") is registered as a different expression of "ボタン", character strings now created in step 6208 are "切り換えボタン", "切り替えボタン", "切替えボタン", "切り換え釦", "切り替え釦" and "切り替え釦".

Next, pt is set to the character succeeding to ph in step 6209. However, since pt now points a position outside the word range, the determination in step 6210 is responded by NO and the processing goes to step 6211. In step 6211, one of the created character strings "切り換えボタン", "切り替えボタン", "切替えボタン", "切り換え釦", "切り替え釦" and "切替え釦" is determined as a proper expression to create a pair of a headword and the proper expression. Assuming that the proper expression for a group of "切り換え", "切り替え" and "切替え" is "切り替え" and the proper expression for a group of "ボタン" and "釦" is "ボタン", "切り替えボタン" which is a combination of both the proper expressions is determined as a proper expression for the group of those compound words.

To make a match with the format used in the technical term storage means 1 shown in FIG. 2, the proper expression "切り替えボタン" is registered in the technical term storage means as it is, whereas the other different expressions "切り換えボタン", "切替えボタン", "切り換え釦", "切り替え釦" and "切り換え釦" are registered in the technical term storage means in pair with the proper expression "切り替えボタン". The processing routine of FIG. 62 is thus completed.

Figure 63:
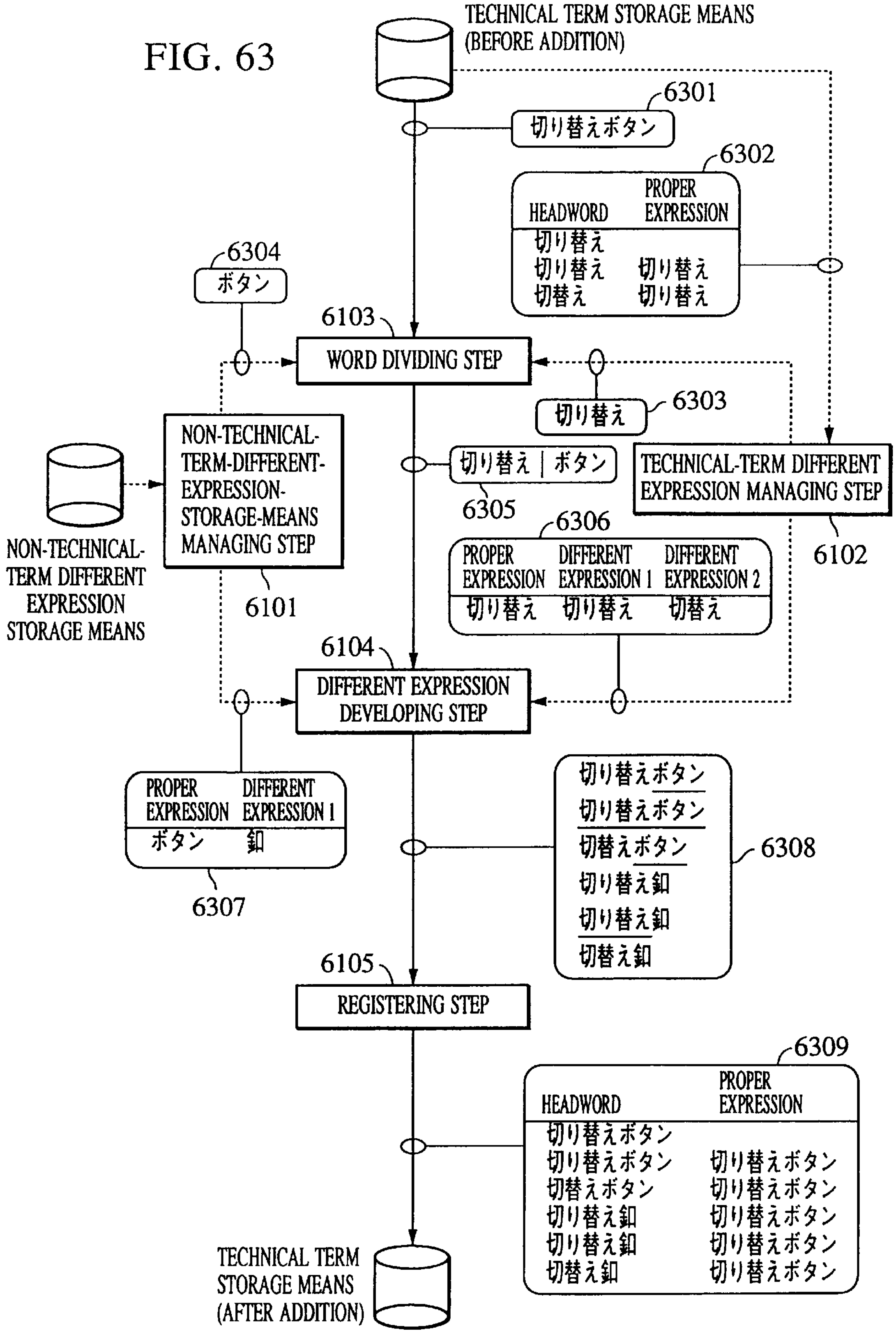
FIG. 63 is a block diagram showing an example of data flow in the different expression adding step in the present invention.
Figure 64:
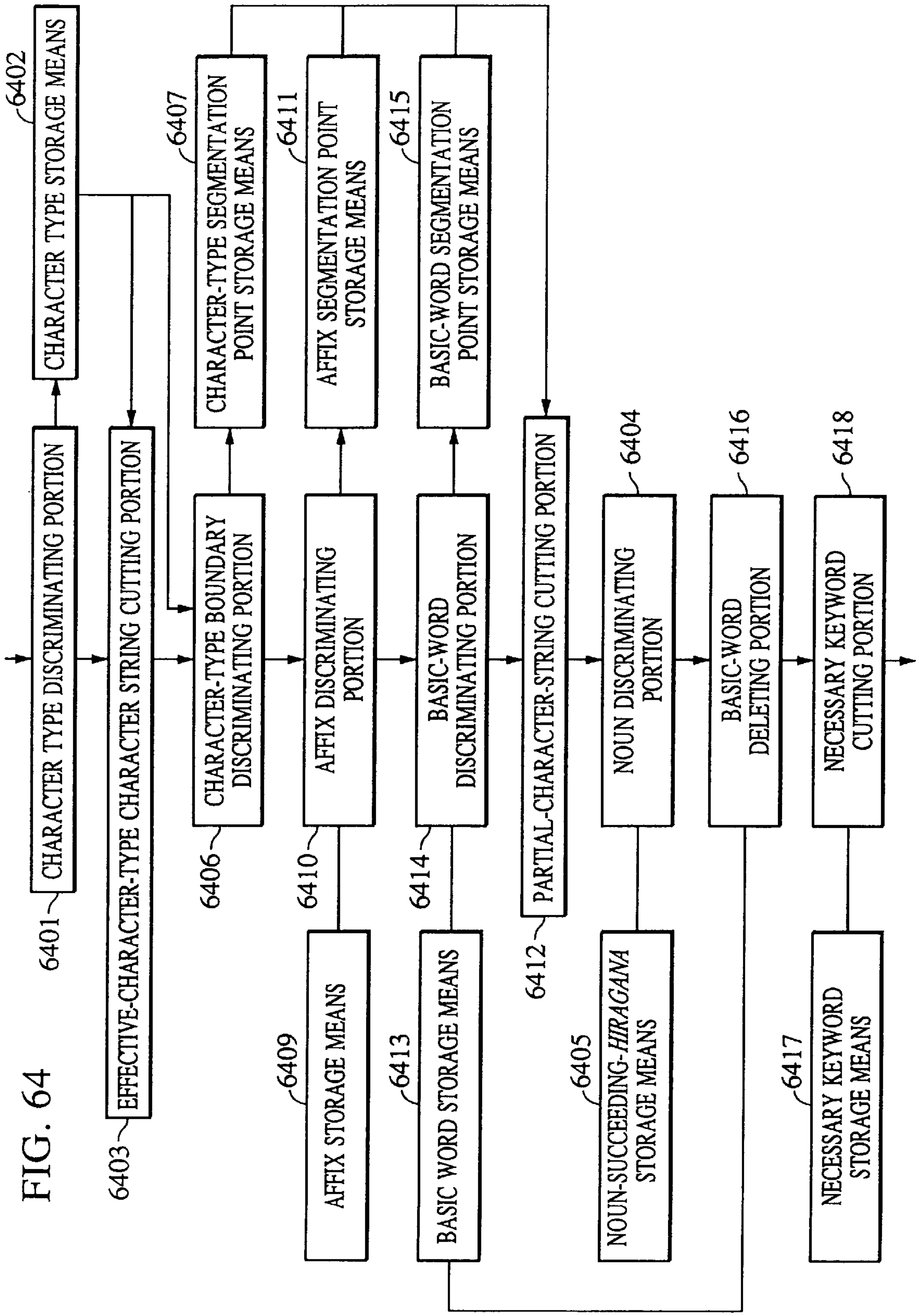
FIG. 64 is a block diagram showing a conventional keyword extraction system.
Figure 65:
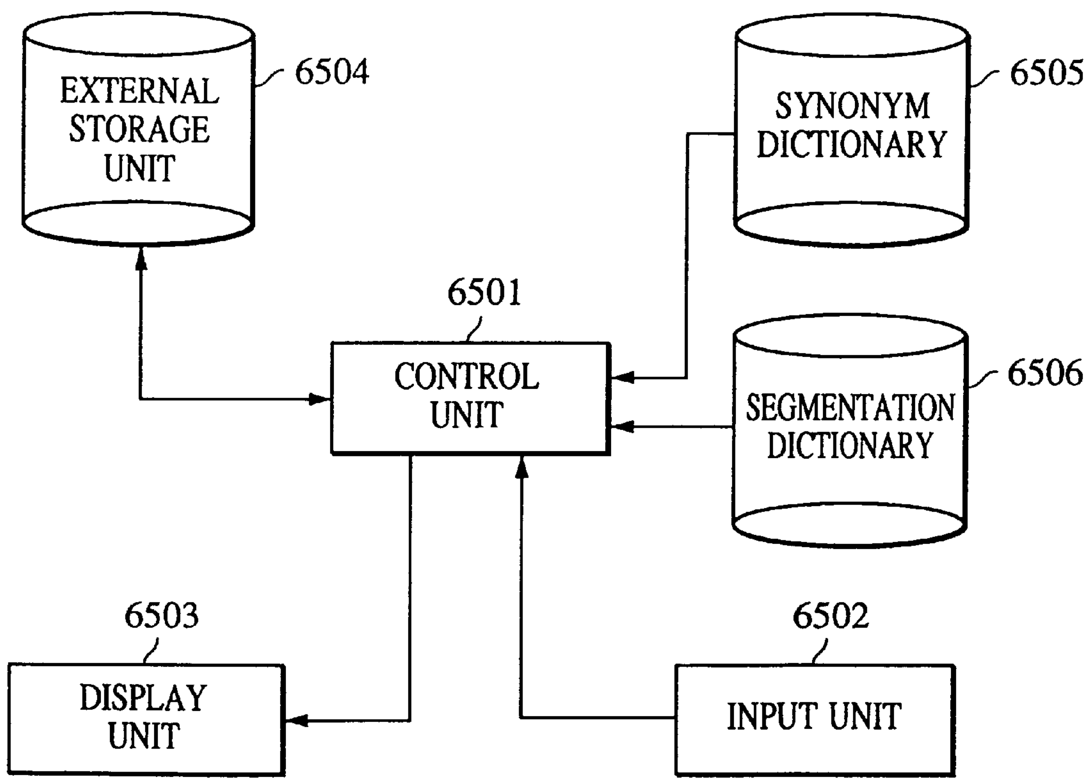
FIG. 65 is a block diagram of a conventional document retrieval method.
Figure 66:
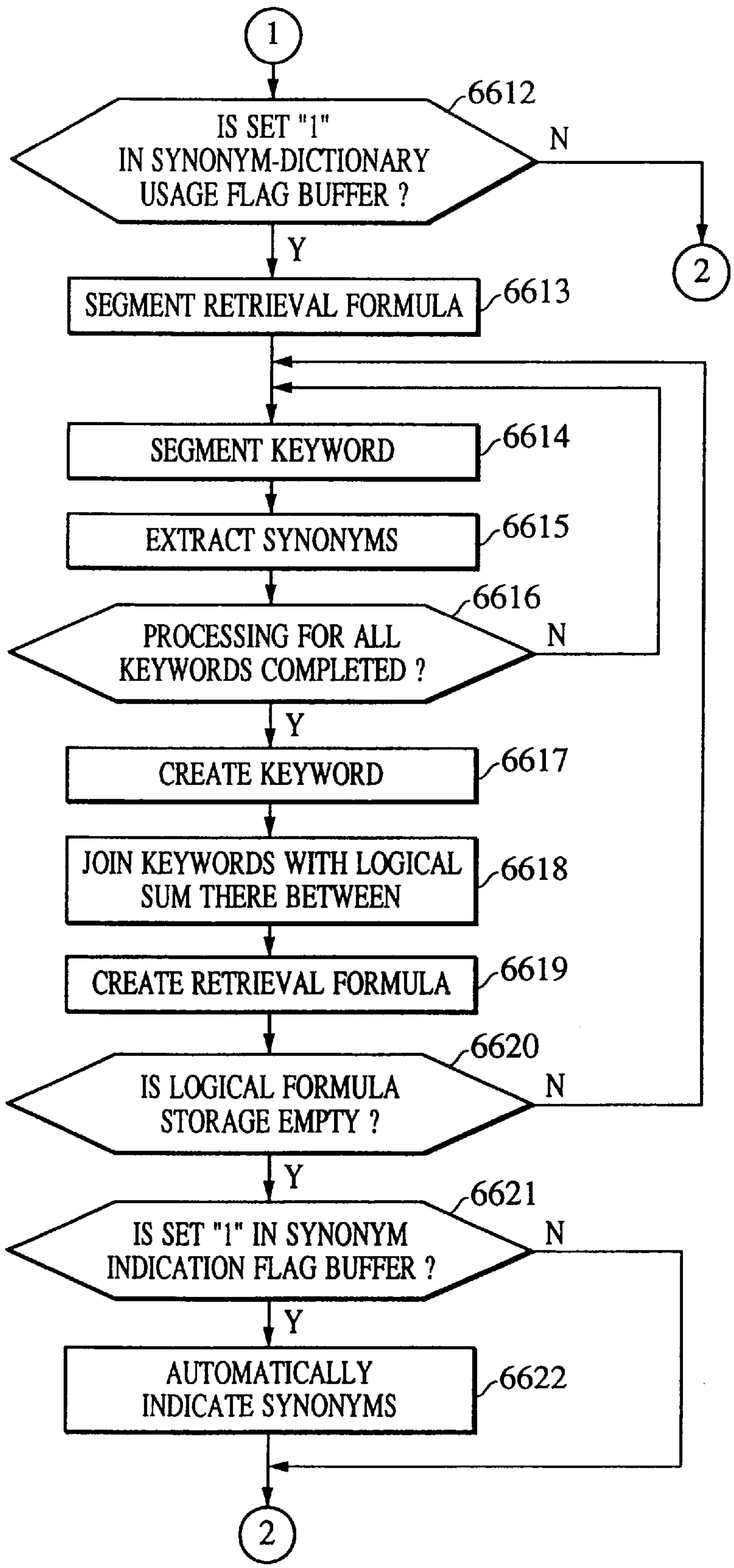
FIG. 66 is a flowchart showing part of a processing flow in the conventional document retrieval method.
Figure 67:
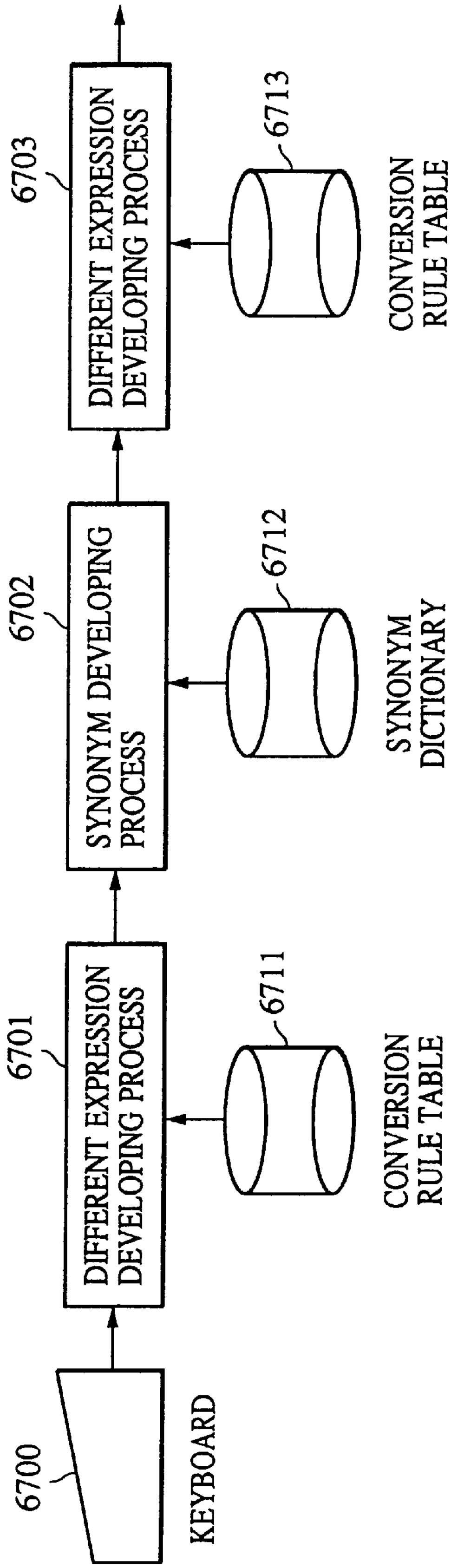
FIG. 67 is a block diagram of a conventional different expression and synonym developing method for retrieval of character strings.
Figure 68:
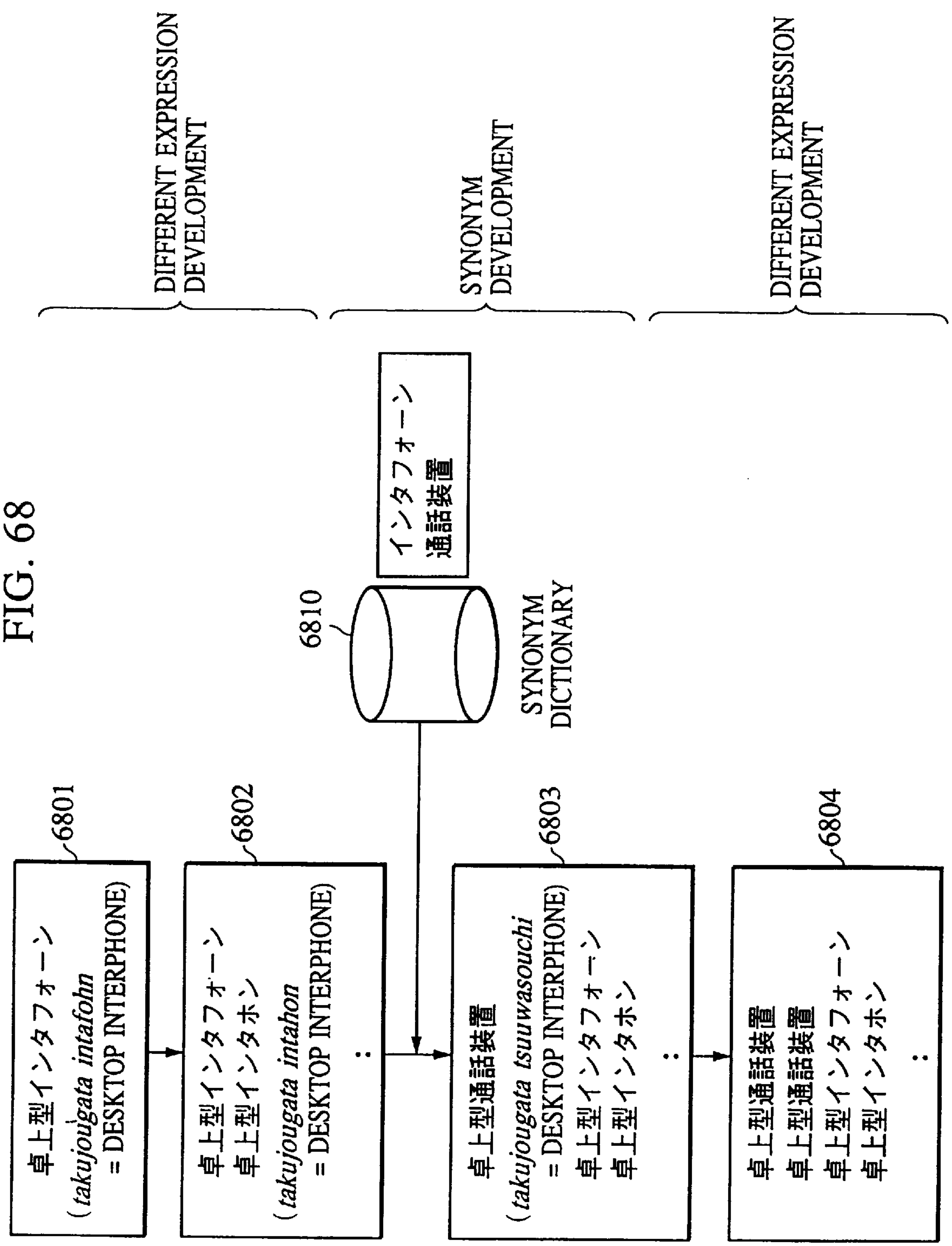
FIG. 68 is an outline of a conventional different expression and synonym developing process.

FIG. 63 is a block diagram showing an example of data flow in the different expression adding step 5902 according to the eighth aspect of the present invention in relation to the sub-steps constituting the different expression adding step 5902.

Referring to FIG. 63, a Japanese word "切り換えボタン (kirikae botan=switching button)" 6301 to be processed is passed to the word dividing step 6103. Assuming that a word "切り換え" 6303 and a word "ボタン" 6304 are found respectively in the technical-term different expression managing step 6102 and the non-technical-term-different-expression-storage-means managing step 6101, "切り換えボタン" is divided into "切り換え" and "ボタン" as indicated at 6305.

Next, assuming that "切り替え", "切り換え" and "切替え" are found as a ground of difference expressions for "切り換え" as indicated at 6306 and "ボタン" and "釦" are found as a ground of difference expressions for "ボタン", those different expressions are combined with each other in the different expression developing step 6104 to create a set 6308 of combinations of the different expressions. Note that the underline in block 6308 represents the proper expression of each of individual words composing the compound word.

Subsequently, in the registering step 6105, "切り替えボタン", which is a combination of the proper expressions of both the individual words, is determined as a proper expression for the group of the related compound words. Also, to make a match with the format used in the technical term storage means 1 shown in FIG. 2, the created compound words are each paired with the proper expression. At this time, since "切り替えボタン" is the proper expression, it is left alone. As a result, "切り替えボタン" and the created pairs are registered in the technical term storage means 1 in the format shown in block 6309.

Incidentally, there may be added a step of prompting an operator to determine, before registering the words created in the registering step 6105 in the technical term storage means, whether or not those words are to be registered.

With Embodiment 8, as described above, a set of words are created by combining different expressions of each of individual words composing a compound word, one in the created set of the words having different expressions is determined to be a proper expression, and pairs of each headword and the proper expression are registered in the technical term storage means. Accordingly, it is possible to assist the operation of registering the words, which are necessary as technical terms, in the technical term storage means and to realize a keyword extraction method capable of achieving high-speed retrieval without generating a large number of retrieval keys.

It is to be noted that, in the first to ninth aspects of the present invention, words having the similar meaning and pronunciation but different expressions may be synonyms, i.e., words having the similar meaning but different pronunciations and expressions.

As fully described above, according to the first aspect of the present invention, there is provided a keyword extraction apparatus comprising technical term storage means for storing technical terms with proper expressions and different expressions thereof; basic word storage means for storing general basic words of high frequency; input means through which a sentence is input; technical-term segmentation point setting means for, when any of the technical terms stored in the technical term storage means exists in the sentence input through the input means, cutting out a range of that technical term from the input sentence; proper-expression replacing means for, when the technical term cut out by the technical-term segmentation point setting means is written in a different expression, replacing the different expression by a corresponding proper expression; character-type segmentation point setting means for detecting a difference in character type in the input sentence; basic-word segmentation point setting means for cutting out, from the input sentence, a range of any of the basic words stored in the basic word storage means; partial character string cutting means for cutting out partial character strings based on segmentation points set by the technical-term segmentation point setting means, the character-type segmentation point setting means and the basic-word segmentation point setting means; and output means for outputting, as keywords, the partial character strings cut out by the partial character string cutting means.

With the above feature, in the keyword extraction process for assigning an index to a document, a keyword of a technical term appearing in the document is assigned to the document after a different expression of the technical term is replaced by a proper expression thereof by referring to the technical term storage means in which technical terms are stored along with their different expressions. At this time, when the technical term having the replaced proper expression is in continuity with the character string cut out from the input sentence because of difference in character type and the presence of a basic word, a keyword in the form of a compound word is also extracted so that the keyword extraction can be performed comprehensively. By converting a different expression of the technical term into a corresponding proper expression with the same technical term storage means before starting retrieval, a keyword extraction apparatus adaptable for high-speed document retrieval can be achieved while the number of different expressions of words, which serve as retrieval keys, is avoided from increasing in a way of combinations unlike the conventional document retrieval intended to cope with the problem caused by words which have the similar meaning and pronunciation but different expressions.

According to the second aspect of the present invention, there is provided a keyword extraction method comprising an input step for inputting a sentence; a technical-term segmentation point setting step for, when any of technical terms in technical term storage means for storing technical terms with proper expressions and different expressions thereof exists in the sentence input in the input step, cutting out a range of that technical term from the input sentence; a proper-expression replacing step for, when the technical term cut out in the technical-term segmentation point setting step is written in a different expression, replacing a range of the technical term in the input sentence by a corresponding proper expression; a character-type segmentation point setting step for detecting a difference in character type in the input sentence; a basic-word segmentation point setting step for, when any of basic words in basic word storage means for storing, as the basic words, general words of high frequency exists in the input sentence, cutting out a range of any of the basic words from the input sentence; and a partial character string cutting step for cutting out, as keywords, partial character strings based on segmentation points set in the technical-term segmentation point setting step, the character-type segmentation point setting step and the basic-word segmentation point setting step.

With the above feature, it is possible to achieve a high-speed keyword extraction apparatus which can realize the operation of the keyword extraction apparatus according to the first aspect of the present invention.

Moreover, if the basic word deleting step is additionally provided, the words which are not necessary as keywords used to identify a document can be deleted and a highly-accurate keyword extraction can be realized with a less amount of retrieval wastes.

According to the third aspect of the present invention there is provided a keyword extraction method further comprising, in addition to the steps of the keyword extraction method according to the second aspect, when the sentence input in the input step is written in Japanese, a prefix segmentation point setting step for cutting out a range of any of prefixes in the Japanese input sentence by referring to prefix storage means for storing the prefixes, wherein the partial character string cutting step cuts out, as keywords, all relevant partial character strings based on the segmentation points set in the technical-term segmentation point setting step, the character-type segmentation point setting step, the basic-word segmentation point setting step, and the prefix segmentation point setting step.

With the above feature, a keyword extraction method for high-speed document retrieval can be achieved without increasing the number of combinations of different expressions of words serving as retrieval keys regardless of the presence/absence of a prefix and different expressions of a technical term succeeding to the prefix.

According to the fourth aspect of the present invention, there is provided a keyword extraction method further comprising, in addition to the steps of the keyword extraction method according to the third aspect, when the sentence input in the input step is written in Japanese, a suffix segmentation point setting step for cutting out a range of any of suffixes in the Japanese input sentence by referring to suffix storage means for storing the prefixes, wherein the partial character string cutting step cuts out, as keywords, all relevant partial character strings based on the segmentation points set in the technical-term segmentation point setting step, the character-type segmentation point setting step, the basic-word segmentation point setting step, the prefix segmentation point setting step, and the suffix segmentation point setting step.

With the above feature, a keyword extraction method for high-speed document retrieval can be achieved without increasing the number of combinations of different expressions of words serving as retrieval keys regardless of the presence/absence of a suffix and different expressions of a technical term succeeding to the suffix.

According to the fifth aspect of the present invention, there is provided a keyword extraction method further comprising, in addition to the steps of the keyword extraction method according to the second aspect, a number-of-characters limiting step for deleting those ones of the keywords extracted in the partial character string cutting step which have a character string length outside a predetermined range, thereby providing redetermined keywords.

With the above feature, the number of characters of each of the extracted keywords can be limited within a certain range. Further, since the number of characters is counted based on the word after converting its different expression into a corresponding proper expression, it is possible to achieve a keyword extraction capable of avoiding such an uneven extraction of keywords that some words are registered, but other words are deleted depending on difference in number of characters between different expressions of even those words which have the similar meaning.

According to the sixth aspect of the present invention, there is provided a keyword extraction method further comprising, in addition to the steps of the keyword extraction method according to the fifth aspect, a frequency totalizing step for counting appearance frequency of each of the keywords or the redetermined keywords extracted in the partial character string cutting step or the number-of-characters limiting step.

With the above feature, since keywords are extracted after replacing their different expressions by corresponding proper expressions, the words having the similar meaning but different expressions are avoided from being determined as separate words, and the keywords can be given with respective precise values of appearance frequency.

According to the seventh aspect of the present invention, there is provided a keyword extraction method further comprising, in addition to the steps of the keyword extraction method according to the fifth aspect, a symbolic-character segmentation point setting step for, when any of prescribed symbolic characters appears in the input sentence, cutting out that symbolic character, and a symbolic character deleting step for deleting the symbolic character cut out in the symbolic-character segmentation point setting step when the symbolic character is contained as one character in any of the keywords or the redetermined keywords extracted in the partial character string cutting step or the number-of-characters limiting step.

With the above feature, in a process of dealing with different expressions of a compound word, "•" and "/" appearing between words composing the compound word are deleted and a word resulted from replacing a different expression of each of the words composing the compound word by a corresponding proper expression can be assigned as a keyword to a document. By executing the similar processing for an input compound word at the time of retrieval, different expressions in the form of a compound word and different expressions for each of words composing the compound word can be dealt with in a unified manner. Also, it is possible to achieve a keyword extraction method for high-speed document retrieval without inviting an increase in the number of retrieval keys due to combinations of words composing the compound word.

According to the eighth aspect of the present invention, there is provided a keyword extraction method wherein, in addition to the steps of the keyword extraction method according to the second aspect, the technical term storage means stores technical terms which are created in a different expression adding step with the aid of different expressions registered in non-technical-term different expression storage means for storing different expressions of general words of high frequency and different expressions of the technical terms registered in the technical term storage means, the different expression adding step comprising a word dividing step for, when a technical term in the input sentence is a compound word, dividing the compound word into partial character strings composing the compound word, a different expression developing step for combining different expressions of the partial character strings with each other to create different expressions of the compound word, and a registering step for creating pairs of each of the created different expressions and a proper expression of the compound word, and registering the pairs in the technical term storage means.

With the above feature, a set of words are created by combining different expressions of each of individual words composing a compound word, one in the created set of the words having different expressions is determined to be a proper expression, and pairs of each headword and the proper expression are registered in the technical term storage means. As a result, it is possible to achieve a keyword extraction method adaptable for high-speed document retrieval without generating a large number of retrieval keys while assisting the operation of additionally registering words, which are necessary as technical terms, in the technical term storage means.

According to the ninth aspect of the present invention, there is provided a computer readable recording medium storing a keyword extraction program which comprises an input sequence for inputting a sentence; a technical-term segmentation point setting sequence for, when any of technical terms in technical term storage means for storing technical terms with proper expressions and different expressions thereof exists in the sentence input in the input step, cutting out a range of that technical term from the input sentence; a proper-expression replacing sequence for, when the technical term cut out in the technical-term segmentation point setting step is written in a different expression, replacing a range of the technical term in the input sentence by a corresponding proper expression; a character-type segmentation point setting sequence for detecting a difference in character type in the input sentence; a basic-word segmentation point setting sequence for, when any of basic words in basic word storage means for storing, as the basic words, general words of high frequency exists in the input sentence, cutting out a range of any of the basic words from the input sentence; and a partial character string cutting sequence for cutting out, as keywords, all relevant partial character strings based on segmentation points set in the technical-term segmentation point setting sequence, the character-type segmentation point setting sequence and the basic-word segmentation point setting sequence.

With the above feature, it is possible to achieve a computer readable recording medium storing a program which represents the keyword extraction method according to the second aspect, and which enables a computer to execute a keyword extraction process adaptable for high-speed document retrieval.

What is claimed is:

1. A keyword extraction apparatus comprising:

a technical term storage means for storing technical terms with proper expressions and different expressions thereof, a basic word storage means for storing general basic words of high frequency, an input means through which a sentence is input, a technical-term segmentation point setting means for, when any of the technical terms stored in said technical term storage means exists in the sentence input through said input means, cutting out a range of that technical term from the input sentence, a proper-expression replacing means for, when the technical term cut out by said technical-term segmentation point setting means is written in a different expression, replacing the different expression by a corresponding proper expression, a character-type segmentation point setting means for detecting a difference in character type in the input sentence, a basic-word segmentation point setting means for cutting out, from the input sentence, a range of any of the basic words stored in said basic word storage means, a partial character string cutting means for cutting out partial character strings based on segmentation points set by said technical-term segmentation point setting means, said character-type segmentation point setting means and said basic-word segmentation point setting means, and an output means for outputting, as keywords, the partial character strings cut out by said partial character string cutting means.

2. A keyword extraction method comprising:

an input step for inputting a sentence, a technical-term segmentation point setting step for, when any of technical terms in a technical term storage means for storing technical terms with proper expressions and different expressions thereof exists in the sentence input in said input step, cutting out a range of that technical term from the input sentence, a proper-expression replacing step for, when the technical term cut out in said technical-term segmentation point setting step is written in a different expression, replacing a range of said technical term in the input sentence with a corresponding proper expression, a character-type segmentation point setting step for detecting a difference in character type in the input sentence, a basic-word segmentation point setting step for, when any of basic words in a basic word storage means for storing, as the basic words, general words of a high frequency existing in the input sentence, cutting out a range of any of the basic words from the input sentence, and a partial character string cutting step for cutting out, as keywords, partial character strings based on segmentation points set in said technical-term segmentation point setting step, said character-type segmentation point setting step and said basic-word segmentation point setting step.

3. A keyword extraction method according to claim 2, further comprising, when the sentence input in said input step is written in Japanese:

a prefix segmentation point setting step for cutting out a range of any of prefixes in the Japanese input sentence by referring to a prefix storage means for storing the prefixes, wherein said partial character string cutting step cuts out, as keywords, all relevant partial character strings based on the segmentation points set in said technical-term segmentation point setting step, said character-type segmentation point setting step, said basic-word segmentation point setting step, and said prefix segmentation point setting step.

4. A keyword extraction method according to claim 3, further comprising, when the sentence input in said input step is written in Japanese:

a suffix segmentation point setting step for cutting out a range of any of suffixes in the Japanese input sentence by referring to a suffix storage means for storing the prefixes, wherein said partial character string cutting step cuts out, as keywords, all relevant partial character strings based on the segmentation points set in said technical-term segmentation point setting step, said character-type segmentation point setting step, said basic-word segmentation point setting step, said prefix segmentation point setting step, and said suffix segmentation point setting step.

5. A keyword extraction method according to claim 2, further comprising a number-of-characters limiting step for deleting the keywords extracted in said partial character string cutting step which have a character string length outside a predetermined range, thereby providing redetermined keywords.

6. A keyword extraction method according to claim 5, further comprising a frequency totalizing step for counting an appearance frequency of each of the keywords or the redetermined keywords extracted in said partial character string cutting step or said number-of-characters limiting step.

7. A keyword extraction method according to claim 5, further comprising a symbolic-character segmentation point setting step for, when any of prescribed symbolic characters appears in the input sentence, cutting out the symbolic character, and a symbolic character deleting step for deleting the symbolic character cut out in said symbolic-character segmentation point setting step when said symbolic character is contained as one character in any of the keywords or the redetermined keywords extracted in said partial character string cutting step or said number-of-characters limiting step.

8. A keyword extraction method according to claim 2, wherein said technical term storage means stores technical terms which are created in a different expression adding step with the aid of different expressions registered in non-technical-term different expression storage means for storing different expressions of general words of high frequency and different expressions of the technical terms registered in said technical term storage means, said different expression adding step comprising:

a word dividing step for, when a technical term in the input sentence is a compound word, dividing the compound word into partial character strings composing said compound word, a different expression developing step for combining different expressions of said partial character strings with each other to create different expressions of said compound word, and a registering step for creating pairs of each of said created different expressions and a proper expression of said compound word, and registering the pairs in said technical term storage means.

9. A computer readable recording medium storing a program which enables a keyword extraction process to be executed in a computer, said keyword extraction process comprising:

an input sequence for inputting a sentence, a technical-term segmentation point setting sequence for, when any of technical terms in technical term storage means for storing technical terms with proper expressions and different expressions thereof exist in the sentence input in said input step, cutting out a range of that technical term from the input sentence, a proper-expression replacing sequence for, when the technical term cut out in said technical-term segmentation point setting step is written in a different expression, replacing a range of said technical term in the input sentence by a corresponding proper expression, a character-type segmentation point setting sequence for detecting a difference in character type in the input sentence, a basic-word segmentation point setting sequence for, when any of basic words in basic word storage means for storing, as the basic words, general words of high frequency existing in the input sentence, cutting out a range of any of the basic words from the input sentence, and a partial character string cutting sequence for cutting out, as keywords, all relevant partial character strings based on segmentation points set in said technical-term segmentation point setting sequence, said character-type segmentation point setting sequence and said basic-word segmentation point setting sequence.

* * * * *

UNITED STATES PATENT AND TRADEMARK OFFICE

CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 5,

Line 35, change " “テキストサーチ” " to -- “卓上型インタフォーン” --;

Column 6,

Line 11, change " “切り換え”, “切替え”." to -- “サーバ切替え”, “サーバ切換え” --;

Line 26, change " “切り換え”, and “切替え” " to -- “切替え” and “切換え” --;

Line 27, delete " “換え” ";

Line 61, change " “サーバー切り替えによる通信テストを行(konpyubta" to -- “コンピュータ(konpyuhta--;

Column 7,

Line 1, change " “サーバー” " to -- “コンピューター” --;

UNITED STATES PATENT AND TRADEMARK OFFICE

CERTIFICATE OF CORRECTION

PATENT NO. : 6,173,251 B1 
DATED : January 9, 2001
INVENTOR(S) : Ito et al.

It is certified that error appears in the above-identified patent and that said Letters Patent is hereby corrected as shown below:

Column 7, cont'd,

Line 5, change " "サーバー切り替えによる通信テストを行アーキテクチャー" to -- "コンピュータアーキテクチャー--;

Line 7, change " "サーバーアーキテクチャー" to -- "コンピューターアーキテクチャー--;

Line 16, change " "サーバー切り替えによる通信テストを行アーキテクチャー" " to -- "コンピュータアーキテクチャー" --;

Line 17, change " "サーバー" " to -- "コンピューターアーキテクチャー" --;

Line 18, delete "アーキテクチャー";

Line 30, change " "う.切り替え" to -- "ユーザ・インタフェース--;

Line 33, change " "う.切り替え" and "う. " to -- "ユーザ・インタフェース" and "ユーザ/インタフェース" --;

Line 34, delete " "切り替え" ";

Line 35, change " "う" " to -- "ユーザ" --;

Line 36, change " "切り替え" " to -- "インタフェース" --;

Line 55, change " "う" to -- "ユーザ--;

Line 58, change " "切り替え" " to -- "インタフェース" --;

UNITED STATES PATENT AND TRADEMARK OFFICE

CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 7, cont'd,

Line 60, change " "う", "切り替え", "うインタフェイス", "ユーザー切り替え", and" to -- "ユーザインタフェース", "ユーザインタフェイス", "ユーザーインタフェース", and "ユーザーインタフェース" would be produced for "ユーザ・インタフェース--;

Line 61, delete " "ユーザー切り替え" would be produced for "う.切り替え" ";

Column 29,

Line 23, change " "サーバ", "切り替え" " to -- "サーバ切り替え" --;

Line 24, change "テスト" " to -- "テスト" --;

Column 33,

Line 34, change " "再" " to -- "確認" --;

Line 39, change " "再確認" " to -- "う" --;

Column 34,

Line 49, change " "再" " to -- "確認" --;

Line 59, change " "の" " to -- "約" --;

Column 37,

Line 56, change " "再" " to -- "確認" --;

UNITED STATES PATENT AND TRADEMARK OFFICE
CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 38,

Line 11, change " "サーバーサーバ" " to -- "サーバー" --;

Line 19, change " "サーバ" " to -- "サーバ側" --;

Line 20, change " "側確認中" " to -- "確認中" --;

Line 61, change " "約１万円" " to -- "確認" --;

Column 39,

Line 2, change " "通信" " to -- "日本対アメリカ" --;

Line 59, change " "う切り替え切り替えを行う" to -- "ユーザインタフェース切り替えを行う--

Column 40,

Line 9, change " "う切り替え切り替え" " to -- "ユーザーインタフェース切り替え" --;

Line 13, change " "を行う" " to -- "ス" --;

Column 40, cont'd,

LIne 17, change " "うインタフォーン切り替え" " to -- "ユーザインタフェース切り替え" --;

Line 41, change " "を切り替え" " to -- "ユーザインタフェース" --;

Line 42, change " "う切り替え切り替え" " to -- "ユーザーインタフェース切り替え" --;

Line 43, change " "う切り替え切り替え" " to -- "ユーザーインタフェース切り替え" --;

UNITED STATES PATENT AND TRADEMARK OFFICE
CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 41,

Line 1, delete " "う" , "切り替え" ,";

Line 2, change "切り替え" and "う切り替え切り替え" " to -- "ユーザインタフェース" , "切り替え" and "ユーザーインタフェース切り替え" --;

Line 12, change " "う切り替え切り替え" " to -- "ユーザーインタフェース切り替え" --;

Line 13, change " "う" 切り替え" " to -- "ユーザインタフェース" --;

Line 20, change " "う切り替え切り替えを行う" to -- "ユーザインタフェース切り替えを行う--;

Line 38, change " "う切り替え切り替え" " to -- "ユーザーインタフェース切り替え" --;

Line 48, change " "う切り替え" " to -- "ユーザーインタフェース" --;

Column 42,

Line 8, change " "う切り替え" , "切り替え" and "う切り替え切り替え" " to -- "ユーザーインタフェース" , "切り替え" and "ユーザーインタフェース切り替え" --;

Line 14, change " "う切り替え" " to -- "ユーザーインタフェース" --;

Column 44,

Line 48, change " "切り替え" " to -- "切り換え" --;

CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 46,

Line 17,change " “う” " to -- “ユーザ” --;

Line 18, change " “切り替え” , and “切り替え” " to -- “ユーザー” , and “インタフェース” --;

Line 20, delete " “う” ";

Line 21,. change " “インタフェイス” is replaced by “切り替え” " to -- “ユーザ” , “インタフェイス” is replaced by “インタフェース” --;

Line 24, change " “う” and “切り替え” " to -- “ユーザ” and “インタフェース” --;

Line 27, change " “う切り替え” " to -- “ユーザ・インタフェース” --;

Line 33, change " “う切り替え” " to -- “ユーザ・インタフェース” --;

Line 39, change " “う切り替え” " to -- “ユーザ・インタフェース” --;

CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 47,

Line 13, change " “う切り替え” " to -- “ユーザ・インタフェース” --;

Line 36, delete " “う” ";

Line 37, change " “切り替え” and “う切り替え” " to -- “ユーザ”, “インタフェース” and “ユーザ・インタフェース” --;

Line 38, change " “う切り替え” " to -- “ユーザ・インタフェース” --;

Line 51, change " “う切り替え” " to -- “ユーザ・インタフェース” --;

Line 52, change " “う切り替え” " to -- “ユーザ・インタフェース” --; delete " “う” ";

Line 53, change " “切り替え” and “う切り替え” " to -- “ユーザ”, “インタフェース”. and “ユーザインタフェース”;

Line 57, change " “の設定を行う” " to -- “設定” --;

Line 59, change " “の設定を行う” " to -- “設定” --;

Line 60, change " “の設定を行う” " to -- “設定” --;

Line 61, change " “の設定を行う” " to -- “設定” --;

Column 48,

Line 1, change " “う”, “切り替え”, “う切り替え” and “の設定を行う” " to -- “ユーザ”, “インタフェース”, “ユーザインタフェース” and “設定” --;

UNITED STATES PATENT AND TRADEMARK OFFICE
CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 48, cont'd,

Line 6, change "sentence 1" to --sentence--;

Line 18, change " "う" " to -- "ユーザ" --;

Line 19, change " "切り替え" " to -- "インタフェース" --;

Line 20, change " "切り替え" " to -- "インタフェース" --;

Line 21, change " "う" and "切り替え" " to -- "ユーザ" and "インタフェース" --;

Line 24, change " "切り替え" " to -- "ユーザ・インタフェース" --;

Line 25, change " "の設定を行う" " to -- "設定" --;

Column 49,

Line 3, delete " "う", "切り替え" ";

Line 4, change " "切り替え" and "の設定を行う" " to -- "ユーザ", "インタフェース", "ユーザ・インタフェース" and "設定" --;

Line 8, change " "う切り替え" " to -- "ユーザ・インタフェース" --;

Line 9, change " "う切り替え"; hence "う", "切り替え", "う切り替え" " to -- "ユーザインタフェース"; hence "ユーザ", "インタフェース", "ユーザ・インタフェース" --;

Line 10, change " "の設定を行う" " to -- "設定" --;

UNITED STATES PATENT AND TRADEMARK OFFICE

CERTIFICATE OF CORRECTION

PATENT NO. : 6,173,251 B1
DATED : January 9, 2001
INVENTOR(S) : Ito et al.

It is certified that error appears in the above-identified patent and that said Letters Patent is hereby corrected as shown below:

Column 50,

Line 28, change " “切り換えΠ” " to -- “切り換えボタン” --;

Line 29, change " “に” " to -- “切” --;

Line 35, change " “切り換えボタ” " to -- “切り換えボタン” --;

Line 36, change " “切り換えボタ” " to -- “切り換えボタン” --;

Line 44, change " “切り換えボタ” " to -- “切り換えボタン” --;

Line 57, change " “ホ” " to -- “ボ” --;

Column 51,

Line 10, change " “切り替え釦” " to -- “切替え釦” --;

Line 30, change " “切り替え釦” " to -- “切替え釦” --.

Signed and Sealed this

Fifth Day of February, 2002

*Attest:*

JAMES E. ROGAN
*Director of the United States Patent and Trademark Office*

*Attesting Officer*